(12) United States Patent
Juchymenko

(10) Patent No.: US 12,123,499 B2
(45) Date of Patent: Oct. 22, 2024

(54) METHODS AND SYSTEMS FOR SEALING ROTATING EQUIPMENT SUCH AS EXPANDERS OR COMPRESSORS

(71) Applicant: Victor Juchymenko, Calgary (CA)

(72) Inventor: Victor Juchymenko, Calgary (CA)

(*) Notice: Subject to any disclaimer, the term of this patent is extended or adjusted under 35 U.S.C. 154(b) by 859 days.

(21) Appl. No.: 16/572,441

(22) Filed: Sep. 16, 2019

(65) Prior Publication Data

US 2020/0011426 A1 Jan. 9, 2020

Related U.S. Application Data

(63) Continuation of application No. 14/891,954, filed as application No. PCT/CA2014/000435 on May 20, 2014, now Pat. No. 10,415,706.

(Continued)

(51) Int. Cl.
| | |
|---|---|
| *F16J 15/40* | (2006.01) |
| *F01C 1/16* | (2006.01) |
| *F01C 11/00* | (2006.01) |
| *F01C 19/12* | (2006.01) |
| *F01C 21/00* | (2006.01) |

(Continued)

(52) U.S. Cl.
CPC ............ *F16J 15/40* (2013.01); *F01C 1/16* (2013.01); *F01C 19/12* (2013.01); *F01C 21/003* (2013.01); *F01C 21/008* (2013.01); *F01C 21/04* (2013.01); *F04C 29/005* (2013.01); *F16H 57/029* (2013.01); *F16H 57/0404* (2013.01); *F01C 11/002* (2013.01); *F04C 29/0064* (2013.01); *F04C 29/026* (2013.01)

(58) Field of Classification Search
CPC ...... F01C 19/12; F01C 21/003; F16H 57/029; F16J 15/40
See application file for complete search history.

(56) References Cited

U.S. PATENT DOCUMENTS

| 3,656,876 A | 4/1972 | Kocher |
| 3,975,123 A | 8/1976 | Schibbye |

(Continued)

FOREIGN PATENT DOCUMENTS

EP 2204584 A1 7/2010

OTHER PUBLICATIONS

PCT/CA2014/000435. Applicant: Victor Juchmenko. International Search Report & Written Opinion (Aug. 19, 2014).

*Primary Examiner* — Mary Davis
(74) *Attorney, Agent, or Firm* — Peter Zura; LOZA & LOZA, LLP

(57) ABSTRACT

A method and system is provided for pressure balancing one or more seals in machines such as expanders and/or compressors using the process fluid which is being expanded or compressed to provide the pressure for pressure balancing the other side of the one or more seals. The one or more seals may be part of a pressure containing chamber which may comprise a seal, a bearing and/or a gear on a rotating shaft common to the seal. An amount of pressure to be supplied to housing(s) for a machine so as to create a pressure cascade, and thereby dropping the pressure in each subsequent chamber as pressure approaches atmosphere. Pressure differentials may be directed to leak process fluid to the chamber into the process. Pressurized lube oil systems may be employed for balancing pressure and delivering lubricant to the seals, bearings and gears.

21 Claims, 28 Drawing Sheets

Related U.S. Application Data

(60) Provisional application No. 61/824,800, filed on May 17, 2013.

(51) Int. Cl.
  *F01C 21/04* (2006.01)
  *F04C 29/00* (2006.01)
  *F04C 29/02* (2006.01)
  *F16H 57/029* (2012.01)
  *F16H 57/04* (2010.01)

(56) References Cited

U.S. PATENT DOCUMENTS

| | | |
|---|---|---|
| 4,153,395 A | 5/1979 | O'Neill |
| 4,328,684 A | 5/1982 | Leo |
| 4,394,113 A | 7/1983 | Bammert |
| 4,515,512 A * | 5/1985 | Hertell ............... F16J 15/40 418/104 |
| 5,641,280 A | 6/1997 | Timuska |
| 6,302,667 B1 | 10/2001 | Timuska et al. |
| 6,769,890 B2 | 8/2004 | Vigano' et al. |
| 7,553,142 B2 | 6/2009 | Zinsmeyer et al. |
| 8,287,259 B2 | 10/2012 | Yoshimura |
| 8,435,020 B2 | 5/2013 | Amano |
| 8,459,969 B2 | 6/2013 | Matsukuma |
| 8,512,019 B2 | 8/2013 | Kakiuchi et al. |
| 8,529,234 B2 | 9/2013 | Yoshimura et al. |
| 8,556,606 B2 | 10/2013 | Noguchi |
| 10,415,706 B2 * | 9/2019 | Juchymenko ......... F01C 21/003 |
| 2009/0320477 A1 | 12/2009 | Juchymenko |
| 2010/0018207 A1 | 1/2010 | Juchymenko |
| 2010/0034682 A1 | 2/2010 | Spinnler |
| 2010/0209279 A1 | 8/2010 | Matsukuma |
| 2010/0329916 A1 | 12/2010 | Yoshimura |
| 2011/0176948 A1 | 7/2011 | Shaffer |
| 2012/0164015 A1 | 6/2012 | Yoshimura et al. |
| 2012/0230857 A1 | 9/2012 | Noguchi |

* cited by examiner

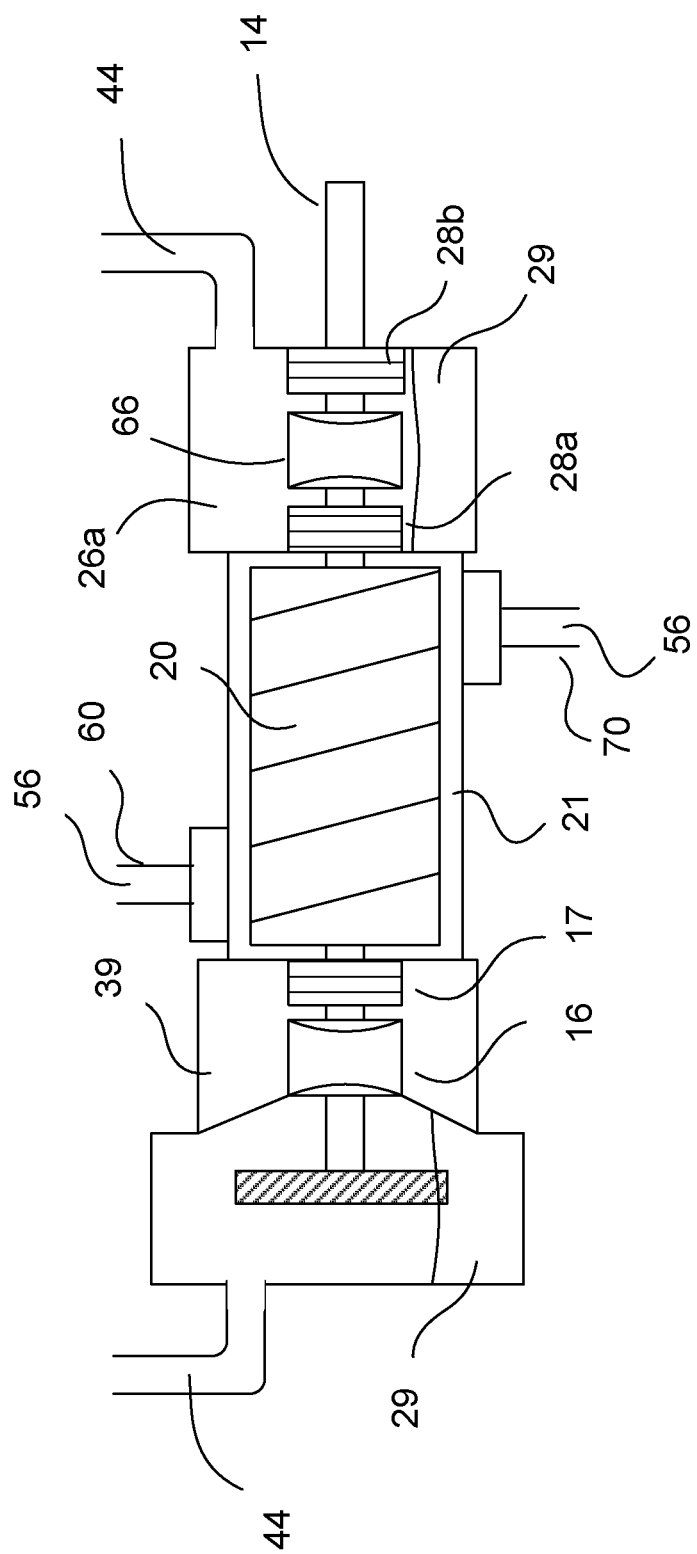
FIGURE: 1A

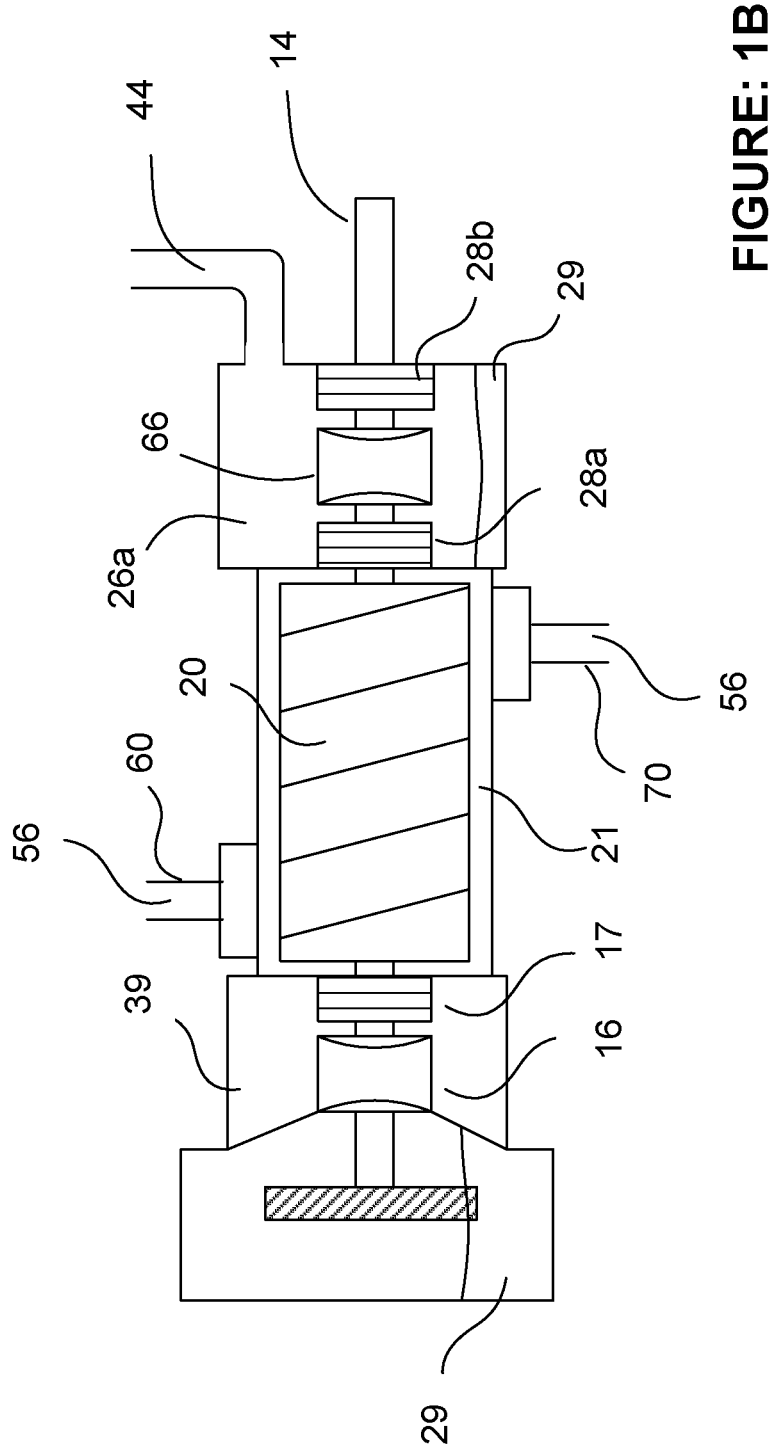

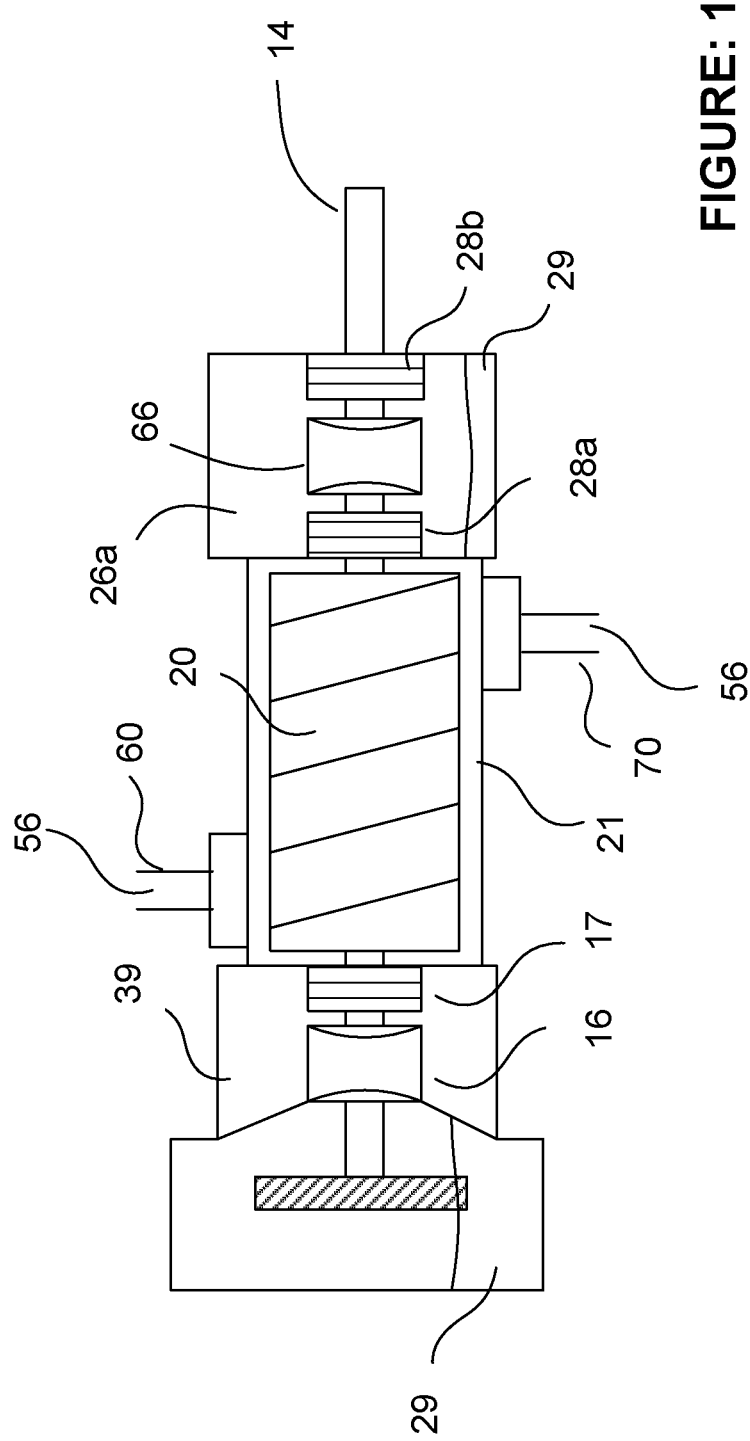

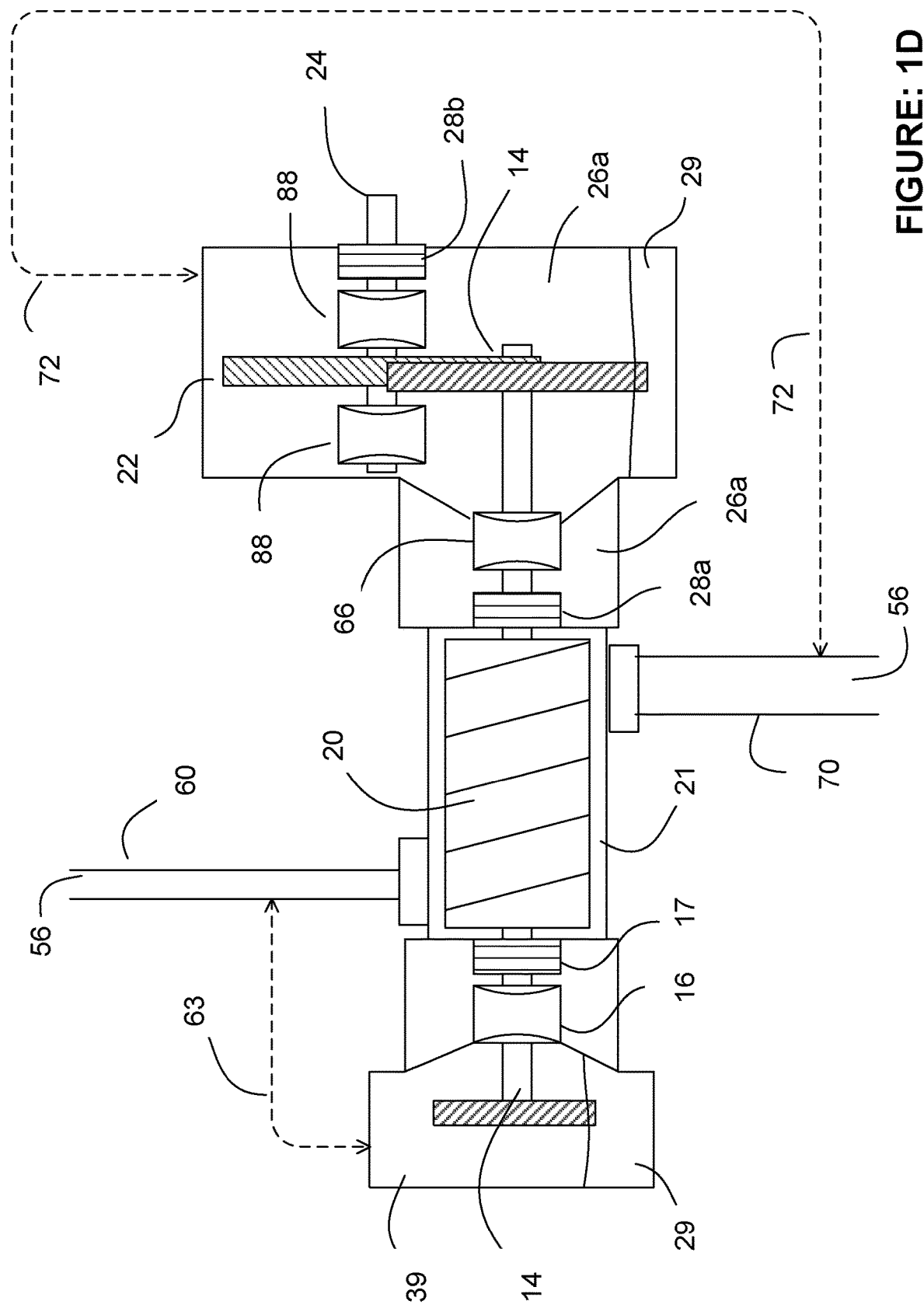
FIGURE: 1D

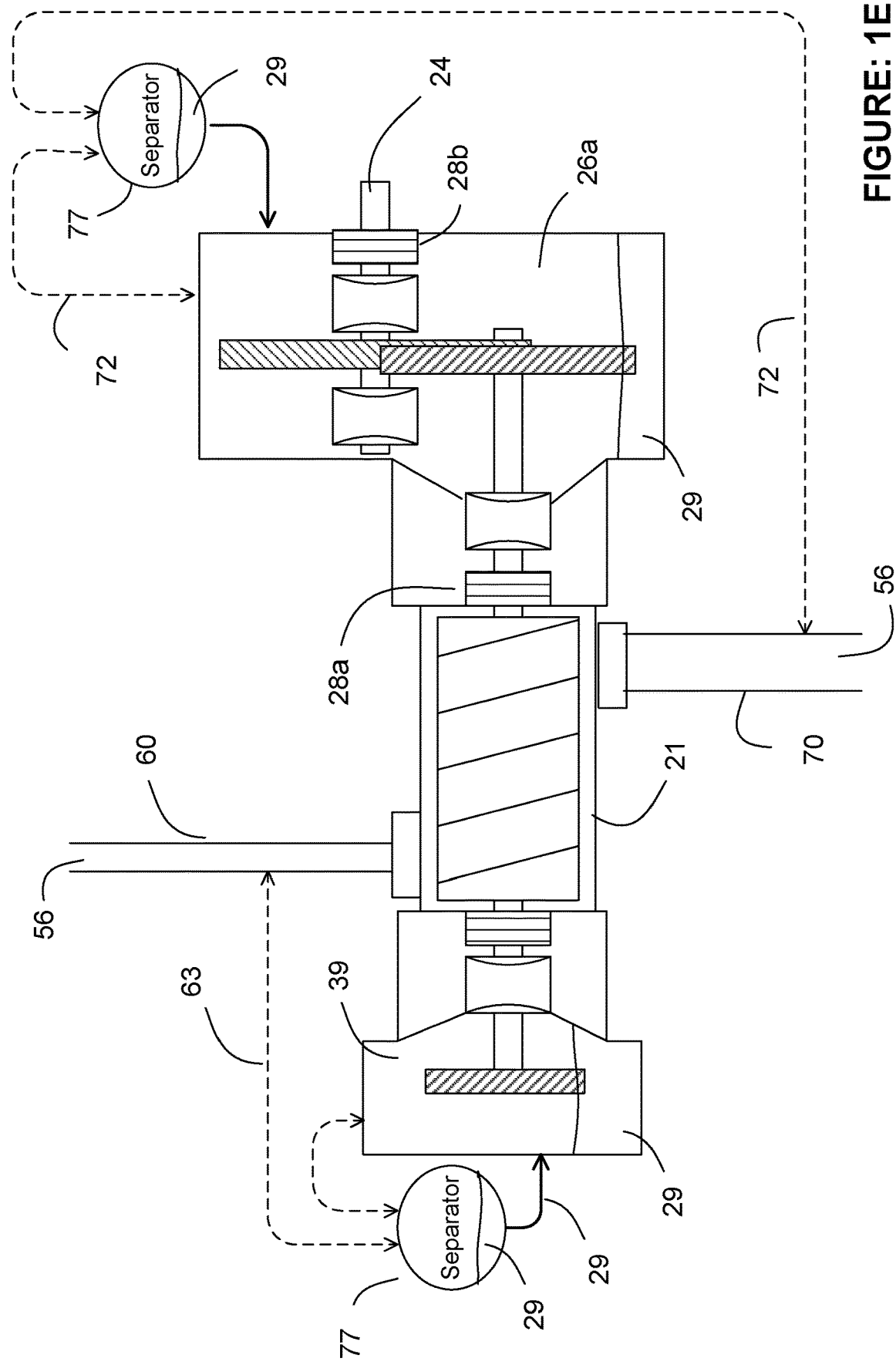

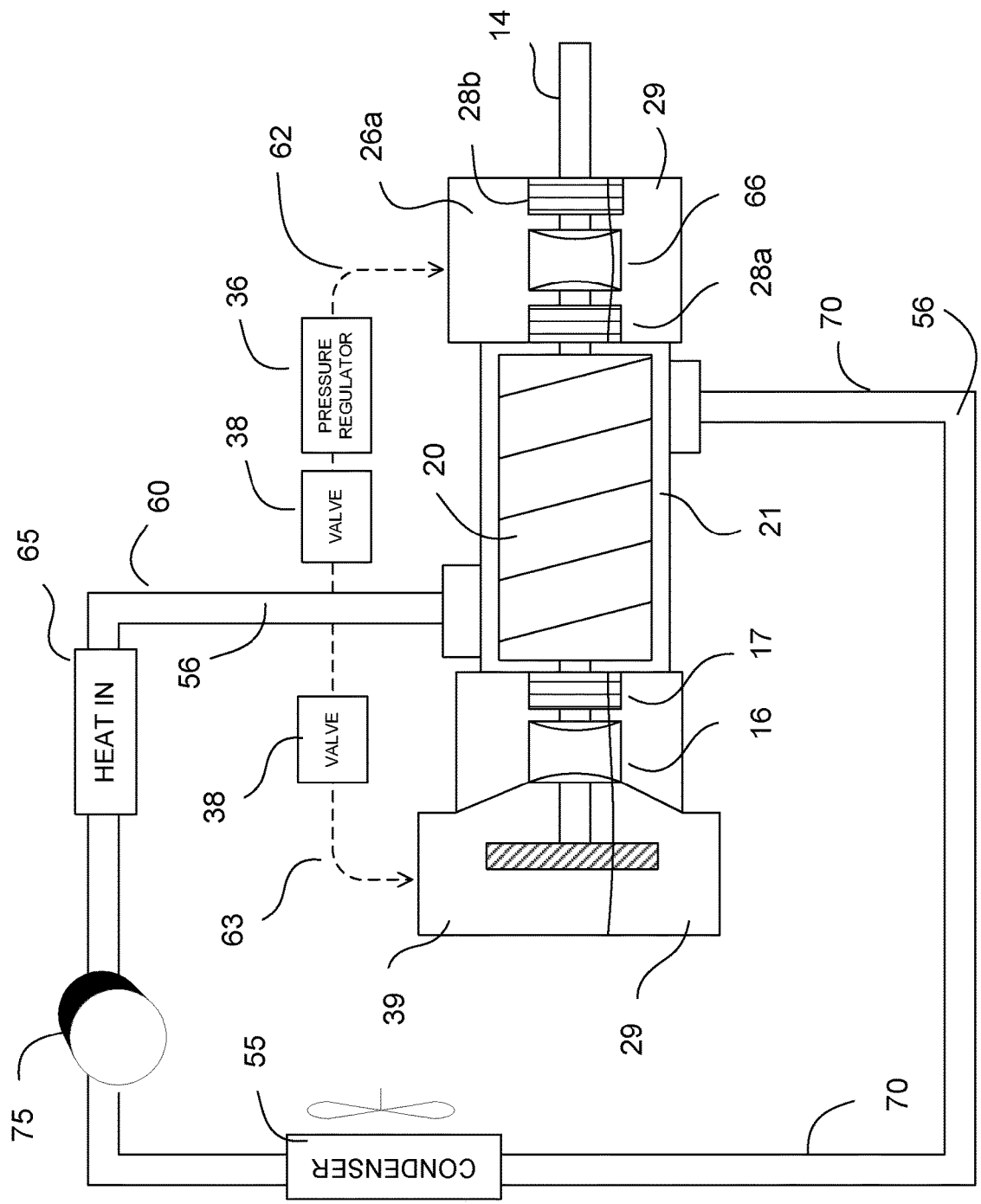
FIGURE: 1F

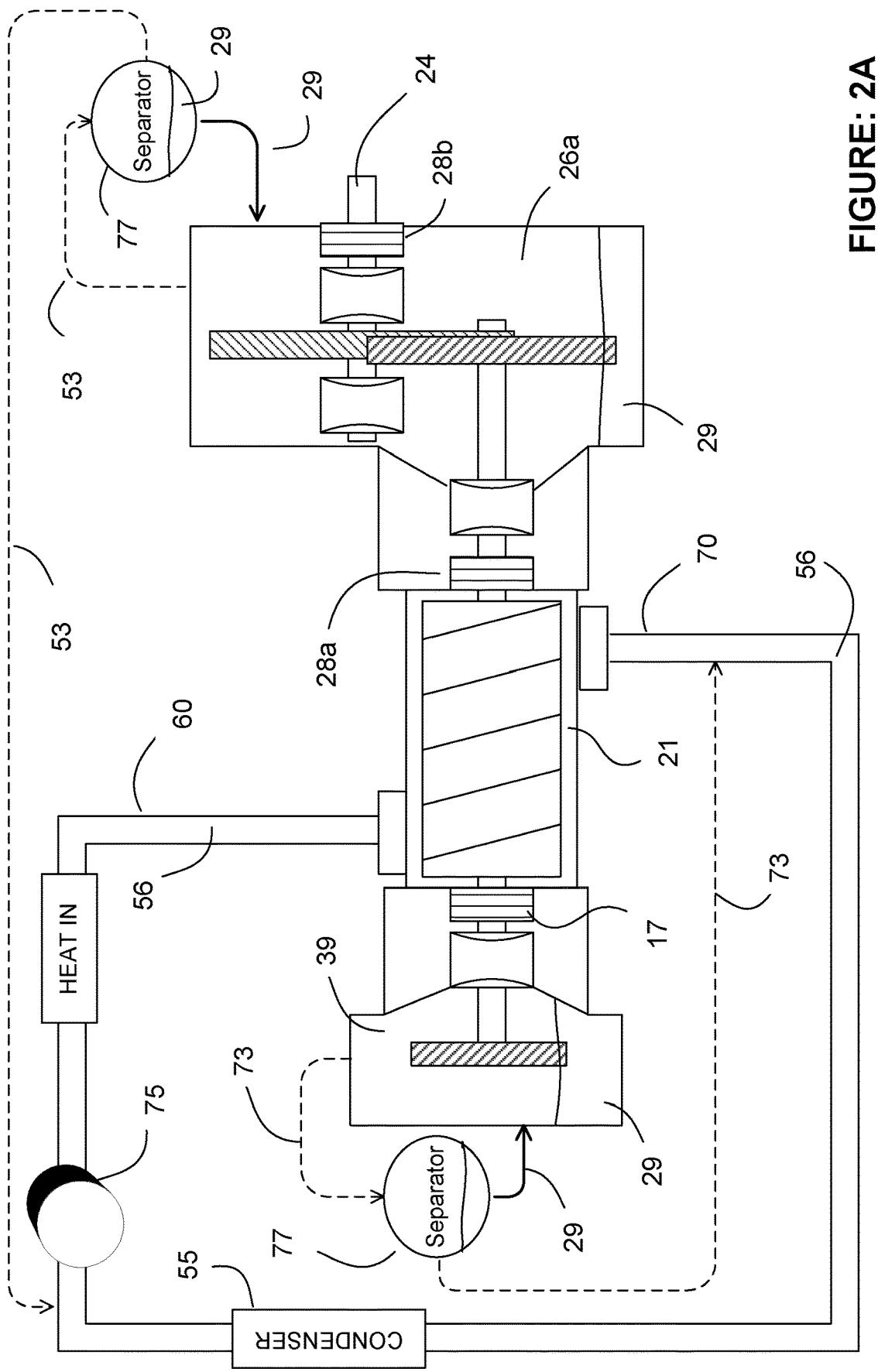
FIGURE: 2A

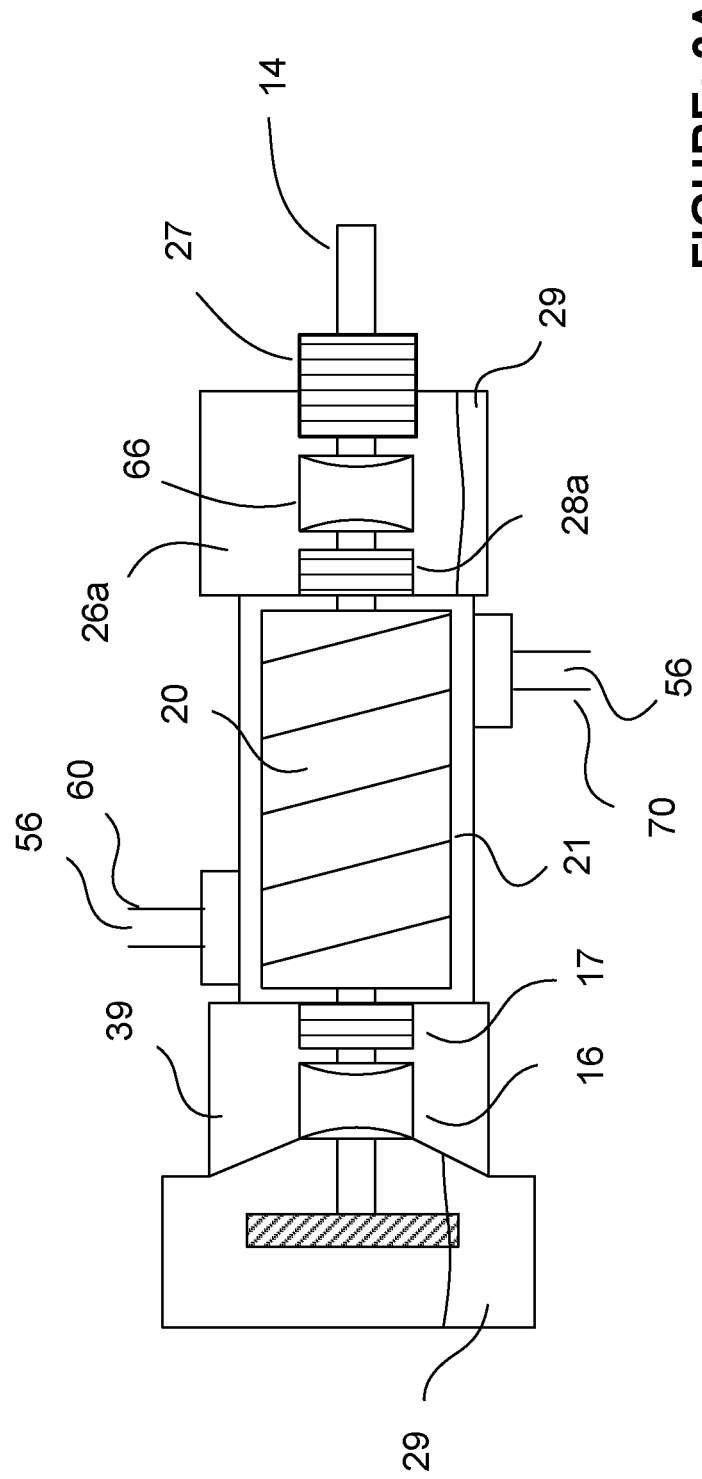
FIGURE: 3A

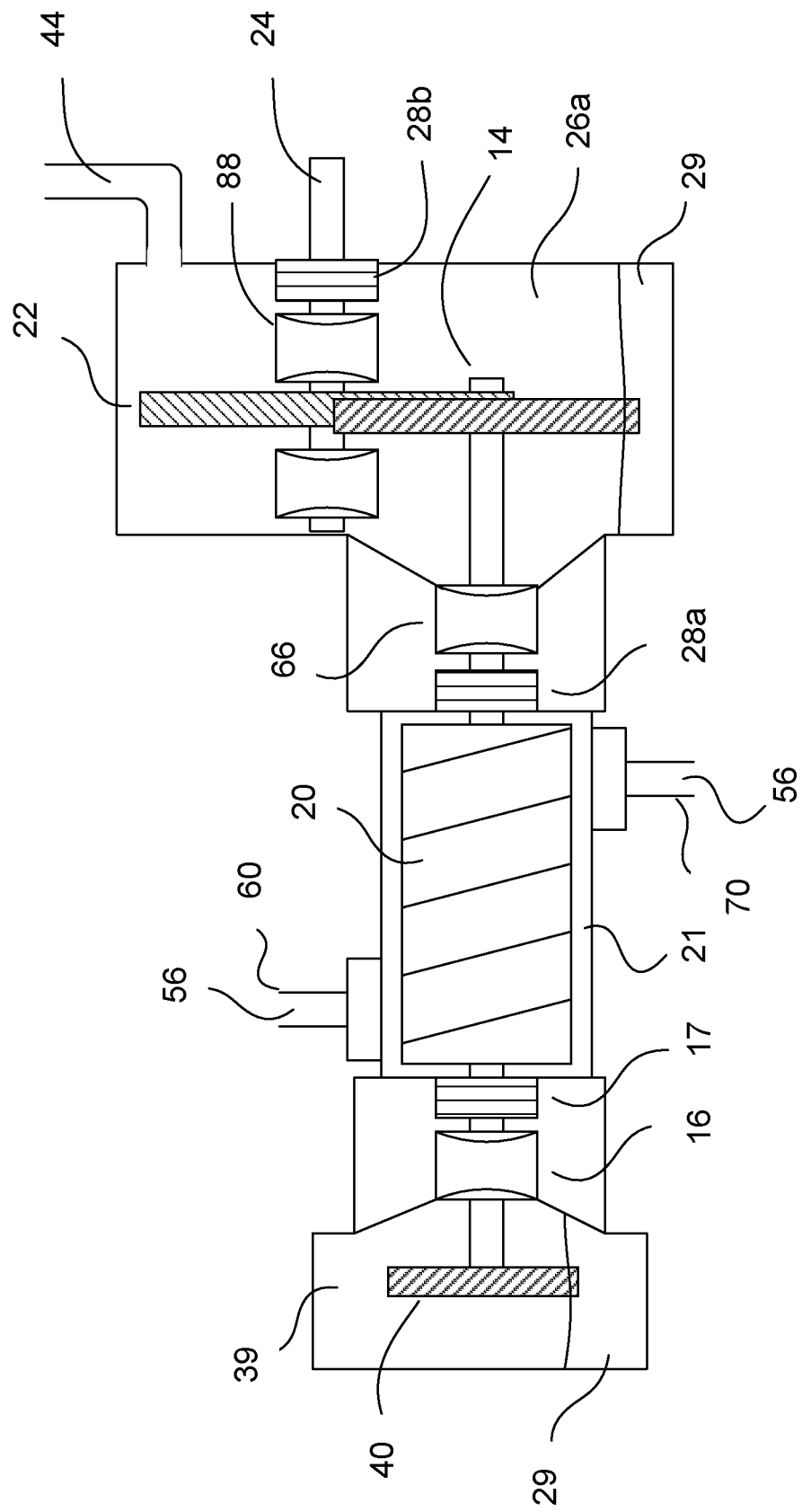
FIGURE: 3B

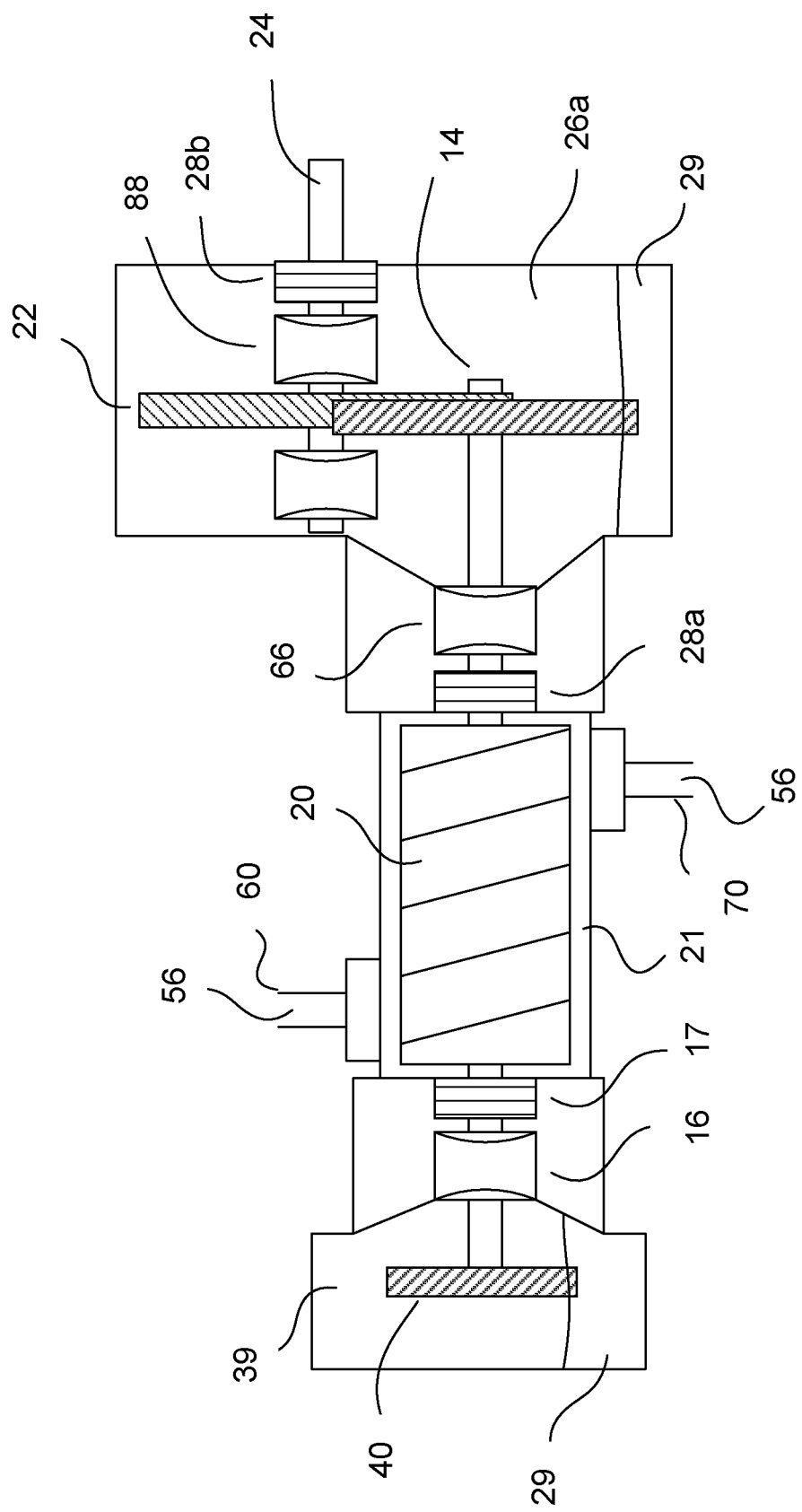
FIGURE: 3C

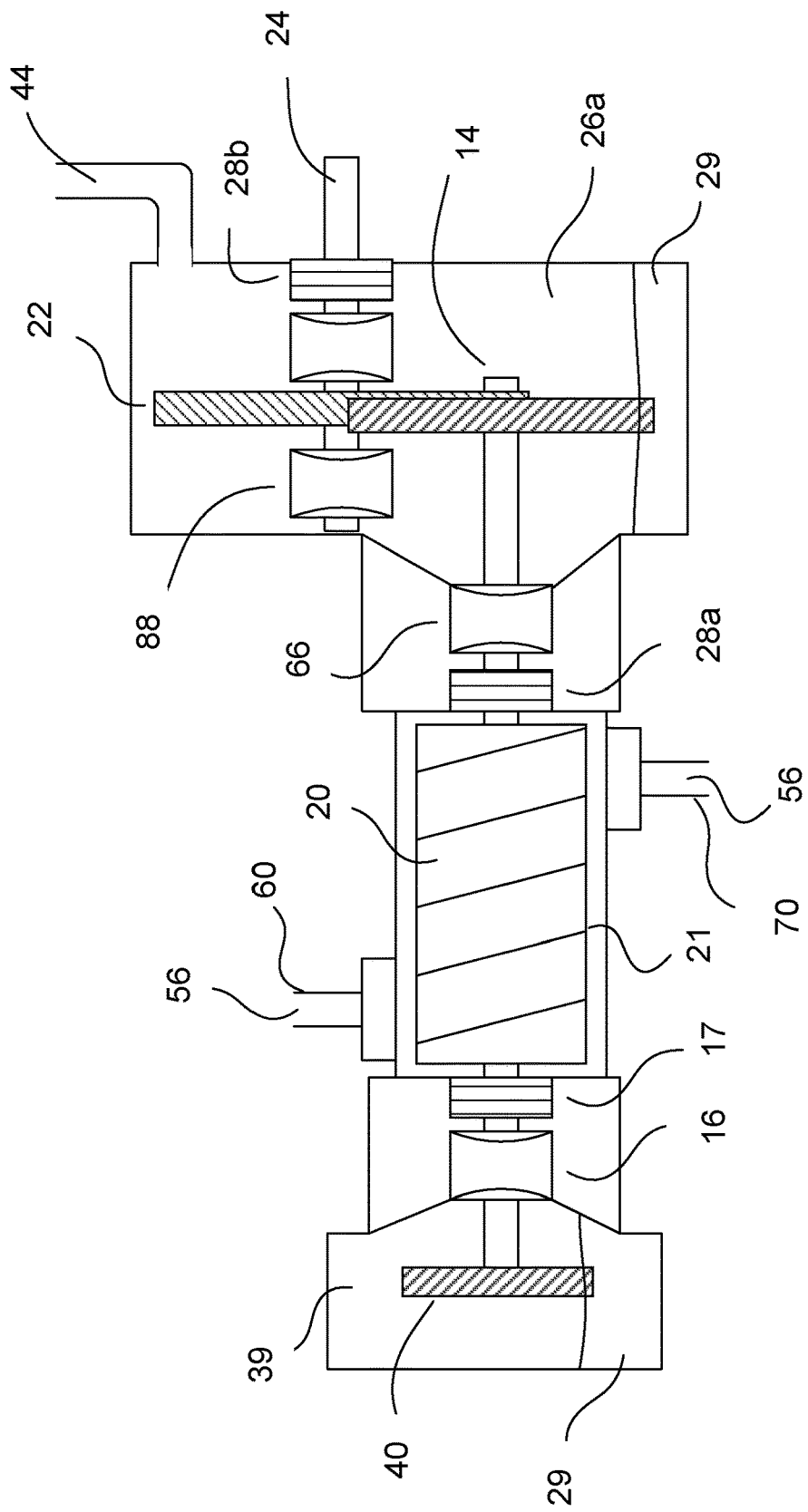
FIGURE: 3D

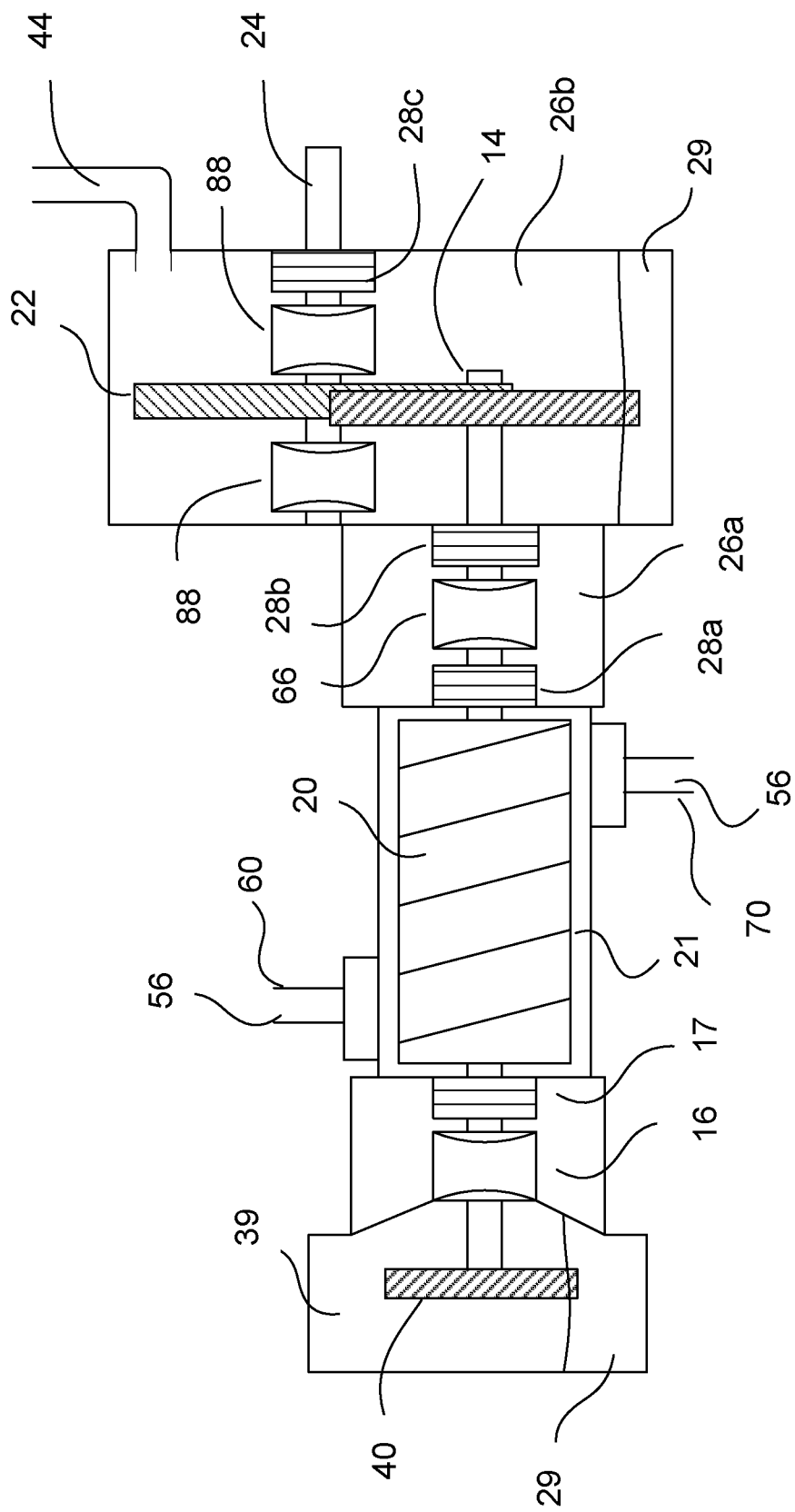
FIGURE: 3E

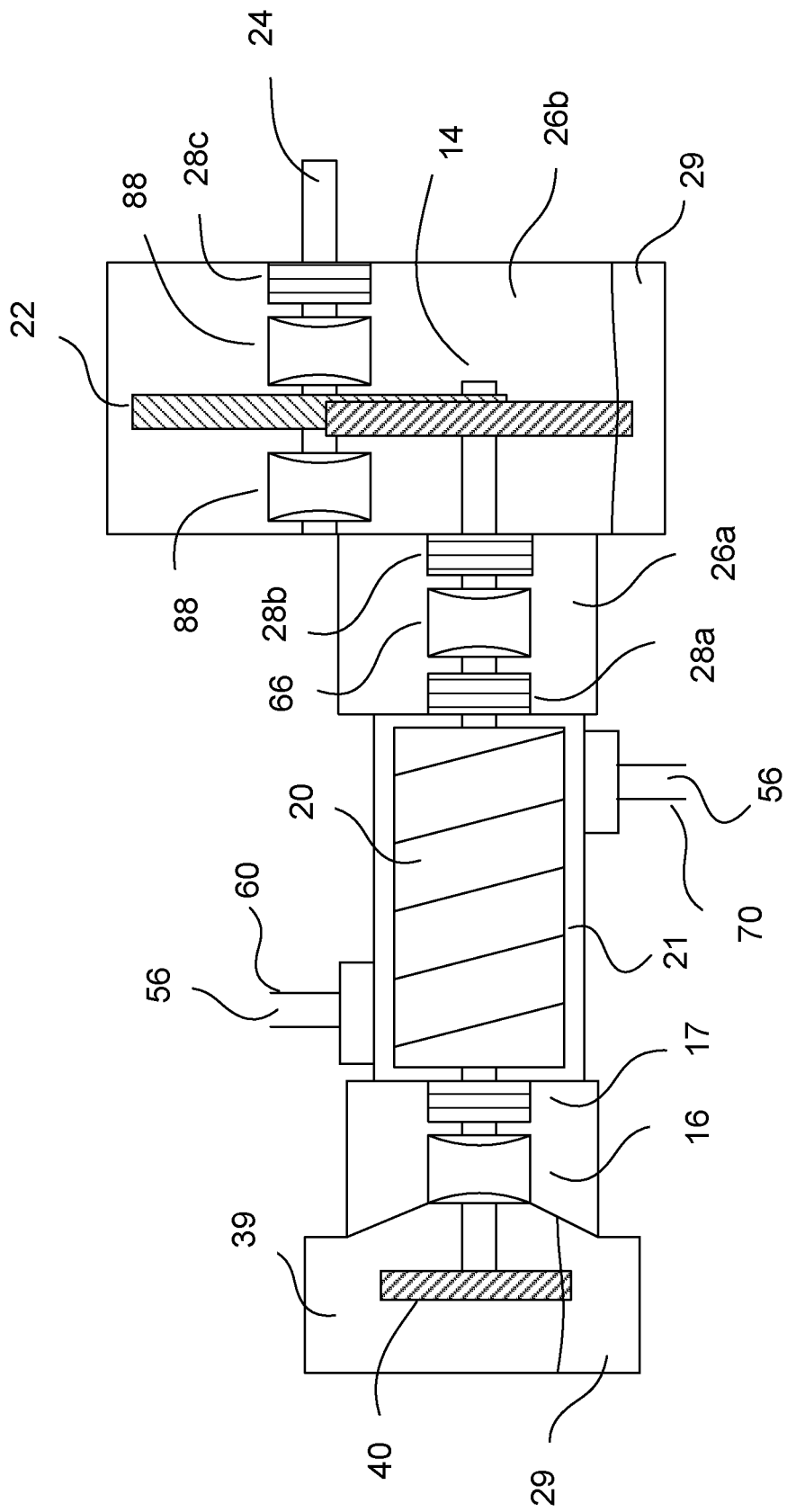
FIGURE: 3F

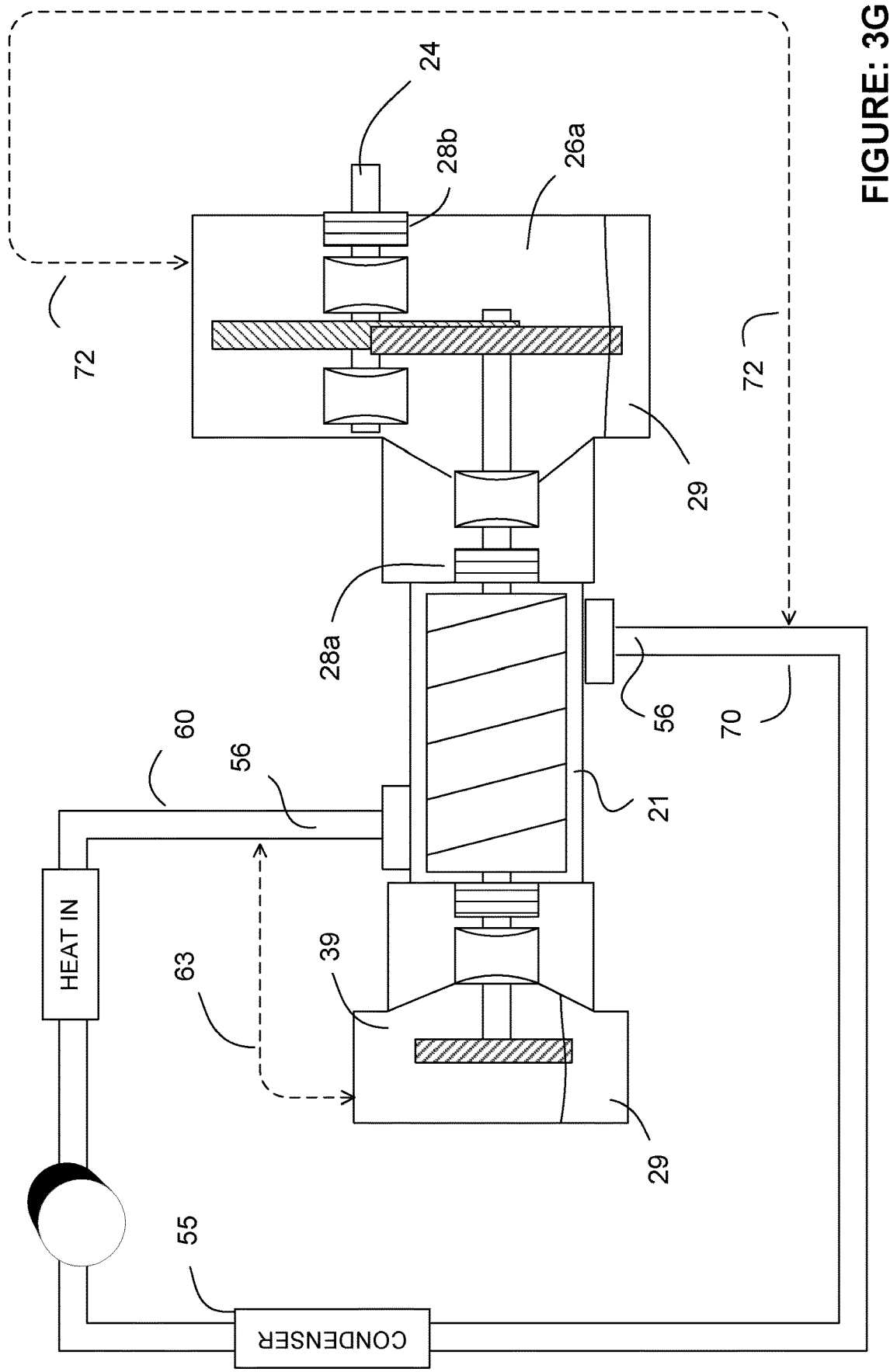
FIGURE: 3G

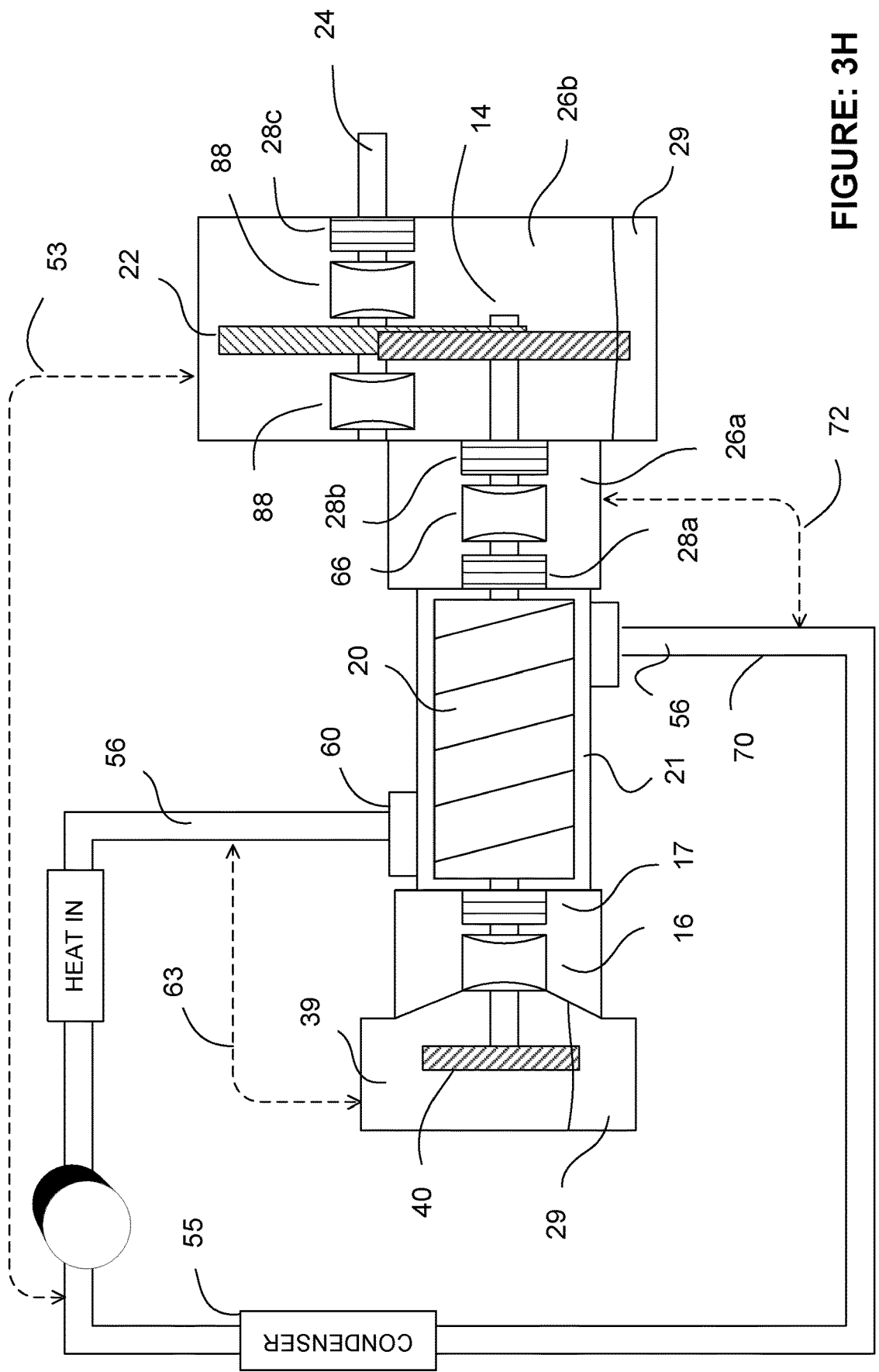
FIGURE: 3H

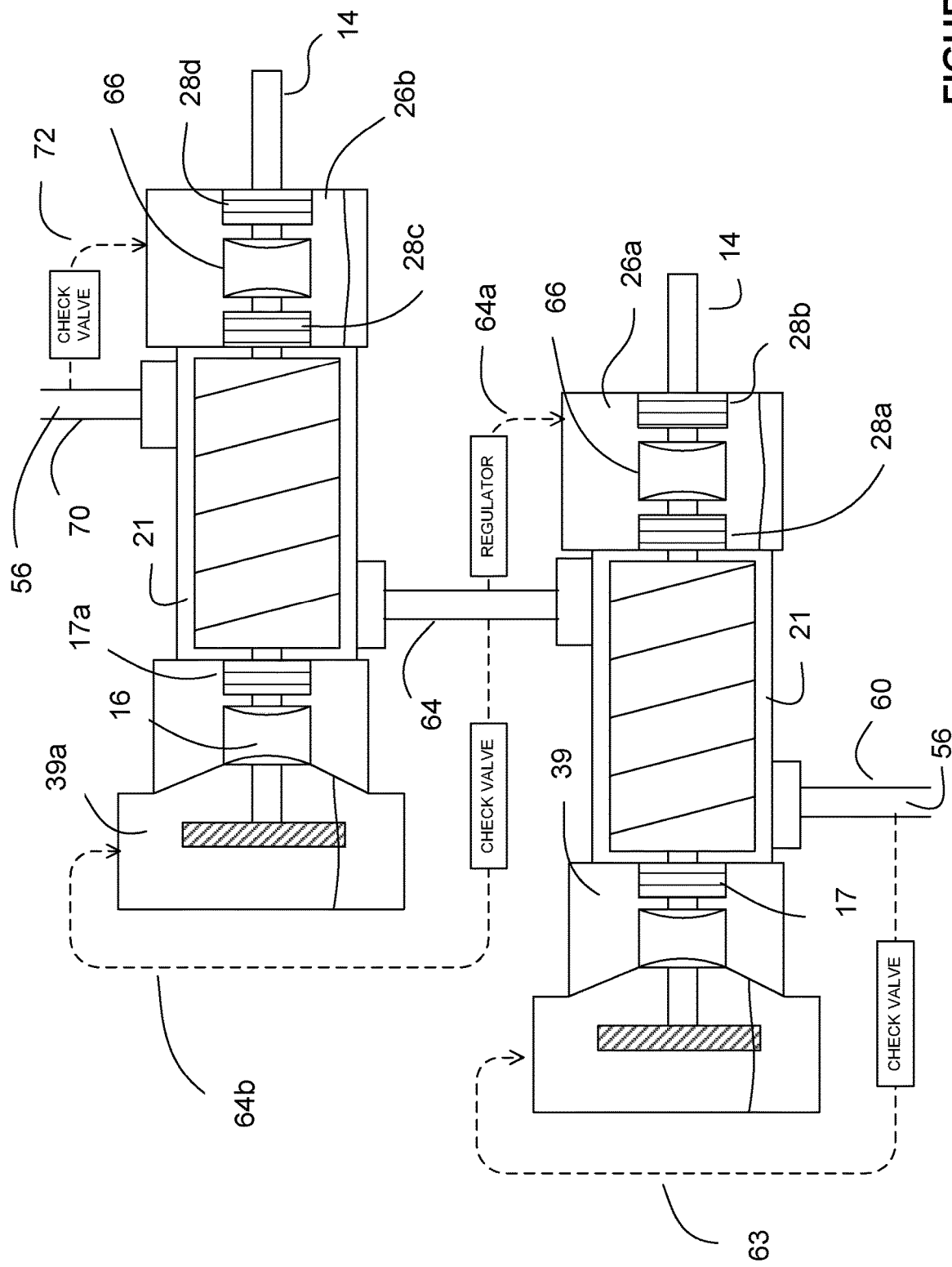
FIGURE: 3I

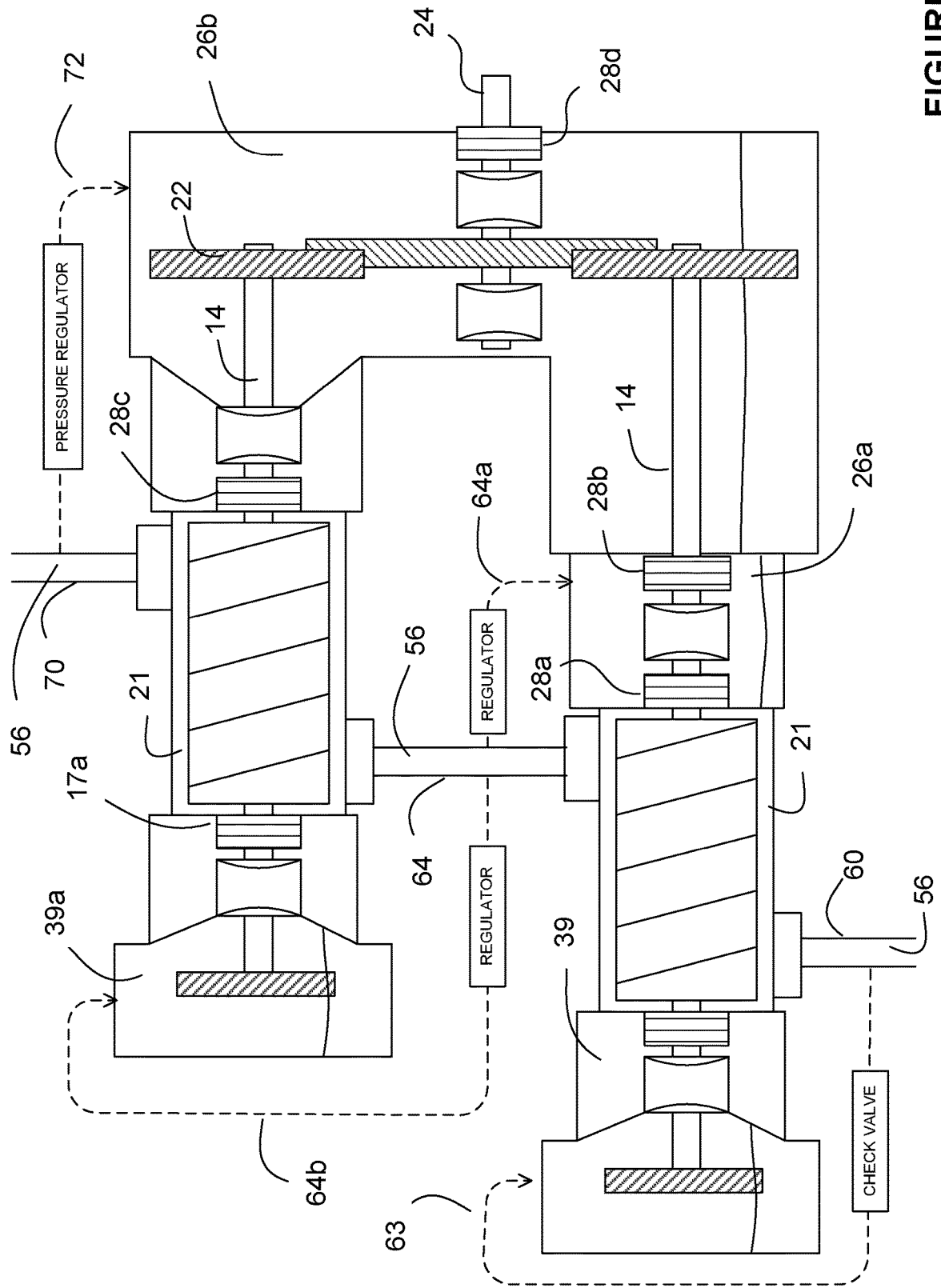
FIGURE: 3J

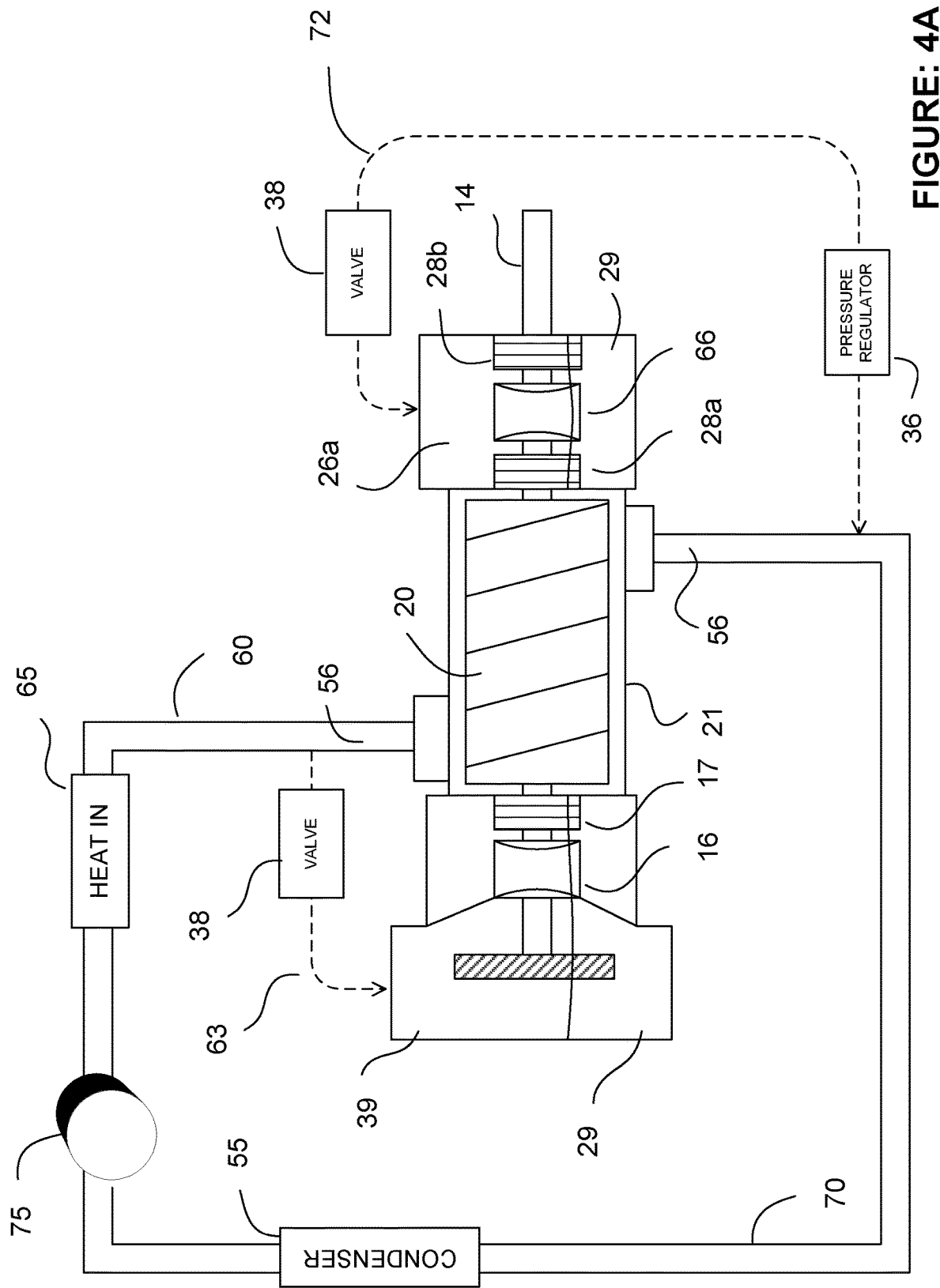
FIGURE: 4A

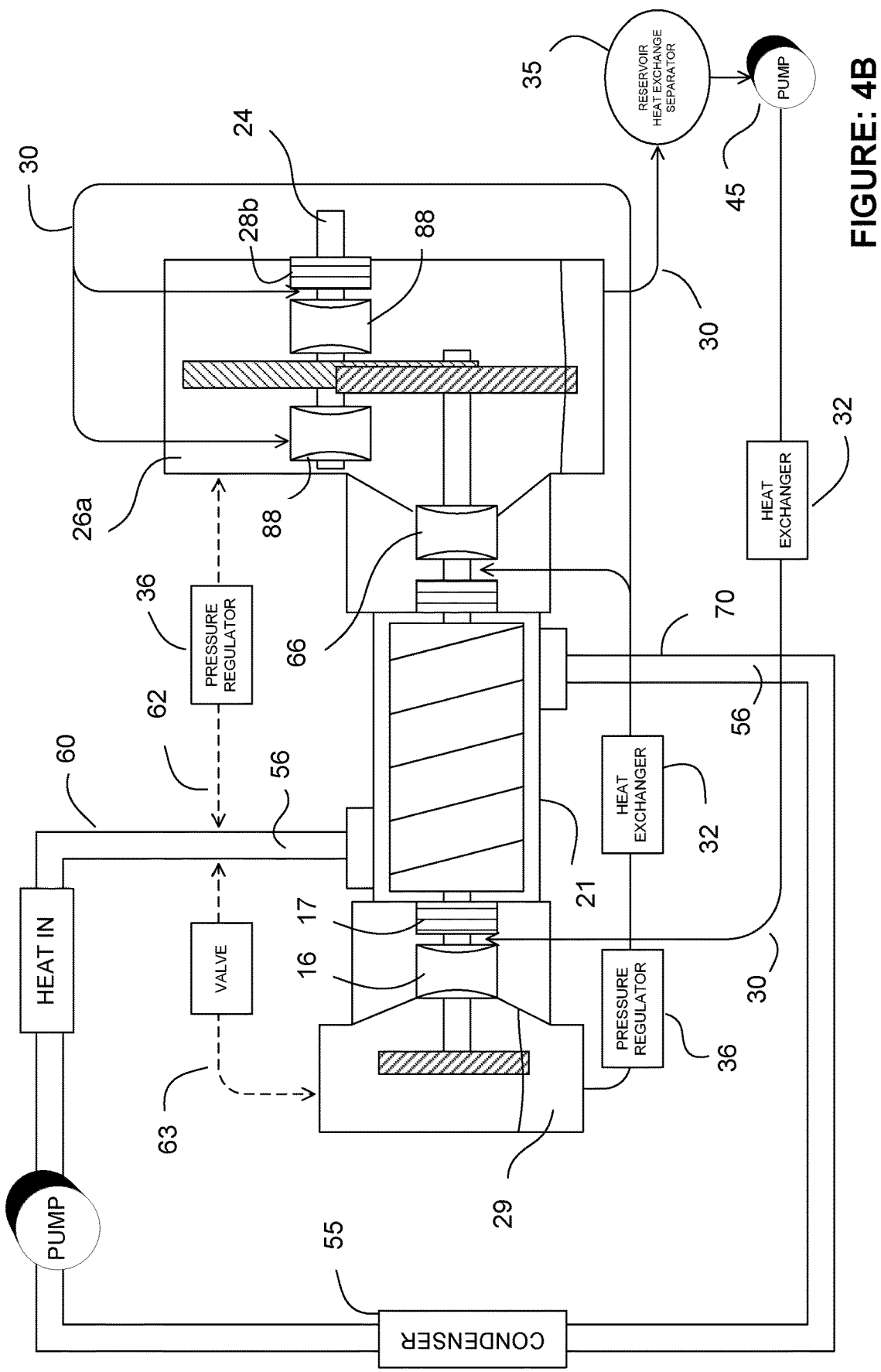
FIGURE: 4B

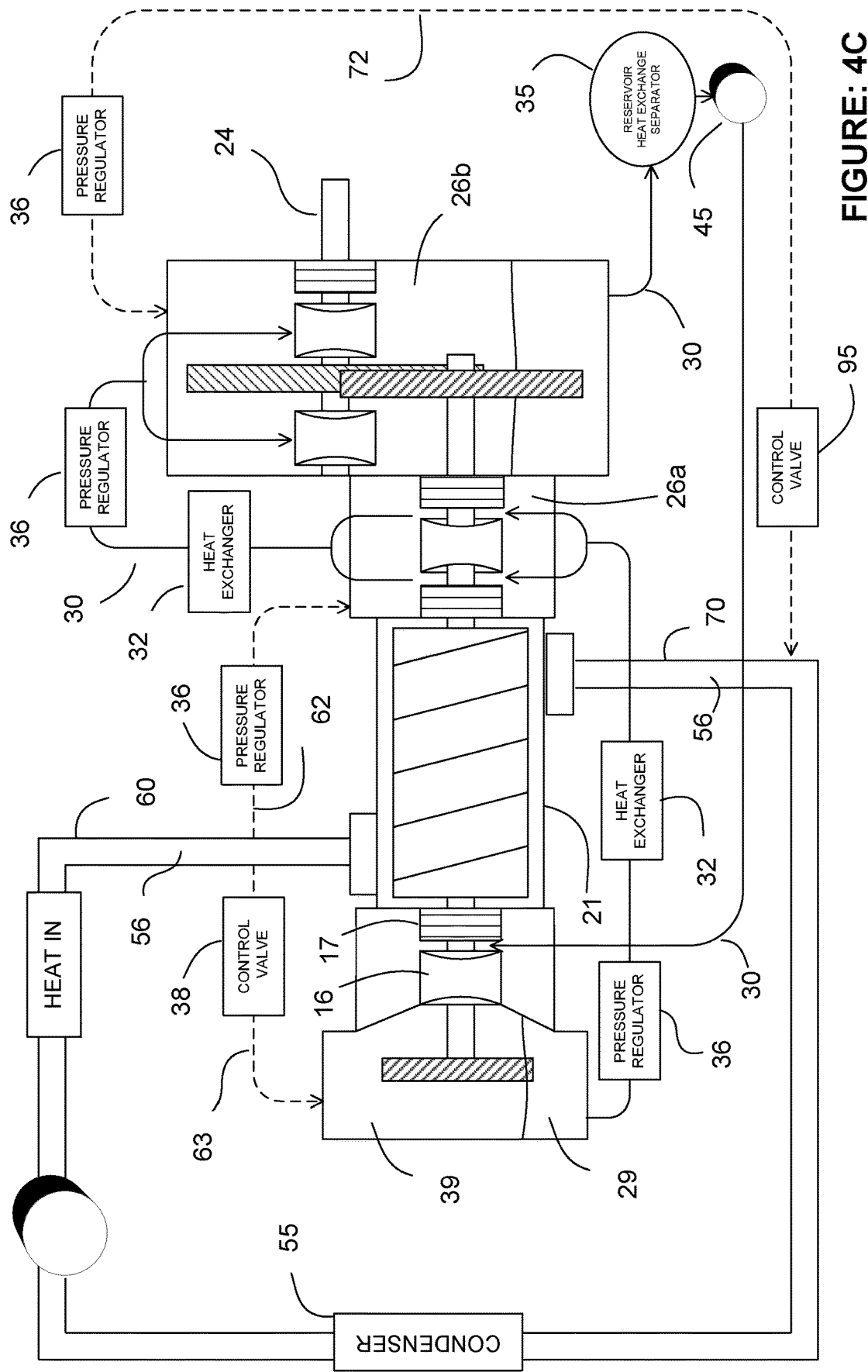
FIGURE: 4C

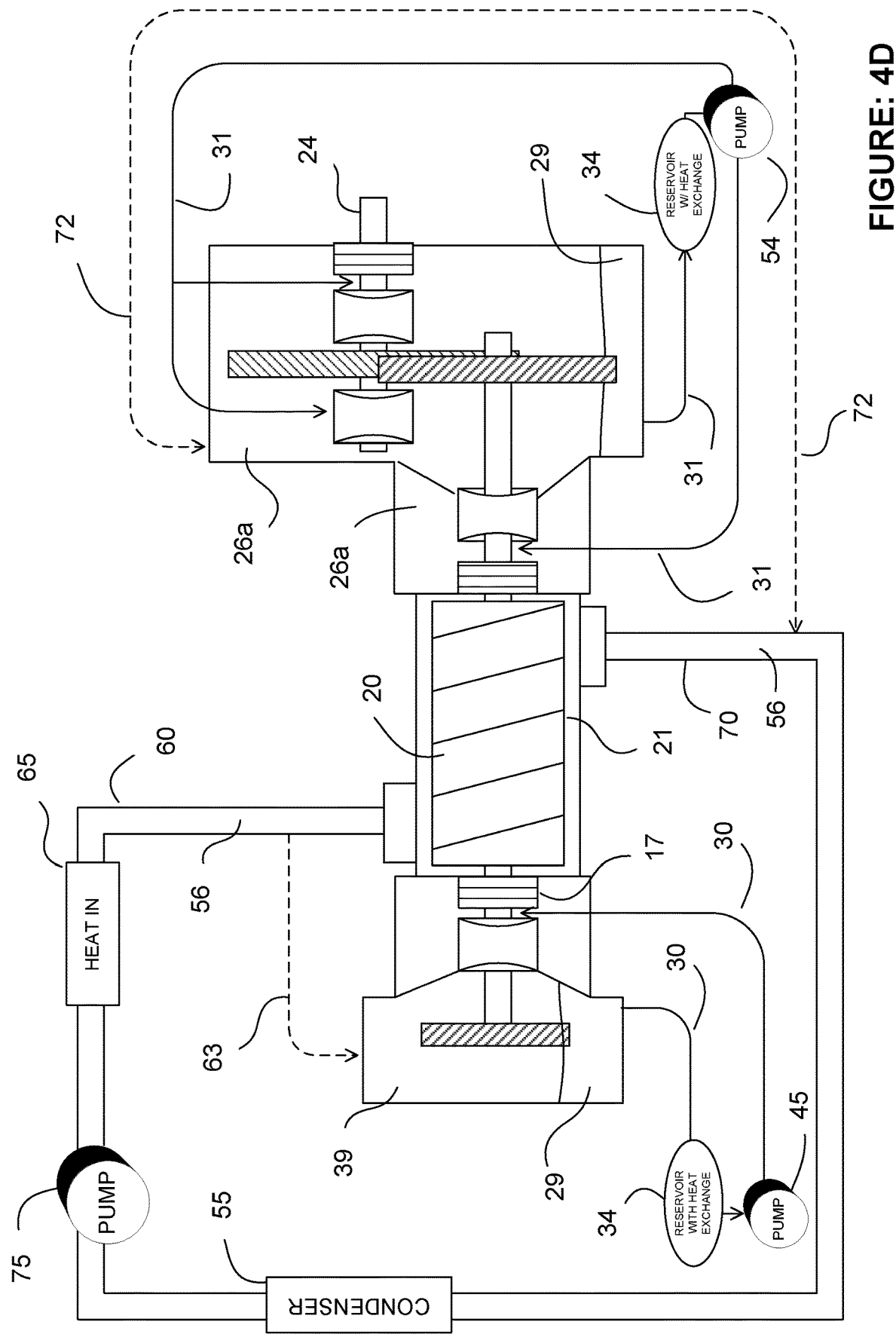
FIGURE: 4D

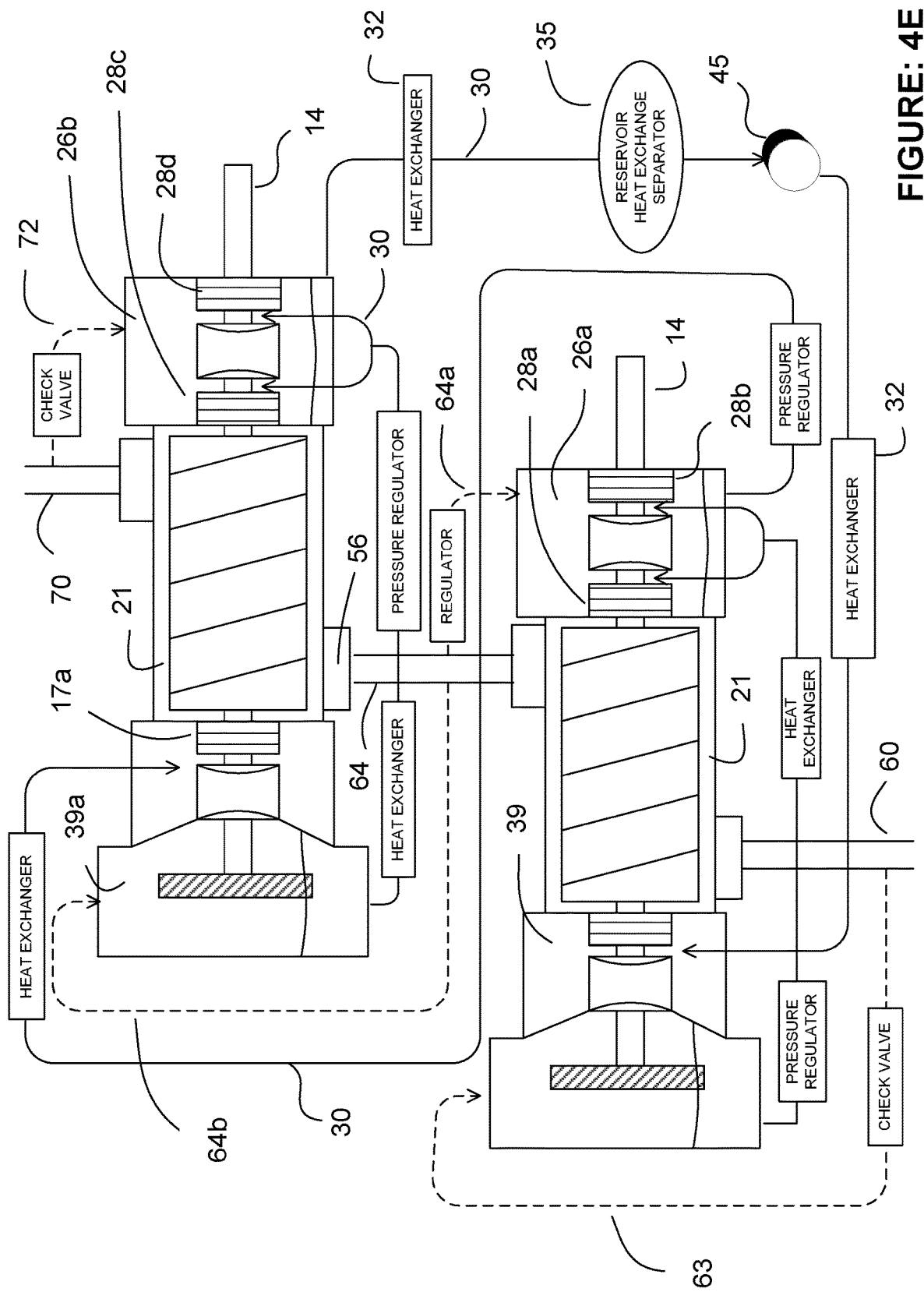
FIGURE: 4E

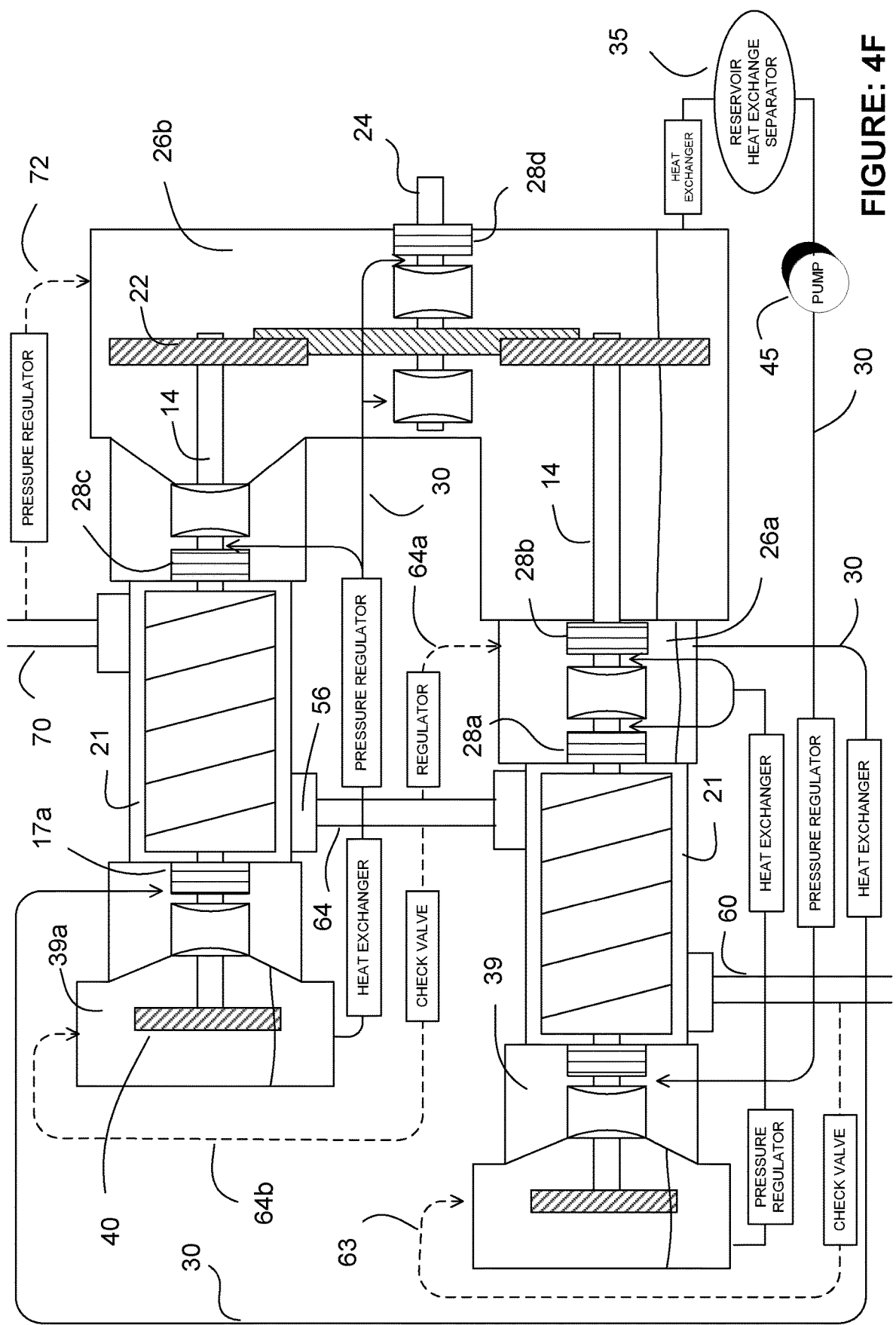
FIGURE: 4F

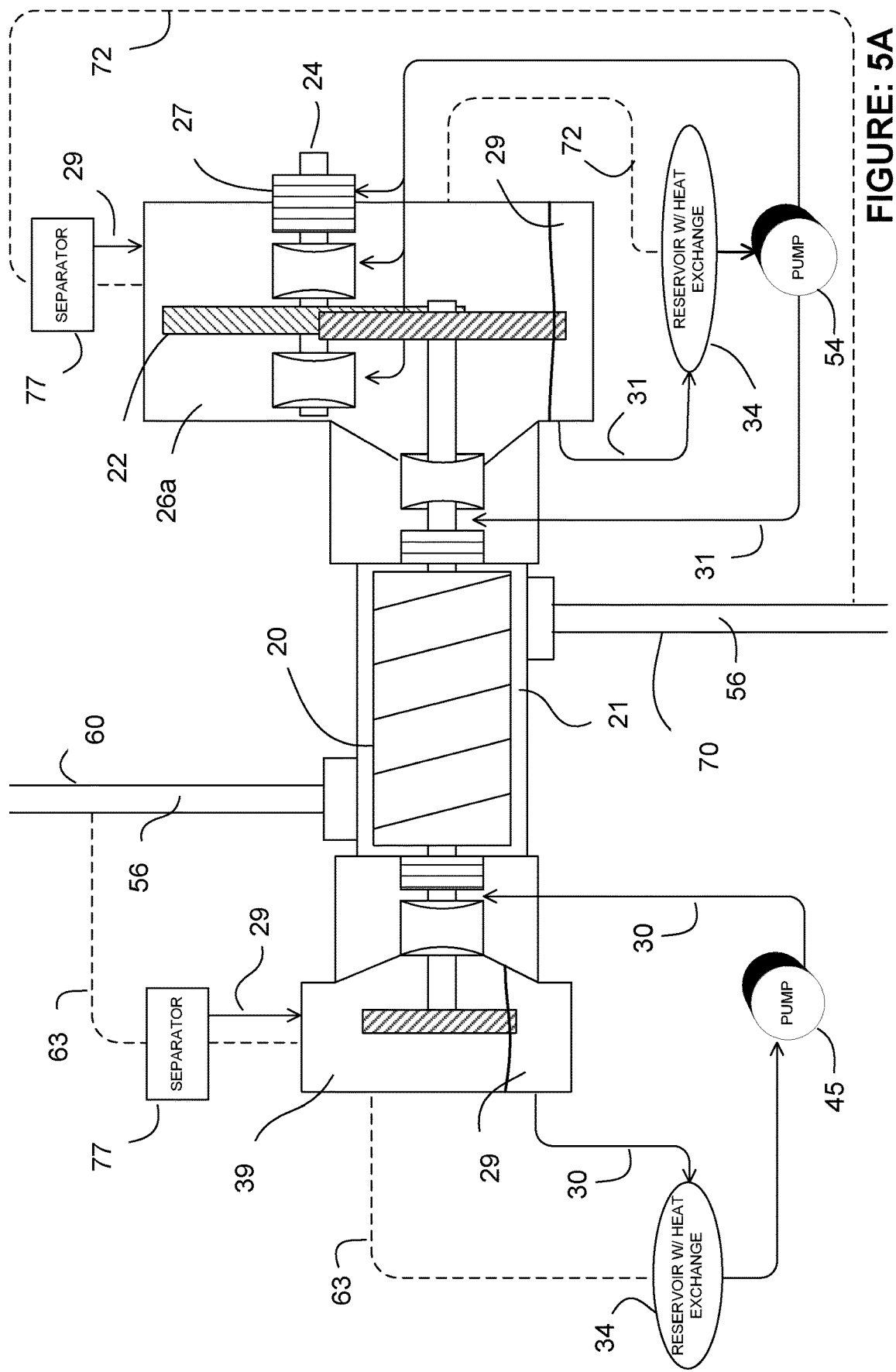
FIGURE: 5A

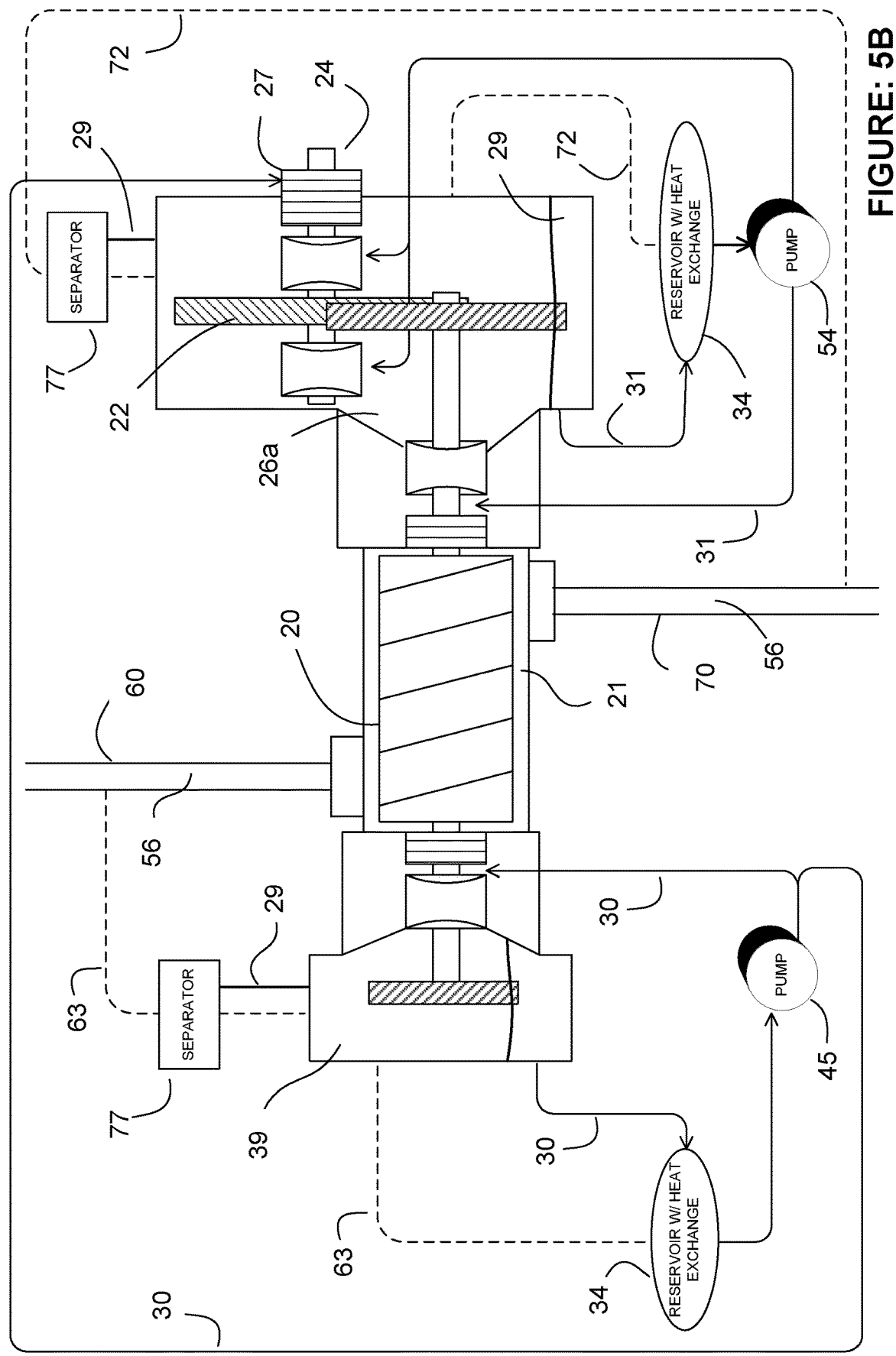
FIGURE: 5B

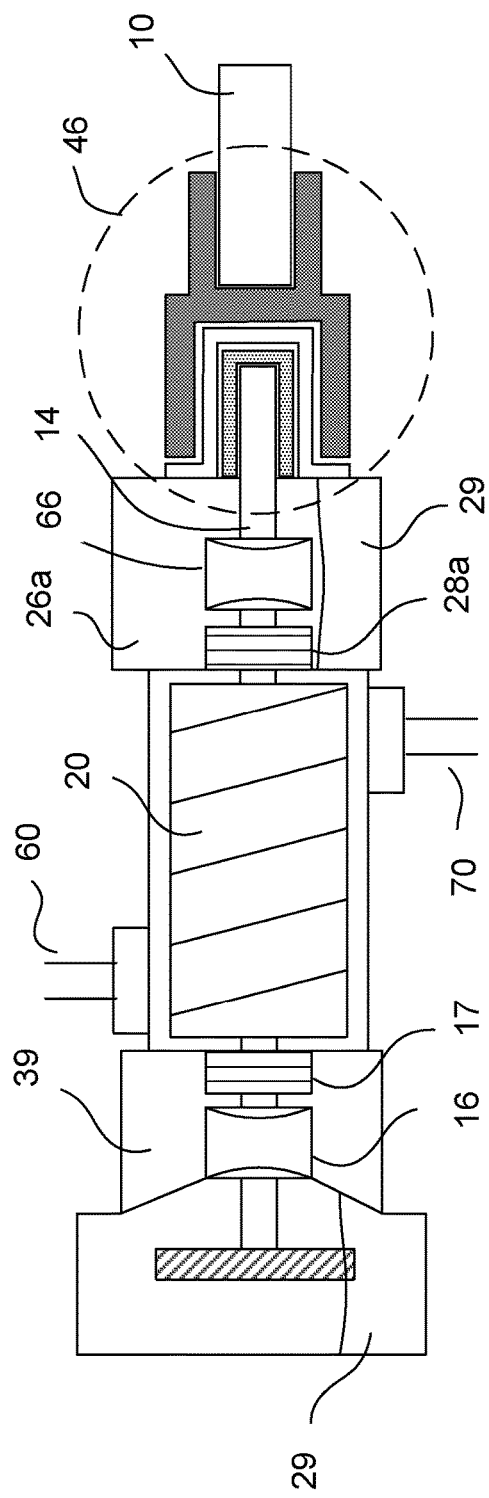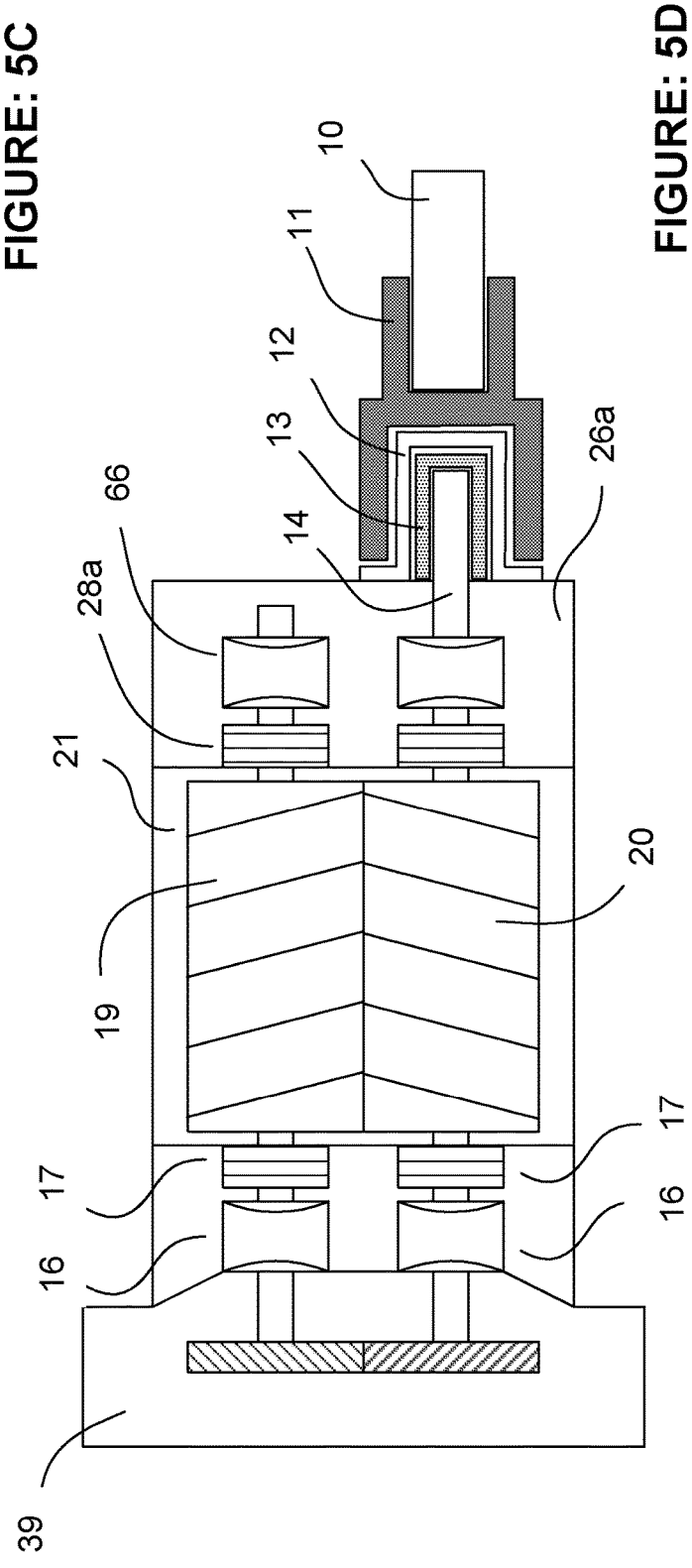

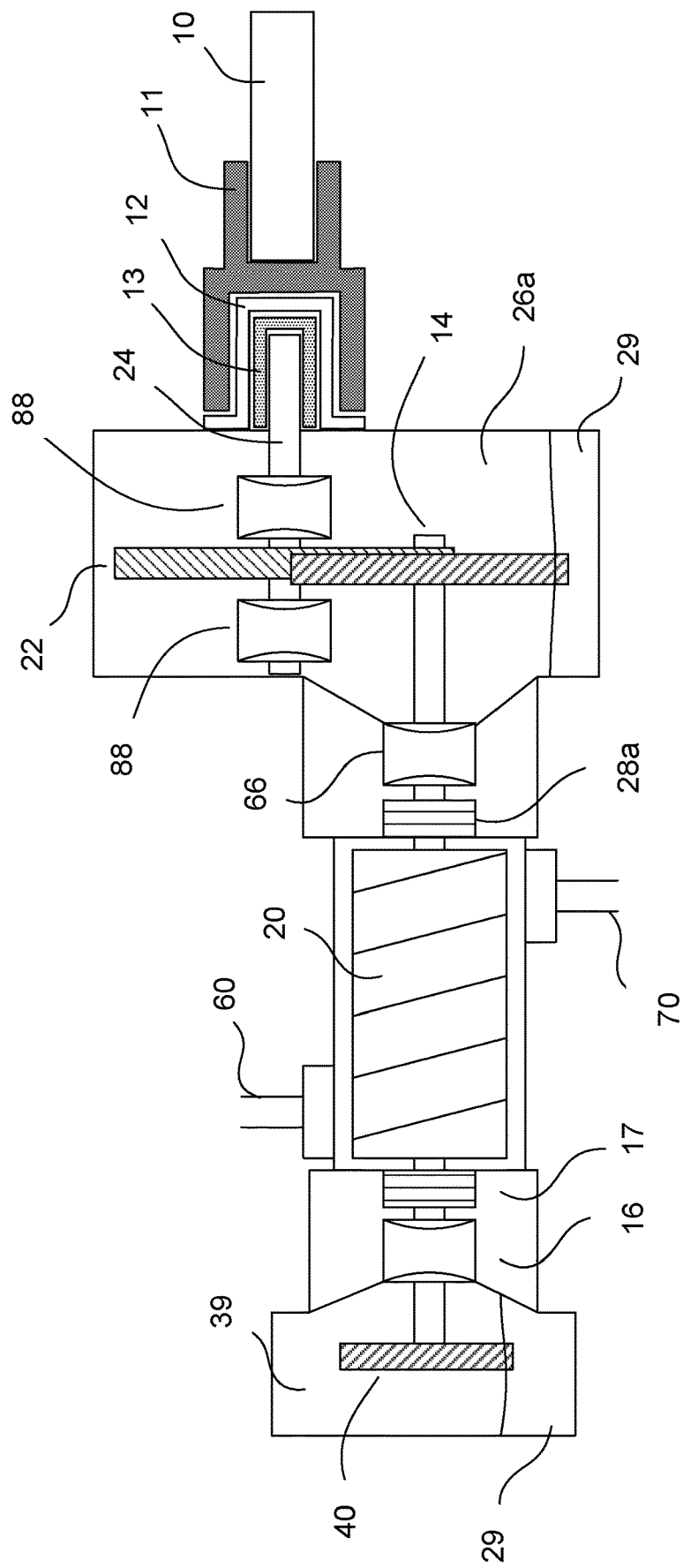
FIGURE: 5E

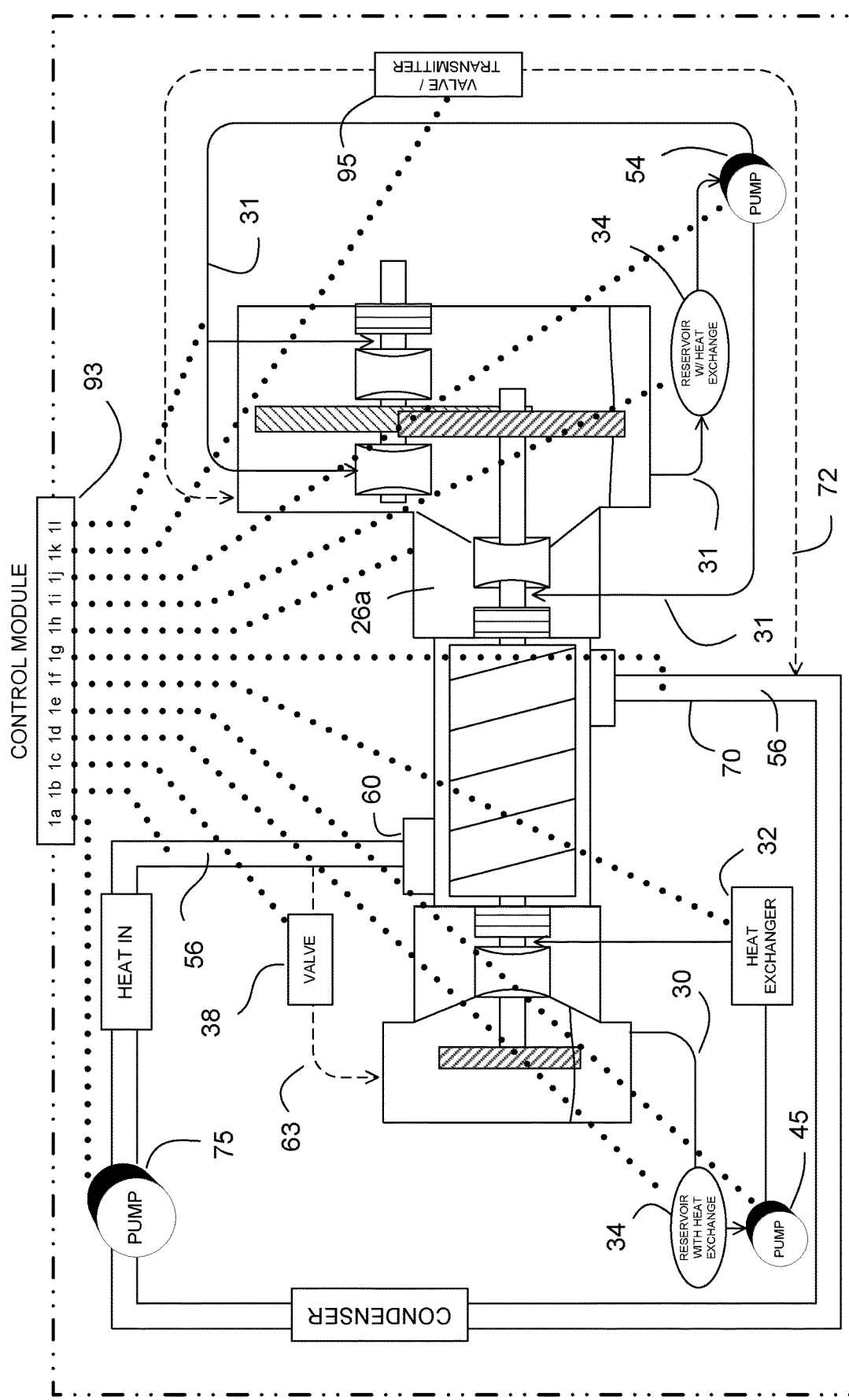
FIGURE: 6

METHODS AND SYSTEMS FOR SEALING ROTATING EQUIPMENT SUCH AS EXPANDERS OR COMPRESSORS

CROSS-REFERENCE TO RELATED APPLICATIONS

This application claims priority to U.S. patent application Ser. No. 14/891,954 filed Nov. 17, 2015 to Victor Juchymenko, titled "Methods and Systems for Sealing Rotating Equipment Such as Expanders or Compressors", to issue as U.S. Pat. No. 10,415,706 on Sep. 17, 2019, which claims priority to PCT Application No. PCT/CA2014/000435, filed May 20, 2014 to Victor Juchymenko, titled "Methods and Systems for Sealing Rotating Equipment Such as Expanders or Compressors," which claims priority to U.S. Provisional Application. No. 61/824,800, filed May 17, 2013, titled "Methods and Systems for Sealing Expanders", both of which are incorporated by reference in their entirety herein.

TECHNICAL FIELD

The present disclosure relates to methods and systems for sealing expanders and compressors, particularly in industrial applications.

BACKGROUND

Throughout this application, expanders and compressors will be referred to as "machines". Seal performance limits are typically categorized by the product of pressure differential across a seal 'P' and a seal interface surface velocity 'V', known as the 'PV' factor for the application. Generally, different seals have differing PV envelopes and limits. These PV envelopes are both seal-type and application specific. One challenge with successful sealing has been operating within the PV limit envelope of the seals, or alternately, finding a seal with a PV limit capacity that is greater than the PV of the particular application. The PV limit is an approximation of the conditions to which a seal will operate, but there may be other factors that influence a seal's capability. Methods for implementing pressure balancing techniques or pressure differential reduction techniques to mechanical sealing arrangements to reduce the PV across seals are also known. For clarity, in this application, pressure balancing or chamber pressure modification will refer to both a reduction in pressure differential across a seal as well as to equalizing pressure across a seal. The below will look to describe a unique combination of pressure balancing seals and pressure cascading approaches to these principles. Use of lip seals, labyrinth seals, mechanical face seals or dry gas seals within expanders and compressors are necessary in "dry" expanders and compressors to keep lubricant separate from process, and are common in rotating equipment.

In addition to PV limits, heat removal from the seal is a critical component to a sealing solution. Often, lubricant that is used to lubricate bearings, gears and other rotating equipment is also circulated onto the seal to assist with lubrication and to remove heat from the seal. That lubricant is then typically externally cooled in a heat exchanger and recirculated back into the rotating equipment. Typically, lubricant circulation systems are vented to atmosphere and do not operate as a pressurized system, under a pressure blanket as will be described below.

In many instances, different types of mechanical shaft seals can accomplish the same PV objective, but may provide other different advantages. Throughout this application, mechanical seals, including but not limited to lip seals, mechanical face seals, dry gas seals, and labyrinth seals, will be referred to as "seals". Generally, lip seals have a lower PV than mechanical seals and are typically better suited for higher speeds (higher V) and lower pressure differentials (lower P) whereas mechanical face seals are typically better suited for lower speeds (lower V) and higher pressure differentials (higher P), although each seal type has its limits whether that be with pressure differential or seal interface speeds. Dry gas seals, also known as non-contacting or dry-running seals, are best suited for sealing gases at high speeds with high pressure differentials where sealing of a vapor is required. Dry gas seals are non-contacting, dry-running mechanical face seals. Labyrinth seals are another (non-contacting) mechanical seal that utilize the principle of providing a difficult and obstructive path for the gas or fluid being sealed. Each step in a labyrinth seal creates eddies which then retard the flow from the pressure differential across the seal. These seals are particularly useful in rotating equipment having high rotational speeds, because they are non-contacting and therefore do not have much, if any, friction.

Methods for implementing magnetic couplings are common in pumps and have been described in scroll compressor applications, typically used in refrigeration systems. Although magnetic coupling use with pumps were initially developed to hermetically seal the pump and the contents of the pump from the drive mechanism, often not to contaminate the product in the pump, the basic principles of isolating the drive from the pump can also be utilized with an expander or compressor to contain vapor from escaping. An example of a magnetic coupling used on an expander would be in a pressure let down expander or from an expander in use with an organic Rankine cycle (ORC) system. In an ORC system, a dry expander would require a lubricating pump to circulate lubricant to the expanders bearings, gears and seals. In the system described below, a process fluid pressure blanket is applied to the lubricant circulation system, and the use of magnetic couplings on the lubricant circulation system pump(s) provides an advantage of not developing leaks to the process through the lubricant circulation system, specifically through the seals on the lubricant pumps.

Shaft seals are typically not required on oil-injected (aka oil-flooded) screw expanders or screw compressors, since the bearings and rotors are lubricated by either delivering lubricant to the bearings, from where it flows to the rotors and then to the exit from the machine, or by mixing the lubricant directly into the process fluid, which then circulates lubricant with the process fluid and lubricates the bearings and rotors as it passes through the machine. The lubricant is then either circulated throughout the system continuously (such as in refrigeration systems), or the lubricant is separated from the process fluid on exit from the rotating equipment machine in a coalescor/separator/mist eliminator (as is done in some natural gas compression applications). Once separated, the lubricant is then re-injected into the bearings and rotors to flow through the expander or compressor. In situations where the process fluid is to remain clean of lubricant contamination, a dry screw machine is a good option because the lubricant is kept separate from the process fluid by mechanical seals. Although a coalescor on an oil-flooded machine may be able to remove almost all of the lubricant, trace amount will remain in the process stream and therefore can contaminate or build up over time in a closed loop process. Contamination is undesirable in processes such as compressing breathing air or in gas separation processes that require a purity to the product being compressed. In pressure let down applications, the pipeline company would find it undesirable to end up with lubricant in their pipeline system and in ORC systems, a build-up can occur and a film of lubricant may develop on the heat exchangers. This lubricant would then reduce the thermal conductivity of the heat exchangers and reduce the overall efficiency of the ORC system. Although refrigeration systems operate almost exclusively with oil-flooded machines, an opportunity may exist to use a dry compressor in refrigeration application. Therefore, an option for a dry expander and compressor has its applications.

Should the machine require a gear box, such that the final drive shaft has a different speed from the machine's rotor shaft, then an integral gear box can demonstrate advantages to an external gear box by applying pressure balancing that will be described below. With an integral gear box, the sealing of the final drive shaft could be sealed with one or more seals in a dynamic sealing arrangement that can wear over time and thereby allow ambient air to make its way into the machine housing or allow working vapor out of the machine to atmosphere. A double mechanical seal is extremely well suited for sealing a final drive shaft. The double mechanical seal can be arranged face-to-face or back-to-back (it is also known as a dual pressurized and dual unpressurized mechanical seal, depending on whether the space in between the two seals is pressurized or not). Throughout this application, a double mechanical seal, whether pressurized or not will be referred to as a "double seal". The advantages of a double seal is that it provides two layers of protection from leaking the system charge to atmosphere as well as provide a visual indication to an operator when the outer seal has started leaking. When the inner seals on a pressurized double seal that is using the systems lubricant to pressurize the double seals cavity leaks, fluid level in the chamber will rise above its normal level thereby indicating the seal is leaking. Should the outer seal leak, it will become visible to an operator and the seal will garner the required attention. Should the machine require an integral gear box, such that the final drive shaft has a different speed from the machines rotor shaft, then a combination of seals, double seals, or a magnetic coupling can be affixed to either the rotor shaft of the machine or the final drive shaft of the integral gear box appended to the expanders/compressors shafts. Similarly, should an integral gear box not be required, the seals, double seals or magnetic coupling can be affixed to the rotor shaft or the machine.

Another solution to prevent loss of process fluid could be the integration of a magnetic coupling to the output shaft. This arrangement is desirable as it: 1) preserves the process fluid thereby saving money, 2) prevents air from entering the machine housing and thereby preventing contamination of the process fluid, and 3) makes the system inherently safe by preventing leaks of potentially hazardous, flammable or explosive process fluids. Magnetic coupling technology has no theoretical size limit but there is a size limit to commercially available magnetic couplings, and therefore the size of machine that becomes coupled with a magnetic coupling is limited in size. Further, magnetic couplings for a fixed physical size have a torque limit before they start slipping and therefore, higher speed with lower torque output shafts can extend the range of a particular size of magnetic coupling, rather than lower speed, higher torque shafts.

A magnetic coupling could also be utilized on the lubricant pump(s) so that the pump(s) can operate at pressures higher than the balancing process fluid vapor. The pump(s) will require the capability of operating with a positive head pressure from the balancing process fluid vapor, in addition to adding a pressure differential to the lubricant so that it will flow to lubricate the various components in the system. To overcome this challenge, replacing pump seals with a magnetic coupling allows the machines lubricant circulation system to operate at higher than normal pressures while at the same time eliminating the risk of a leak point.

Ambient air can make its way into the expander when the pressure on the machine side of a seal is less than atmospheric pressure. This condition can materialize when: 1) the process fluid cools to create a negative pressure and therefore placing the machine chamber in vacuum, drawing ambient air into the equipment, or 2) when the machine undergoes a rapid slow down due to a change in high pressure throttle valve position, negative pressure can be effected on the shafts seals thereby allowing ambient air to make its way past the seals into the process fluid. In closed loop systems such as refrigeration systems and organic Rankine cycle systems, entry of ambient air into the system pollutes the process fluid and reduces the systems efficiency due to non-condensables entering the sealed system. For any type of seal to be effective, it has to leak a nominal amount. These nominal amounts are designed to be minimal.

Another suitable approach to sealing lubricant from the process, and sealing the process from atmosphere, is to design the seals to leak. The direction of leaking can be designed into the system such that the process leaks from the process to the direction of atmosphere. The process fluid that does get past the seal and into the lubricant circulation system can then be separated from the lubricant and circulated back into the process at a lower pressure point in the system, and the lubricant drained back into the lubricant circulation system. Although some efficiency is lost by allowing the process fluid to bleed through the seals and around the machines internal components, it is an effective approach.

U.S. Pat. No. 4,328,684 describes a method for using a magnetic coupling between a twin screw compressor and a twin screw expander for use in a refrigeration system. A wall between the compressor housing and the expander housing contains a magnetic drive that is connected to rotate with the output shaft of the compressor and input shaft of one of the expander rotors so that power can be transferred between the two. U.S. Publication No. 2011/0176948 describes a scroll expander coupled with a magnetic coupling. However, the configurations described therein have numerous drawbacks, and a need therefore exists in the art to find expander sealing solutions that can handle high operational PV ratios and provide inexpensive sealing arrangements in a number of different applications.

The techniques described herein may apply to any number of processes incorporating expanders, including but not limited to Organic Rankine Cycle (ORC) processes, and gas pipeline or steam pressure letdown applications. In the case of compressors, including but not limited to refrigeration, natural gas compression, and air compressor applications. Advantageously, the present techniques may be applied to ORC processes and pressure let down expander applications. More advantageously, the disclosed techniques may be applied to ORC processes. Even more advantageously, the disclosed techniques may be applied to ORC recovering waste heat and/or ORC systems utilizing one or more twin screw expanders. It is also possible, as in the case of a condensing expander, that the processes fluid leaving the expander or the last of a series of expanders may be either a semi-saturated vapor or a liquid.

SUMMARY

For the purposes of simplicity, the term "machine" as used herein throughout this description, and may refer to an expander and/or compressor (whether turbo, screw, scroll, or other suitable configuration). It should be understood by a person of skill in the art that the methods and systems of the present disclosure are equally applicable to both expanders and compressors and that such embodiment are encompassed by the scope of the present disclosure.

The machines disclosed herein can be any type of expander or compressor known in the art, including, but not limited to single screw, twin screw expanders, turbo and scroll expanders, or compressors. The techniques disclosed herein are advantageously suited to rotating equipment machines that use bearings requiring lubricant, although they could also be applied to non-lubricated, oil-less, applications where sealing is desired. In the previous case, the seals typically separate the bearings, lubricated by lubricant, from the process fluid vapor.

The techniques disclosed herein also apply to machines with and without a speed altering transmission or gear box, and may also apply to seals found in expanders or compressors. The types of seals to which the present disclosure can apply are not limited and can include: lip seals, labyrinth seals, mechanical face seals or dry gas seals. The machines of the present disclosure may or may not have a gear box attached at an input or output shaft end, as the case may be. The shaft horse power that is produced by an expander can be used for power generation amongst other uses such as driving a pump, a fan or a compressor. If the machine were to be operated as an expander where pressurized process fluid was piped into the expander machine such that the internal components rotate due to a pressure drop experienced through the machine, thereby turning the shaft, and the machine was then to be operated in the opposite direction by turning the shaft of the machine to create pressure differential, that machine would then be operating as a compressor.

The machines, and more advantageously twin screw machines, related to the present disclosure can have any number of configurations. They may include magnetic couplings, gear boxes, transmissions, combination of seal types, pressure balancing systems, pressurized lubricant circulation systems, condensing and non-condensing expanders or the systems may incorporate multiple machines in parallel or in series.

As will be appreciated in the disclosure below, multiple embodiments are disclosed for pressure balancing and pressure cascading using process fluid, directional flushing of seals, load shifting (utilizing sequential pressure chambers), speed reduction of output shaft, pressurized lubricant circulation systems, pressure cascade to drive lubricant to lower pressure chambers, pressure cascading to reduce load on seals, sealing of output shafts, heating vs. cooling of lubricant and associated control modules.

BRIEF DESCRIPTION OF THE FIGURES

The present disclosure will become more fully understood from the detailed description given hereinbelow and the accompanying drawings which are given by way of illustration only, and thus, do not limit the present disclosure, and wherein:

FIG. 1A, in conjunction with FIGS. 1B-1F, together illustrate various embodiments of pressure balancing and cascading using process fluid, where FIG. 1A illustrates one embodiment of an expander/compressor with no use of chambers for pressure balancing or pressure cascading from process;

FIG. 1B illustrates an embodiment utilizing the configuration of FIG. 1A together, with single chamber on either end of the machine, with the high-pressure (HP) chamber sealed from atmosphere, and no pressure balancing or pressure cascading;

FIG. 1C illustrates an embodiment utilizing the configuration of FIG. 1A together with single HP and single low-pressure (LP) chamber ends sealed from atmosphere, with no pressure balancing or cascading but PV load shifting on LP end with two seals;

FIG. 1D illustrates another embodiment showing pressure balancing lines from the process into the machines HP and LP gear chambers;

FIG. 1E illustrates another embodiment utilizing the configuration of FIG. 1D with the addition of separators to separate lubricant from the process fluid;

FIG. 1F illustrates another embodiment showing valves and a pressure regulator to reduce pressure between process tap and gear chamber;

FIG. 2A illustrates an exemplary embodiment for directional flushing of seals utilizing an expander/generator arrangement to allow seals to leak, where an exemplary process is to leak past the seals into the chambers, then tie in the chambers to a lower pressure point in the process so as to return the process fluid to the process and the lubricant to the lubricant circulation system;

FIG. 3A, in conjunction with FIGS. 3B-3J, together illustrate various embodiments of PV-load shifting (sequential cascading pressure chambers), where FIG. 3A illustrates the configuration of utilizing a double seal on an output shaft;

FIG. 3B, illustrates an exemplary embodiment having an integral gear box vented to atmosphere with a single chamber on both HP and LP end, with no pressure balancing, and no PV load sharing;

FIG. 3C, illustrates an exemplary embodiment having an integral gear box with a single chamber on both HP and LP end, and no pressure balancing, but with PV load shifting over two seals on LP end;

FIG. 3D illustrates an exemplary embodiment having an integral gear box with single chamber on both HP and LP end, with no pressure balancing and no PV load shifting as low pressure end is open to atmosphere;

FIG. 3E illustrates an exemplary embodiment having three chambers (one HP and two LP chambers), with no pressure balancing and therefore no PV load shifting over the seals on LP end, with a last chamber open to atmosphere;

FIG. 3F illustrates an exemplary embodiment having the configuration of FIG. 3E with PV load shifting set up to operate over three seals on a LP end;

FIG. 3G illustrates an exemplary embodiment having the configuration of FIG. 3F with pressure balancing (similar to FIG. 1D) and utilizing a systems pressure to PV load shift over the seal in the LP end chamber;

FIG. 3H illustrates an exemplary embodiment having the configuration of FIG. 3F in a system utilizing pressure balancing for each of the three chambers, and demonstrates PV load shifting, pressure cascade and pressure balancing;

FIG. 3I illustrates an exemplary embodiment having two machines in series comprising pressure balancing with check valves, wherein if the machines were viewed as expanders, the discharge from the first higher pressure machine becomes the inlet pressure to the second lower pressure machine, therefore the overall pressure drop from initial inlet to atmosphere is spread over multiple machines (each with multiple seals and pressure chambers to drop the pressure over);

FIG. 3J illustrates an exemplary embodiment having the configuration of FIG. 3I comprising pressure regulators, valves, a common drive gear with a rearranged pressure drop from inlet to final discharge over multiple machines in series, where common pressure is utilized from a final chamber to the first and second machine;

FIG. 4A, in conjunction with FIGS. 4B-4F, provide various embodiments of pressurized lubricant circulation systems, where FIG. 4A illustrates an exemplary embodiment comprising a machine with splash lubrication without a lubricating pump and incorporates pressure balancing techniques and PV load shifting on the LP end;

FIG. 4B, illustrates an exemplary embodiment having a single lubricant circulation system with a single pump, where the lubricant pump advantageously pumps higher pressure than the pressure in HP chamber to have lubricant flow, wherein lubricant is injected into the HP chamber to lubricate the bearings, gears and seal, and then drains to the bottom of the HP chamber, and system pressure in the HP chamber pushes lubricant to LP chamber bearings/seals, and wherein lubricant then drains back to the pump;

FIG. 4C illustrates an exemplary embodiment comprising a single lubricant circulation system feeding lubricant to both the high pressure end similar to FIG. 4B and then with pressure cascading the lubricant is pushed into the first low pressure end of the machine, and then subsequently the lubricant is pushed into the lowest pressure chamber, where pressure balancing is achieved on 3 chambers and the lubricant is pushed by a single pump to all chambers;

FIG. 4D illustrates an exemplary embodiment comprising two lubricant circulation systems configured to have one for HP chamber pressure, and a second for LP chamber pressure, where pressure balancing is applied to each chamber from the process, where each pump operates at a pressure higher than the chamber pressure into which it pumps lubricant;

FIG. 4E illustrates an exemplary embodiment having the configuration of FIG. 3I with the addition of a single lubricant circulation system, wherein lubricant pressure is commensurate with pressure balancing pressures, and wherein both pressure and lubricant cascade down, working through the system, wherein the lubricant temperature is inversely correlated to pressure such that, as the lubricant works its way through the process, its temperature will rise;

FIG. 4F illustrates an exemplary embodiment having the configuration of FIG. 3J and comprising a single lubricant circulation system functioning similarly to the lubricant circulation system described in FIG. 4E;

FIG. 5A, in conjunction with FIGS. 5B-5E illustrate various embodiments of drive shaft sealing techniques, where FIG. 5A is one embodiment showing LP lubricant system injection into a double seal on the final drive shaft, along with a combination of multiple integrations;

FIG. 5B illustrates an exemplary embodiment having the configuration of FIG. 5A with HP lubricant system injection into double seal on the final drive shaft, in place of the lower pressure lubricant circulation system, along with a combination of multiple integrations;

FIG. 5C illustrates an exemplary embodiment comprising magnetic coupling on a machine rotor shaft;

FIG. 5D illustrates an exemplary embodiment comprising magnetic coupling on a twin screw machine rotor shaft;

FIG. 5E illustrates an exemplary embodiment comprising magnetic coupling on the final drive shaft of the integrated gear box of the expander/compressor; and FIG. 6 illustrates an exemplary embodiment comprising a control module for monitoring: temperature, pressure and flow of lubricant and process fluid in the chambers, and for controlling: pump(s), pressure in the chambers, and flow to heat exchanger(s) (air or liquid) for either heating or cooling the lubricant.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Some rotating equipment operating pressures are restricted by that equipments internal seals ability to contain the pressure at that equipments pressure differential and rotating speed. Provided that the rotating equipments housings are capable of containing pressure required in the equipment and associated chambers, pressure balancing along with load shifting across multiple seals, along with integral pressure containing gear reduction, the pressure capacity of that same equipment could be broadened. Many housings are not designed to contain pressure in the gear or bearing chambers, or higher pressures in the main housings, but with modified housings and chambers (by use of thicker castings or stronger materials), and with lubricant circulation system modifications, equipment that is pressure limited due to the limitations of the seals, could operate at a higher pressure, and thereby increase the duty from that same equipment.

Pressure Balancing and Cascading Using Process Fluid

As used herein, the term process fluid 56 may refer to a propellant, also known as vapor, gas, charge, fluid or other energetic materials travelling through a machine. With reference to any one of FIGS. 1F, 2A, 3G, 3H, 4A, 4B, 4C, 4D, and 6, where an ORC system is depicted with an expander, the process fluid 56 may be in the form of a liquid as it leaves the condenser 55 and through process fluid pump 75. In passing from the pump as a liquid and into the ORC heat exchanger 65, the process fluid 56 may be evaporated in the ORC heat exchanger 65 to a vapor and enters the machine 21 via high pressure process pipe 60 as a vapor.

As is illustrated in FIGS. 1D-1F, multiple embodiments are provided, illustrating pressure balancing and pressure cascading using process fluid. As mentioned above, the present disclosure relates to methods utilizing the pressure of the vapor which is intended to be contained on the process side of a seal to balance the other side of the seal with that process fluid. Although the above describes an ORC system for producing process fluid in vapor form, if the machine were operated in the opposite direction as a compressor, then the pressure balancing process fluid source would be from the compression process. The principle is referred to herein as "pressure balancing" the seal. Most pressure balancing techniques employ inert gases as the pressure balancing medium. The embodiments described herein allows pressure balancing without necessarily introducing additional fluids or gases, other than the process fluid 56 and the lubricant 29 from the system.

In one exemplary embodiment, the pressure differential may be reduced across high pressure seals 17 and low pressure seals 27, 28a, 28b or 28c, if applicable, in the machine 21 by using the existing pressure from process fluid 56, which then would reduce the PV factor on the seals by reducing the pressure differential component across some seals and redistributing the PV factor onto other individual or multiple seals. One method of reducing the PV across a seal, by reducing the pressure differential across a seal, is to divide the overall pressure load between more than one seal or by shifting the load from a singular seal to multiple seals. This can be accomplished by pressurizing the chambers 39 on the high pressure end of the machine 21 or on the low pressure end 26a or 26b, if applicable, on the low pressure end of the machine 21. Another method is to utilize pressure in the process fluid 56 to pressurize one or more chambers 26 and 39 and thereby reducing the pressure differentials across high pressure seals 17, and low pressure seals 27, 28a, 28b and 28c, if applicable. The process fluid 56 pressure from either the high pressure process pipe 60, the low pressure process pipe 70, or other parts of the process can be utilized via a pressure balancing line(s) to alter the pressure in the chambers on either end of the machine. The number and arrangement of chambers 26 and 39 on either end of the machine can be structured to effect load shifting between the seals.

In the FIGS. 1D-1J, 4A-4F, 5B, and 6, pressure balancing to chamber 39 is provided by high pressure balancing line 63 connecting chamber 39 to high pressure process pipe 60. Because it is desirable to equalize or cascade the pressure downwards in the pressure chambers to have effective leaking of the seals, the pressurization of chamber 39 can be pressurized from a lower pressure point in the machine or the process. For example, chamber 39 can be pressurized directly by, or indirectly through another component of the machine or process, such as by low pressure process pipe 70, or process piping between low pressure process pipe 70 and the pump 75. Note, the larger the pressure differential across seal 17 is, the larger the PV is on seal 17. Also, chamber 39 can be pressurized by line 63 with a pressure regulator to reduce the pressure in chamber 39 should it be desirable to be lower than the process to facilitate flow away from the process towards atmosphere. Similarly, chambers 26a, or 26b can be pressurized by any process fluid source in the machine or the process, whether higher, lower or equal pressure, provided that a high pressure source is regulated down to be less than or equal to the pressure in the process or chamber that is "upstream" of the current chamber being pressurized, such that the pressure is equal or it continues to drop to cascade toward atmosphere, which is referred to herein as "cascading."

FIG. 1A provides an exemplary embodiment illustrating a machine 21 with the chambers 39 on the high pressure end is open to atmosphere 44 and chamber 26a on the low pressure end is also open to atmosphere 44. The concept of pressure balancing does not apply to this configuration because the chambers 26a, 39 are not capable of containing any pressure (as they are open to atmosphere 44). Because pressure cannot be contained in the chambers, cascading with pressure cannot be applied. FIG. 1B shows machine 21 as in FIG. 1A, but where the high pressure chamber 39 is closed to atmosphere 44 and is capable of containing pressure. Thereby, in this configuration, chamber 39 is suitable for application of pressure balancing described herein, where chamber 26a is not because it is vented to atmosphere. FIG. 1C shows the same machine 21 as FIG. 1B with the low pressure end being sealed, such that both the high pressure chamber 39 and the low pressure chamber 26a are capable of containing pressure and thereby pressure balancing can be applied with the addition of pressure balancing lines, and load shifting of the seals on the low pressure end of the machine can be applied. As shown in FIG. 1D, process fluid 56 entering the machine 21 through high pressure process pipe 60 and exits the machine 21 through the low pressure process pipe 70 at a lower pressure than it entered the machine. The pressure drop will be developed as the rotating element 20 is rotated by the pressure differential, where the pressure at the high pressure process pipe 60 is greater than pressure at the low pressure process pipe 70.

The rotating element 20 is coupled to, and may rotate in unison with, the rotor shaft 14. Each machine may have its own propulsion device, for example, in a screw machine (single or double), the rotating element would be a helical screw component, in a turbo machine, the rotating element would be the turbine blades, and in a scroll machine it would be the scrolls. Supporting the rotor shaft 14 are bearings 16 on the high pressure side of the rotating element 20 and bearings 66 on the low pressure side of the rotating element 20. As shown in FIG. 3B, between the respective bearings 16 and 66 is the rotating element 20, and on either side of the rotating element 20 are the high pressure seals 17 and the low pressure seals 28a and 28b. Between bearing 16 and the rotating element 20 is seal 17 on the high pressure side. Between bearing 66 and the rotating element 20 is seal 28a on the low pressure side. The diagrams presented refer to all seals on the low pressure end of the machine 21 by the number 28, then further depicted with a vowel indicating the series the seal is in. As example, 28a refers to the seal nearest to the rotating element 20, followed by the second-nearest as 28b, etc.

The high pressure end of the machine 21 may have a high pressure chamber 39 which will contain lubricant 29. The low pressure end of the machine 21 will have a low pressure chamber 26a, and in multi-chamber applications, 26a and 26b. Similar to the low pressure seals 28 on the low pressure end, the chambers 26 on that end will be depicted with a letter indicating the chambers sequential distance from the rotating element 20. As an example, if the low pressure end of the machine 21 has two chambers 26, the chamber nearest to the rotating element 20 will be referred to as low pressure chamber 26a, and the chamber further away from the rotating element 20 will be referred to as low pressure chamber 26b. Should another chamber be appended to the low pressure end of the machine 21, it would be referred to as chamber 26c. The above assumes that the drive shaft 24 is on the low pressure end of the machine 21. Should the drive shaft 24 be on the high pressure end of the machine 21, the load shifting concept will be employed on the high pressure end of the machine 21, such that the chambers would be labeled 39a, 39b, etc. and the seals would be labeled 17a, 17b, 17c, etc.

As shown in the exemplary embodiment in FIG. 1D, the machine 21 may comprise an integrated gear mechanism 22 contained within chamber 26a. In an expander configuration, the rotor shaft 14 turns a drive gear which then turns another gear that provides resulting shaft power out of the output drive shaft 24. The output drive shaft 24 is supported by bearings 88 on both sides of the integrated gear mechanism 22. The rotor shaft 14 has seals 28a and 28b designed to contain the lubricant 29 and process fluid 56 within low pressure chamber 26a. The output drive shaft 24 has seal 28b and seal 28c designed to contain the lubricant 29 and process fluid 56 within low pressure chamber 26b. In a compressor configuration, the drive shaft 24 would be turned and the gear(s) of the integrated gear mechanism 22 which would then turn the rotor shaft 14. As shown in FIG. 1D, the high pressure chambers 39 may be connected to the high pressure process pipes 60 by pressure balancing lines 63, and the low pressure chambers 26 is connected to the low pressure process pipes 70 by pressure balancing lines 72. Pressure balancing line 63 will allow process fluid 56 to pass to and from the high pressure process pipe 60 into the high pressure chamber 39. Similarly, a pressure balancing line 72 will allow process fluid 56 to pass to and from the low pressure process pipe 70 to the low pressure chamber 26a. In the case where a separator is utilized between the process piping and the chambers, the separator is designed to remove lubricant 29 from the process fluid 56 that passes through the pressure balancing lines. Lubricant recovered by the separator 77 will be drained by to the respective chamber and the process fluid will flow from higher pressure to lower pressure. A resulting effect on the high and low pressure seals 17 and 28a, and 28b is that the reduced pressure differential across the high pressure seals 17 and low pressure seals 28a and 28b, or seals 28a and 27, if application of a double seal is selected, results in a lower PV than if the pressure balancing and thus pressure cascading and PV load shifting techniques were not applied.

As shown in the example of FIG. 1E, pressure balancing lines 63 and 72 allows flow of process fluid 56 from the high and low pressure process pipes 60 and 70 to the high and low pressure chambers 39 and 26a, respectively, to facilitate pressure balancing. In this configuration, any process fluid 56 in pressure balancing lines 63, 72 passes through a separator 77, also known as a coalescor or mist eliminator, before draining back to the respective high or low pressure chambers 39, 26a. The separator 77 is designed to prevent lubricant 29 from entering the high and low pressure process pipes 60, 70 and to drain back to the high and low pressure chambers 39, 26a, while still allowing the flow of process fluid 56 to and from the high and low process pipes 60, 70. FIG. 1F shows a variation on pressure balancing lines 63 and 72 shown in FIG. 1E. In FIG. 1F pressure balancing line 63 is tied into the high pressure process pipe 60 and connects to high pressure chamber 39 through a valve 38, and pressure balancing line 62 in this configuration is connected to high pressure process pipe 60 through a valve 38 and a pressure regulator 36.

The high pressure end of the rotating element 20 is at or near the pressure at the high pressure process piping 60 on the high pressure end of the machine 21. The high pressure seal 17 is typically located in chamber 39 between the high pressure bearing 16 and the high pressure chamber end of the machine 21. On the other end of the rotor shaft 14, at the low pressure end of the machine 21, there is also, typically, a low pressure seal(s) 28 located between the rotating element 20, and the lubricant 29 used to lubricate low pressure bearing(s) 66. The low pressure chamber 26a is utilized to reduce the PV on the low pressure seal(s) 28a. Low pressure seal(s) 28b may be located between the low pressure chamber 26a and atmosphere 44 or, in cases with multiple pressure reducing chambers, between chamber 26a and lower pressure chamber 26b. The rotor shaft 14 typically refers to the higher speed shaft directly coupled to the rotating element 20, whereas the drive shaft 24 typically refers to the lower speed shaft coupled to the rotor shaft 14 by an integrated gear mechanism 22 or other power transmission device. The machine 21 may have an integrated gear mechanism 22 that is straddled by low speed low pressure bearings 88 and that turns the drive shaft 24. The low pressure chamber 26a may be sealed from the atmosphere 44 by low pressure seals 28b, or open to atmosphere 44 by a vent. The lubricant 29 serves to lubricate the moving (rotating) components and to remove heat from the bearings, gears and high and low pressure seals 17, 27, 28. High and/or low pressure seals 17, 27, 28 in any of these configurations can benefit from the present disclosure.

FIG. 1F illustrates an exemplary embodiment applied to an organic Rankine cycle (ORC) process. It also shows that the balancing pressure can come from various points in the process and do not necessarily have to come from the exact pressure on the other side of the seal. The other concept shown in the figure is that pressure can be taken from a higher-pressure point in the process and its pressure be reduced through a regulator 36. The setting of the regulator 36 will be set to be near the pressure of the low pressure process piping 70 so that the pressure differential across low pressure seal 28a is reduced and the resulting PV of the low pressure seal 28a reduced. If a higher pressure exists in low pressure chamber 26a than in the low pressure process pipe 70, then the low pressure seal 28a would tend to leak from the low pressure chamber 26a into the low pressure process piping 70. This is an undesirable direction of leakage as leakage is preferred in the other direction—from the low pressure process pipe 70 pressure (the process) to the low pressure chamber(s) 26. Regardless of leak direction, the concept of pressure balancing does reduce the load on the seals. As the pressure differential across a seal increases, so does the PV and therefore wear on the seal also increases, which is inversely proportional to the life expectancy of the seal.

This structure shows the benefit of the pressure balancing method shown in FIGS. 1D and 1E where the pressure in the high and low pressure chambers 39, 26a changes with the pressure in the high and low pressure process pipes 60, 70, thereby automatically adjusting the pressure in the high and low pressure chambers 39, 26 as the process pressures fluctuate and thus the pressure in the chambers follow the pressure changes in the high and low pressure process pipes 60, 70. By utilizing a pressure regulator 36 (as shown in FIG. 1F), the pressure on the downside of the pressure regulator 36 in pressure balancing line 62 will operate at the set-point of the regulator 36 and thus will not change as the pressure in the low pressure process pipe 70 changes which may result in an undesirable leak direction of the process fluid and lubricant. Particularly during start-up and shut-down conditions, the pressures in the process piping will vary. Also with seasonal changes and ambient air temperatures, the low pressure process pressure will fluctuate and therefore using a regulator may make it difficult to achieve the desired pressure cascade. Without a regulator (as shown in FIGS. 1D and 1E), the PV of the low pressure seals 28 will change as the pressure across the low pressure seals 28 will change with the pressure in the low pressure process pipe 70. This illustrates an advantageous distinction between using external gases for pressure balancing, as the external gases will be controlled by a regulator and will not change as the pressure conditions in the process change. Also, if the cascading direction is toward the process with an external gas, the possibility exists to leak that external gas into the process.

As shown in the examples of FIGS. 3I and 3J, the pressure balancing concept can be applied to machines connected to process fluid flow through machines in series. The concepts can also be applied to individual machines that have their process piping connected in parallel. When connected in series, the rotor shafts 14 for each machine can be individually operated as showing in FIG. 3I, or the rotor shafts 14 can be combined to operate a common singular drive shaft 24 as showing in FIG. 3J.

The pressure balancing can be applied from various points in the process piping to a chamber or from one chamber to another chamber or from one chamber to another point in the process. As an example, and as shown in FIG. 3I, the high pressure chamber 39 on the higher pressure machine is balanced with process fluid from high pressure process pipe 60 with pressure balancing line 63. The low pressure chamber 26a for the first (higher pressure) machine is balanced with process fluid from the medium pressure process pipe 64 with pressure balancing line 64a. The process fluid in the medium pressure process pipe 64 is also used to pressure the high pressure chamber 39a with pressure balancing line 64b on the second (lower pressure) machine. The low pressure chamber 26b for the second (lower pressure) machine is balanced with process fluid from the low pressure process pipe 70 with pressure balancing line 72. As described above, the low pressure chamber 26a for the first (higher pressure) machine, the high pressure chamber 39a for the second (lower pressure) machine, and the low pressure chamber 26b for the second (lower pressure) machine can be pressure balanced by any source pressure (with or without the assistance of a pressure regulator, if required) in the process. The resulting pressure will determine the direction of the pressure cascade and the resulting PV effect on the seals. For the technique of pressure balancing seals and load shifting to work efficiently, the pressure in each subsequent chamber should be lower than the process or the chamber upstream of it such that the chambers on either side of a seal are designed to leak away from the process towards atmosphere.

In application of the concepts disclosed, the primary purpose of the seals is to keep lubricant 29 out of the process and to contain the lubricant 29 and process fluid 56 from atmosphere 44. Pressure balancing as described results in achieving the objective by shifting (with the intent of lowering and distributing) the PV factor of the seals in the machine. The role of the sole and primary seal changes from pressure containment and lubricant separation to lubricant separation and the pressure containment is shifted to another seal(s).

Directional Flushing of Seals

For seals to work effectively, they must have some leakage, even if it is a very small or trace amount of leakage. The effect of having a very thin layer of lubricant (or process fluid) in the seal interface dramatically increases the life of the seal and therefore achieving this effect and not experiencing any leaking is very unlikely. A single seal, or a set of seals in series, can be arranged to have a balanced pressure across them or designed to leak in a desired direction by setting up the appropriate pressure differentials so that the leakage through the seal is established to flow from higher pressure to lower pressure. Throughout this document, the term 'seal' will mean a single seal or a combination of seals, not necessarily all the same type, working in series or in parallel to one another.

In the exemplary embodiment of FIG. 2A, the high pressure seals 17, on the high pressure end of the machine 21, can be designed to leak process fluid 56 from the high pressure side of the machine 21 process into the high pressure chamber 39, and then from the high pressure chamber 39 into a separator 77, and then to the low pressure process pipe 70, through the pressure balancing lines 73. The process fluid 56 that passes from the high pressure chamber 39 into the separator 77 will have any lubricant 29 removed from the process fluid 56 and that lubricant will then be drained back into the high pressure chamber 39, and the process fluid 56 will pass through pressure balancing line 73 into the low pressure process pipe 70. Pressure balancing line 73 may or may not contain a valve, or regulator, whether automatic or manual, that could affect the flow rate through pressure balancing line 73, and thus the flow rate of process fluid 56 through the seal(s) 17. Further, FIG. 2A illustrates an embodiment in which the low pressure chamber 26a comprises a separator 77 at its outlet. The process side of the separator 77 vents back into the ORC process through pressure balancing line 53 to a lower pressure than that seen in low pressure chamber 26a for example, process fluid 56 from this separator 77 can be vented to the ORC process between the condenser 55 and the process fluid pump 75. Similarly, pressure balancing line 53 may or may not contain a valve, whether automatic or manual, that could affect the flow rate through pressure balancing line 53, and thus affect the flow rate through the seal(s) 28a. The separator 77 may be vented to any point in the process that is at a lower pressure that low pressure process pipe 70, not shown. Pressure balancing line 53 may or may not contain a valve, or regulator, whether automatic or manual, that could affect the flow rate through pressure balancing line 53, and thus the flow rate of process fluid 56 through the seal(s) 28a.

Specifically, a combination of seal arrangements described on the high pressure side of the machine 21 can be utilized on the low pressure side of the machine 21 as shown in FIG. 2A. The low pressure seals 28a on the low pressure end of the machine 21 can be designed to leak process fluid 56 from the low pressure side of the machine 21 process, into the low pressure chamber 26a, and then from the low pressure chamber 26a into a separator 77, and then through the pressure balancing lines 53, to a point in the process that is at a lower pressure than low pressure process pipe 70, such as a pipe or component between the condenser 55 and the pump 75.

The seals 17 and 28 can be a single seal or a combination of one or more: mechanical face seals, lip seals labyrinth seals, dry-gas seals, or any combination thereof. The flow rate through the high and low pressure seals 17 and 28 can be adjusted to keep leakage flow moving from the process into the chambers 39 and chamber 26a such that lubricant 29 does not migrate into the process. Too much flow leakage will compromise efficiency of the machine 21 and too little flow leakage may risk lubricant 29 migrating into the process. The pressure balancing lines shown 53, 62, 63, 72, and 73, if applicable, can connect to any point along the process and do not necessarily have to be connected as shown in FIG. 2A, and pressure differentials should be designed to cascade lubricant flow and process fluid flow from the process to atmosphere. It is not imperative that the flow and pressure cascade down to atmosphere, as pressure equalization also assists, but cascading does provide for leak direction. If calculating PV for all seals in a machine set-up, advantages can be shown on PV by having the low pressure chamber 26a at a pressure that is higher than the low pressure end of machine 21, and still gain advantage. This would be accomplished by using an integrated gear mechanism 22 such that the final rotational speed of drive shaft 24 was less than that of rotor shaft 14 (a lower 'V') and therefore, with higher pressure across seal 28b (between chamber 26a and atmosphere), the resulting PV can still be lower than if no pressure balancing was applied.

The configuration shown in FIG. 2A is not necessarily restricted to seals that leak from the machine, through the chambers, through a separator and into the process. This configuration would be suitable for seals that are designed not to leak at a measurable rate.

Load Shifting (Sequential Pressure Chambers)

The PV formula described herein is based on the product of multiplying P, pressure differential across a seal and the interface velocity V between the static component and the rotating component of the seal. Because changing the speed at which a machine was designed to operate is not always possible, the only remaining option to reduce PV for a seal is to reduce the pressure differential across that seal. Another possibility would be reduce the shaft diameters of the rotor shaft(s) 14 or the drive shaft 24, but doing so would compromise the integrity of the shafts. Further, if the concept is to increase the duty of the machine(s), then the rotor shaft(s) 14 and the drive shaft 24 would require additional capacity, not less with smaller diameter shafts.

The present disclosure relates in one aspect to a method of reducing the product of pressure differential and the surface velocity, also known as the PV factor, experienced by a seal 17, 27, 28a, 28b and 28c, if applicable, in a machine 21. The method more preferably involves shifting the pressure differential to a multiplicity of seals to manipulate the PV factor from one primary seal location over multiple seals, thereby reducing the PV factor for the primary sole seal location. The basis of the disclosure is to utilize the process conditions available to reduce the PV factor for the seals 17, 27, 28a, 28b, and 28c. The role of the sole and primary seals 17 and 28a changes from pressure containment and lubricant 29 separation to lubricant 29 separation and the pressure containment such that the PV duty is shifted to other seal(s).

FIG. 3A illustrates an exemplary embodiment comprising a machine 21 with high pressure chambers 39 and low pressure chambers 26a. Although not shown, load shifting the PV is possible with this arrangement. High pressure seal 17 will not experience load sharing or load shifting, but the principle of pressure balancing to reduce the PV is applicable, although not shown. Low pressure seal 28a will load shift the pressure drop from the low pressure end of the rotating element 20 to low pressure seal 28b. Should a double seal 27 be used on the rotor shaft 14, the load shifting will be amongst the low pressure seals 28a and 27.

FIGS. 3B, 3D and 3E illustrate various exemplary embodiments of machines that have the lowest pressure chamber vented to atmosphere. In these configurations, the lowest pressure chamber is not capable of containing pressure and therefore pressure balancing and load shifting PV across the lowest pressure chamber is not possible. In these exemplary machines, effectively, one level of the advantages of the disclosure is lost. In effect, seal 28a in FIGS. 3B and 3D does not receive any benefit of pressure balancing and load shifting PV. In FIG. 3E, the lowest pressure chamber 26b is vented to atmosphere, but pressure chamber 26a is suitable for pressure balancing and PV load shifting seal 28a.

FIG. 3C illustrates a machine 21 in one exemplary embodiment, similar in pressure containment of chamber 26a to that shown in FIG. 3A, but with the addition of an integrated gear mechanism 22 and replacement of a double seal 27 on the drive shaft 24 with a single seal 28b. High pressure chamber 39 is suitable for containing pressure and therefore pressure balancing using a pressure balancing line 63 as shown in the examples of FIGS. 1D, 1E and 1F. Low pressure chamber 26a is suitable for load shifting across low pressure seals 28a, and 28b which would be possible with the addition of the pressure balancing line 72 shown in the examples of FIGS. 1D and 1E, or with the addition of the pressure balancing line 62 shown in FIG. 1F.

FIG. 3F shows a similar machine 21 to that shown in FIG. 3E under one embodiment, where two low pressure chambers 26a and 26b are shown, where the second pressure chamber 26b comprises an integrated gear mechanism 22. In FIG. 3F, the low pressure chamber 26b is not vented to atmosphere as it is in FIG. 3E and therefore that second chamber capable of containing pressure allows for smaller pressure drop increments to get the pressure from the process to atmosphere over more steps. Therefore, should large pressure drops be required from the low pressure end of the machine to atmosphere, several pressure chamber steps will help cascade down from the low system pressure seen at process pipe 60, to atmosphere. The PV load shifting of the low pressure seals 28a, 28b, 28c will be based on the pressure in the machine 21, the pressure in low pressure chamber 26a and the pressure in low pressure chamber 26b. The PV across the low pressure seals 28a, 28b and 28c, with load shifting, will be less than the PV of low pressure seal 28a if load shifting and function shifting were not applied. The addition of a double seal 27 at any of the locations is a possibility, with the preferential location being the last seal before atmosphere. Depending on the pressure that the pressure balancing lines 53, 62, 72, and 73, if applicable, are connected to the process will determine the pressure in the low pressure chambers 26a and 26b, and therefore ultimately affect the PV across the low pressure seals 28. Should pressure regulators 36 be used to reduce the process pressure down before it reaches the pressure chambers, then the PV will be different than if unencumbered with a regulator 36.

Machines with only a single pressure chamber 26a are illustrated in the examples of FIGS. 1C, 1D, 1E, 1F, 2A, 3A, 3C, 3G, 3I, 4A, 4B, 4D, 4E, 5A, 5B, 5C, 5D, 5E and 6, where these configurations would be better suited to lower pressure drops between process pressure and atmosphere. In a pressure let down application, transmission pipeline operating pressures are commonly over 1000 psi and distribution systems are under 200 psi. Therefore, a double chamber expander, or multiple expanders in series would benefit from the multi-chamber pressure cascade, whereas an ORC application that may only be operating, for example, at 200 psi or 300 psi should benefit from pressure differential modifications, provided the face velocity of the seals (based on the diameter of the seals, which are dependent on the shaft diameters) is such that the PV is within acceptable ranges for the commercially available seals.

In a further illustrative embodiment, as shown in FIG. 3F, one or more separate low pressure chambers 26a and 26b can be used, for example, to isolate the pressure in low pressure chamber 26a with low pressure seals 28a and 28b, and the pressure in lower pressure chamber 26b with low pressure seals 28b and 28c. In this case, the system comprises more than one pressure drop across low pressure chamber 26a and chamber 26b in series, such that the pressure differential across the low pressure chambers 26a and 26b allows the low pressure seals 28a, 28b, and 28c to function within a reduced and workable PV range. Examples will be shown below.

As illustrated in the embodiment of FIG. 3H, low pressure chamber 26a may be pressure balanced with process fluid 56 from low pressure process pipe 70, whereas lower pressure chamber 26b could be pressurized by line 53, at another point in the process with lower process fluid 56 pressure than found in low pressure process pipe 70, so as to achieve pressure cascading such that reduced pressure differential across low pressure seal 28b and multi-seal load sharing is achieved. Another method to cascade pressure in the various pressure chambers would be to use pressure regulators to reduce pressure in any said pressure chamber such that pressure cascading is applied. Should a double seal 27 be employed at the drive shaft 24, the double seal 27 would also participate in the pressure reduction arrangement. Should low pressure chamber 26b be vented to atmosphere 44, then the burden of sealing process pressure to atmosphere would be shared between low pressure seals 28a and 28b. In one embodiment, illustrated in FIGS. 3G and 3H, a pressure balancing line 63 connects the high pressure process pipe 60 and to the high pressure chamber 39, such that the pressure in high pressure chamber 39 approaches the pressure in the high pressure end of the machine 21 and that of the high pressure process pipe 60, in order to reduce the pressure differential on high pressure seal 17.

As an example of the PV of the low pressure seals 28a, 28b, in FIG. 3H, if the high pressure process pipe 60 was at 180 psi and the low pressure process pipe 70 was at 50 psi, and if low pressure seal 28a were the only seal operating to contain the pressure between process and atmosphere, with a typical pressure differential of 50 psi and a seal interface velocity of 3000 feet per minute, the PV load for low pressure seal 28a would be 50 psi×3000 feet per minute=150,000. The PV on low pressure seal 28b would be 0 psi pressure differential and a seal interface velocity of 1000 feet per minute would have PV=0.

Similarly, and described in greater detail below in connection with FIG. 4C, the pressure balancing techniques must be applied with logic. Specifically, if the pressure in the respective chambers do not cascade down to atmosphere, the benefit of pressure balancing can be lost. As an example, if the pressure regulators in lines 62 and 72 were not set appropriately, the pressure in chamber 26b could be higher than the pressure in chamber 26a, resulting in leakage of lubricant towards the process in place of the leakage away from the process. The following example will highlight the case. If high pressure process pipe 60 was at [180] psi and the low pressure process pipe 70 was at [50] psi, and the pressure in pressure balancing line 62 was regulated down to [95] psi (from 180 psi source), and the pressure in pressure balancing line 72 were at [40] psi (which has it regulated down from 50 psi to 40 psi), the seal face velocity V for seals on rotor shaft 14 is equal to 3000 feet per minute and the seal face velocity V for seals on drive shaft 14 is equal to 1000 feet per minute, the PV calculations for the various seals would be: PV for seal 26a=(95 psi–40 psi)×3000 feet per minute=165,000 and PV for seal 26b=(40 psi–0 psi)×1000 feet per minute=40,000.

When using FIG. 4C as an example of progressive cascading pressure drop through the machine is applied to the various chambers, the system can be effective. The following is an example of how not using cascading pressure drops can be detrimental. Following that example is the exact same set up but in the second example the use of regulators is used to reduce the PV load on the various seals. Across seal 28a, the pressure on the process side is 50 psi and pressure in chamber 26a is 95 psi if not pressure reduced in regulator 36, the pressure differential across the seal is 45 psi, and the face velocity V for seals on rotor shaft 14 is equal to 3000 feet per minute, the resulting PV equals 135,000 towards the process. Across seal 28b, the pressure in chamber 26a is 95 psi and pressure in chamber 26b is 40 psi, the pressure differential is 75 psi, and the face velocity V is equal to 3000 feet per minute, the resulting PV equals 225,000. Across seal 28c, the pressure in chamber 26b is 40 psi, the pressure differential to atmosphere is 40 psi, and the face velocity V is equal to 1000 feet per minute, the resulting PV equals 40,000.

Now rearranging the regulator 36 settings to 40 psi in line 62 and 30 psi in line 72, the result is:

Across seal 28a, the pressure on process side is 50 psi and pressure in chamber 26a is 40 psi, the pressure differential across the seal is 10 psi, and the face velocity V for seals on rotor shaft 14 is equal to 3000 feet per minute, the resulting PV equals 30,000 towards atmosphere. Across seal 28b, the pressure in chamber 26a is 40 psi and pressure in chamber 26b is 30 psi, the pressure differential is 10 psi, and the face velocity V is equal to 3000 feet per minute, the resulting PV equals 30,000. Across seal 28c, the pressure in chamber 26b is 30 psi, the pressure differential to atmosphere is 30 psi, and the face velocity V is equal to 1000 feet per minute, the resulting PV equals 30,000. The result is lower PV at all seals, with pressure cascade (and thus flow) towards atmosphere.

The exemplary embodiments of FIGS. 3I and 3J illustrate further advantageous embodiments of the present disclosure. These figures illustrate the case where the two or more machines 21 are connected in series to accommodate cascading pressure drop not only in an individual machine but continuous pressure cascading across multiple machines. These embodiments are particularly advantageous in a pressure let down application and could be utilized in a high pressure ORC or steam Rankine cycle power generation. The pressure let down applications on pipeline let down would be applicable with hydrocarbon gas utilized in high pressure transmission gas pipelines where the gas undergoes a pressure drop into low pressure distribution gas pipelines, or applicable in steam pressure let down applications either in steam systems or in power generation applications. Although two machines 21 are shown, it would be well understood to use two or more machines 21 in series. It would be understood by a person of skill in the art that two or more machines 21 can apply the pressure balance technique and load shifting described above by use of existing higher and lower pressures than are in the machine or the process, by utilizing and altering the pressure in the high pressure chambers 39 or each machine as well as in low pressure chambers 26a, 26b or 26c, if applicable.

The rotor shafts 14 of the multiple cascading machine arrangement may be separate and directly coupled to multiple loads in expander applications and drivers in compressing applications as seen in FIG. 3I, or may be connected by one or more integrated gear mechanisms 22, as shown in FIG. 3J, to a common drive shaft 24, where in an expander application would be connected to a load or in a compressing application connected to a driver. With reference to FIG. 3J, the final gear mechanism containing chamber may or may not be vented to atmosphere as part of pressure balancing in this chamber and the other chambers in the configuration. These solutions can be applied to a series of machines where the last machine in the series can be a condensing machine, with or without the use of magnetic coupling(s), or applied to a series of non-condensing machines. Further, the application of a double seal on the output shaft would prove most beneficial such that the operator would have a visual on the output shaft leaking.

One common feature shown in the examples of FIGS. 3I and 3J are that the connecting process piping 64 is the discharge side of one machine 21 and the inlet of the second machine 21 for an expander application and the reverse in a compressor application, thereby allowing the pressure in each of the adjacent chambers to be pressure balanced by process piping 64. This arrangement applies the cascading principle of load sharing, but in place of adjacent chambers on the same machine 21, the high pressure chambers 39 and low pressure chambers 26*a*, 26*b* and 26*c*, as applicable, are on additional machines in series to the original machine.

As an example of the PV of the seals in FIG. 3J, if the high pressure process pipe 60 was at 1000 psi and the process pipe 64 was at 350 psi, and the low pressure process pipe 70 was at 150 psi, and a seal interface velocity of shafts 14 were 3000 feet per minute, and a seal interface velocity of shaft 24 were 1000 feet per minute, the desirable cascading effect on PV could be:

For the first higher pressure machine in series, the PV on seal 17 would be 0 due to pressure balancing with pressure balancing line 63. The PV for seal 28*a* would be 360,000, based on V=3000 and pressure differential=120 psi (where process pipe 64 is at 350 psi and chamber 26*a* regulated down to 230 psi using pressure balancing line 64*a* with a regulator). The PV for seal 28*b* would be 390,000, based on V=3000 and pressure differential across 28*b* to be 130 psi (based on 230 psi in chamber 26*a* and 100 psi in chamber 26*b*).

For the second (the lower pressure) machine in series, the PV on seal 17*a* would be 0 because pressure balancing line 64*b* would pressurize chamber 39*a*. On the low pressure end of the second machine, the PV for seal 28*c* would be 150,000, based on V=3000 and pressure differential=50 psi (process pipe 70 at 150 psi and chamber 26*b* regulated in pressure balancing line 72 down to 100 psi). The PV for seal 28*d* would be 100,000, based on V=1000 and pressure differential=100 psi (100 psi in chamber 26*b* and atmosphere).

Speed Reduction of Output Shaft

Because the dimensions of rotors 20 in positive displacement or turbo machines 21 are designed to operate within a range of ratios of length and diameter, as well as pressure ratios to optimize efficiency, the rotational speed of rotor shaft 14 is typically higher than the rotational speed of the drive shaft 24 required for generating electricity, which is typically desirable at 50 or 60 Hertz, depending on the local power grid. With reference to the examples of FIGS. 1D-1E, 2A, 3B-3H, 3J, 4B-4D, 4F, 5A-5B, 5E and 6, the present system may incorporate a torque transfer mechanism, in which an integrated gear mechanism 22 integrally contained in low pressure chambers 26*a* or 26*b* is used to change the speed of the rotor shaft 14, such that drive shaft 24 is of a different speed than rotor shaft 14. The positive displacement screw machine 21 shown provides a primary power which is transferred through rotor shaft 14 to the integrated gear mechanism 22 in the low pressure chamber 26*a* or 26*b*.

Generally, if configured as shown in FIGS. 1D, 1E, 3G, 3H, 4A, 4D, 5A, and 5B, without the use of pressure regulators, the pressure across seal 28*a* will be near equal. With pressure equalization, although the pressure cascade is not necessarily away from the process, it is not pressure cascading towards the process and therefore will not be driving lubricant into the process. Placing a pressure restriction device such as a regulator in the pressure balancing lines can insure a lower pressure in the chambers to which they are connected and thereby establish the direction of process fluid 56 flow but more importantly reduce pressure differential across the seal to reduce PV.

By reducing the pressure differential across a seal, the PV may be reduced. Similarly, by reducing the velocity of the interface, the PV can also be reduced. The following principle shows how using an integrated gear mechanism 22, the speed of the drive shaft 24 can be reduced and therefore the PV of the low pressure seal 28*b*, at the lower speed compared to not being slowed, as shown in the examples of FIGS. 1D, 1E, 2A, 3C, 3G, 3J, 4B, 4D, 4F, 5A, 5B and 6 can be reduced versus FIGS. 1F, 3F, 3H, 3I, 4A, 4E and 4A where no speed altering is applied and no benefit to seal 28*b*. Therefore, when the desired drive shaft 24 speed is known, the machine can be engineered from both ends to determine the to determine the gear reduction ratio that is required in the integrated gear mechanism 22. By applying this methodology, pressure balancing, load shifting and hence PV shifting can be incorporated into a design to have efficient use of equipment and capital. It is noted that if the drive shaft 24 were to exit the machine 21 through the high pressure chamber 39, the result would be similar to the above, with the pressure balancing technique, the PV load shifting of the seals on the high pressure end of the machine, along with integrated gear mechanism 22 in high pressure chamber 39 would demonstrate a similar advantage.

When evaluating the low pressure end of the machine 21, the pressure differential across each of the low pressure seals 28*a* and 28*b* may be the same or may be varied due to a number of factors; pressure in process, pressure in the low pressure chamber 26*a* (or in the case of multiple chambers, low pressure chamber 26*b*), speed of the rotor and rotor shafts 14 and drive shaft 24, gear reduction ratio, shaft diameter and speed of rotor shaft 14 relative to shaft diameter and interface speed of drive shaft 24. One leading factor is the pressure brought into low pressure chamber 26*a*, relative to the pressure on the lower pressure end of the rotating element 20, creates the pressure differential across the low pressure seal 28*a*. This differential can be set to 0 psi differential by matching the pressure on both sides of seal 28*a* but doing that only shifts the burden to the remaining seals that are in operation further from the process.

If the pressure in low pressure chamber 26*a* is higher than in the pressure in process pipe 70, this is a less advantageous configuration than if the pressure in low pressure chamber 26*a* were lower or equal to the low pressure process pipe 70. Regardless of the pressure gradient direction, the lower the pressure differential, the less PV on the low pressure seal 28 and therefore the less duty the seal has to be able to overcome. Seals installed in a situation where the system is designed to operate at a pressure in the low pressure chamber 26*a* is higher than in the low pressure process pipe 70, must be designed for the pressure gradient. Meaning, if a seal is designed to work with ID pressure as opposed to OD pressure, it has a different design configuration and consideration should be given in those circumstances.

As illustrated in the examples of FIGS. 1D, 1E, 2A, 3C, 3G, 3J, 4B, 4D, 4F, 5A, 5B and 6 in a case when the speed of the rotor shaft(s) 14 is altered through use of an integrated gear mechanism 22, and the PV factor for low pressure seal 28*b* is reduced not only by pressure balancing in the chamber, but also by altered surface velocity of the seal, caused by altering the speed of drive shaft 24 relative to the speed of rotor shaft 14 through the use of the integrated gear mechanism 22. In such case, pressure differential across the low pressure chamber 26*b* may be less than that at low pressure chamber 26a. It is not necessary that the PV value for each seal in the system be equal but it is valuable to reduce PV in seals by shifting the sealing burden across multiple seals. With varying PV's at the various seal locations, a combination of seal types may provide a more robust or more cost effective solution that utilizing the same type of seal throughout the machine 21. Further, the use of a labyrinth seal in a location that is suitable to leak and thus end up pressure balanced by the leakage through the seal, may prove cost effective and provide minimal loses due to friction, as is possible with friction seals. Further yet, the same seals operated at a lower PV should last longer than the same seals with a high PV, all else being equal. The advantages here are reduced downtime and reduced maintenance costs. It may be beneficial to load share with a single chamber 26a and place all of the PV onto seal 28b in place of load shifting the PV. One situation of structuring the PV load in this manner is that the last seal before atmosphere could be replaced without having to disassemble the machine, whereas the balance of the seals in the machine would require its disassembly, thereby cost and downtime would be encountered whereas it would prove advantageous to load the last seal by making it a sacrificial seal and preserve the life expectancy of the inner seals.

With reference to the exemplary embodiment of FIG. 3D, in the case of one low pressure chamber 26a that is open to atmosphere 44, no pressure balancing may be applied. As an example of the PV of the low pressure seals 28a, 28b, if the high pressure process pipe 60 was at 180 psi and the low pressure pipe 70 was at 50 psi, and if low pressure seal 28a were the only seal operating to contain the pressure between process and atmosphere, with a typical pressure differential of 50 psi and a seal interface velocity of 3000 feet per minute, the PV load for low pressure seal 28a would be 50 psi×3000 feet per minute=150,000. The PV on low pressure seal 28b would be 0 psi pressure differential and a seal interface velocity of 1000 feet per minute would have PV=0.

With reference to the exemplary embodiment of FIG. 3C, the following is an example of the benefits of speed reducing the drive shaft 24 relative to the rotor shaft 14. With the low pressure process pipe 70 contained 50 psi process fluid 56, and the low pressure chamber 26a were pressure balanced with the low pressure process pipe 70, and if low pressure seals 28a, 28b were to load share, the pressure differential across low pressure seal 28a would be 0 psi with a seal interface velocity of 3000 feet per minute, the PV load for low pressure seal 28a would be 0 psi×3000 feet per minute=0. If the drive shaft 24 speed is reduced by a integrated gear mechanism 22 to 1000 feet per minute, and the pressure differential across low pressure seal 28b would be 50 psi, the PV across seal 28b would be 50 psi×1000 feet per minute=50,000, cutting the PV to a third of the previous example. By utilizing the pressure balancing with load shifting concepts with speed reduction of the drive shaft 24, the PV of the previous arrangements higher seal PV will be reduced, extending the life and pressure containing capability of the seal. However, this configuration merely transfers the pressure differential, and hence the PV load to low pressure seal 28b, which is exposed to low pressure chamber 26a on one side and atmospheric pressure on the other side. The benefit gained here is that drive shaft 24 rotates at a slower speed than rotor shaft 14, thereby giving a lower PV to low pressure seal 28b that would be at low pressure seal 28a, proportioned by the amount of the speed reduction. Additionally, this being the last seal before atmosphere, it could be specified to be a double seal (so that if the seals starts failing, lubricant is lost through the seal and not the process fluid) and structured to be a sacrificial seal and thereby reducing maintenance costs and downtime.

With reference to FIG. 1A, in the case of only one low pressure seal 28a in a singular low pressure chamber 26a vented to atmosphere 44, and one high pressure seal 17 in a singular high pressure chamber 39, the pressure across low pressure seal 28a goes from process pressure to atmospheric, a typical pressure differential being 50 psi and a typical PV load being 50 psi×3000 feet per minute=150,000 and the pressure across high pressure seal 17 goes from process pressure to atmospheric, a typical pressure differential being 180 psi and a typical PV load being 180 psi×3000 feet per minute=540,000. In order to equalize pressure on either side of the machine 21, the high pressure chamber 39 and the low pressure chamber 26 the vents must first be closed, as illustrated in FIG. 1C, allowing low pressure chamber 26a and 39 to be pressurized, preferably by connection via pressure balancing line 63 to the high pressure process pipe 60 and 72 to the low pressure process pipe 70 (as shown in FIG. 3G). The low pressure seal 28a pressure differential, P, then becomes 0 and the PV for low pressure seal 28a becomes 0 and the high pressure seal 17 pressure differential, P, then becomes 0 and the PV for the high pressure seal 17 becomes 0.

Alternatively, in one embodiment that does not provide any advantage is the addition of low pressure chamber 26b as shown in FIG. 3E, relative to the arrangement shown in FIG. 3F. In FIG. 3E, the low pressure chamber 26a is now sealed and a second low pressure chamber 26b is vented to atmosphere 44, along with the addition of low pressure seals 28b, 28c to the system, allows the total pressure drop otherwise experienced by low pressure seal 28a would appear to be split over multiple seals. The shaft speed within the first chamber 26a and the second chamber 26b is not altered and V remains at 3000 feet per minute. Pressure balancing, by increasing the pressure in low pressure chamber 26a to 50 psi leads to a pressure difference across low pressure seal 28a of 0 psi and a PV of 0. The pressure differential across low pressure seal 28b becomes (50 psi–0 psi at atmosphere) 50 psi, and a PV of 50 psi×3000 feet per minute=150,000. The PV factor for low pressure seal 28c is zero because low pressure chamber 26b is vented to atmosphere 44, resulting in a pressure differential of 0. Therefore, the PV limit of 150,000 that was shown for low pressure seal 28a, when it was the only seal, remains the same but only shifts the load to seal 28b. If chamber 26b were to be closed to atmosphere as shown in FIG. 3F, the load could be distributed amongst multiple seals (depending on the pressure of the process fluid that is brought into the pressure chamber), and the PV calculations show: seal 28a, PV=0 because of pressure balancing chamber 26a to process pipe 70 yields a 0 pressure differential, and with chamber 26b being pressurized to say 30 psi, the pressure differential on seal 28b is now 50 psi–30 psi, the pressure differential is now 20 psi×3000 feet per minute=60,000. And the PV of seal 28c becomes 30 psi×1000 feet per minute for drive shaft 24, equaling 30,000 PV. Thereby demonstrating pressure cascade, and PV load sharing with the benefit of gear reduction to the drive shaft 24. More importantly it is not so much the total PV amongst the seals as it is to lower the PV of the previous arrangements of the high PV of the single seal(s).

Due to the potentially varying nature of shaft velocity, the reduction in P (pressure differential) achieved by the present pressure balancing system need not be large to result in a significant and desirable drop in PV or seal life extension. It is to be noted that by splitting the sealing duty to multiple locations, the sum of the individual PV on each seal does not necessarily add to the original PV. Both P and V can be varied to achieve the desired effect and such variations would be well understood by a person of skill in the art to be encompassed by the scope of the present disclosure.

In another exemplary embodiment, two separate low pressure chambers 26a, 26b may contain an integrated gear mechanism 22 for reducing speed of drive shaft 24. In these embodiments, pressure balancing of the first low pressure chamber 26a can be accomplished by connecting line 62 (with a pressure regulator to high pressure process pipe 60) to chamber 26a either to the high pressure process pipe 60, as is shown in FIG. 1F 4B, and 4C, or to the low pressure process pipe 70, as in the case of FIGS. 1D, 1E, 3G, 3H, 4A, 4D, 5A, 5B, and 6 via a pressure balancing line 72, or as in the case of FIGS. 3I, 3J, 4E, and 4F via a pressure balancing line 64. Should the connection be made to the high pressure process pipe 60, it may more preferably be passed through a pressure regulator 36 to lower process fluid pressure in low pressure chamber 26a, while remaining at a higher pressure than the pressure in low pressure chamber 26b which will cause the lubricant 29 from low pressure chamber 26a to be forced into the seal interface.

This pressure cascading configuration is more desirable, but not absolutely necessary, to have leakage flow in the direction away from the process and towards atmosphere than the opposite of having lubricant 29 pushed into the process. Similarly, as shown in FIG. 3H, where low pressure chamber 26a is pressure balanced from low pressure process pipe 70, lower pressure chamber 26b would pressurized by line 53, another point in the process with pressure lower than low pressure process pipe 70 to achieve reduced pressure differential across low pressure seal 28b and multi-seal load sharing. Should low pressure chamber 26b be vented to atmosphere 44, then the burden of sealing process pressure to atmosphere would be shared between low pressure seals 28a, 28b. In another advantageous configuration, a double seal 27 may be placed on the drive shaft 24 because its speed would be lower than the rotor shaft 14.

Pressurized Lubricant Circulation Systems

FIG. 4A illustrates an exemplary embodiment comprising machine 21 with a high pressure chamber 39 on the high pressure side and chamber 26a on the low pressure side, without an integrated gear mechanism 22, and without a circulating lubricant circulation system. The low and high pressure chambers 26 and 39 respectively, contain lubricant 29 in the bottom of each chamber. This is referred to as splash lubrication as it does not have a circulating pump to distribute the lubricant. It is the simplest form of lubricant circulation systems and may be suitable in circumstances where the bearings do not have heavy loads. Pressure balancing and load shifting is appropriate with this type of lubrication because the heat generated by the seals will be lower than if all of the load were on seal 28a.

FIG. 4B illustrates an exemplary embodiment comprising machine 21 similar to the one in FIG. 4A, where this machine 21 has a single high pressure lubricant circulation system 30, comprising of lubricant circulation pump 45, lubricant lines (shown as part of lubricant circulation system 30), heat exchanger 32, lubricant 29, pressure regulator 36, and reservoir with heat exchange and separation capabilities 35. To accommodate the pressure from the pressure balancing mechanisms described above into each of the high pressure chamber 39 and low pressure chambers 26a, and 26b, lubricant 29 can be circulated and recovered from both the high and low pressure chambers 39, 26a, 26b and then recirculated. The lubricant 29 would leave lubricant circulation pump 45 at a higher pressure than process fluid 56 would have in process piping 60, the pressure used to pressure balance chamber 39. In addition to providing lubrication to the bearings 16, 66, 88, the lubricant 29 serves the purpose of removing heat from the seals 17, 28a, and 28b. The pressure cascade will drive the lubricant from the higher pressure chambers to the lower pressure chambers, to which eventually, the lubricant will drain back to the reservoir 35 to feed the circulating lubricant circulation pump 45.

As shown in the examples of FIGS. 4B and 4C, it is possible to use process vapor pressure differential from the high pressure chamber 39 to the low pressure chambers 26a in the case of FIG. 4B and to chamber 26a first and then to chamber 26b in the case of FIG. 4C, to make the lubricant flow from the higher pressure to the lower pressure chamber. As an example, process fluid 56 from the high pressure process pipe 60 can be directed to the high pressure chamber 39 by a pressure balancing line 63 or by leaking through high pressure seal 17 from the high pressure sides of the machine 21 to the high pressure chamber 39. This would then pressurize the high pressure chamber 39 and the high pressure lubricant circulation system 30, which the lubricant circulation system 30 would operate at a higher pressure to drive lubricant into chamber 39. The lubricant circulating lines (shown as part of lubricant circulation system 30) would then transfer the lubricant at that pressure, through a pressure regulator 36 and a heat exchanger 32, if required, to low pressure chamber 26a. The pressure differential is what would make the lubricant flow from the higher pressure to the lower pressure chamber.

The exemplary embodiment of FIG. 4C illustrates two low pressure chambers, 26a and 26b. Pressure balancing to chamber 26a is applied from high pressure process pipe 60, passed through a regulator 36 in pressure balancing line 62, to chamber 26a. Pressure balancing to chamber 26a is applied from high pressure process pipe 60, passed through a regulator 36 (to be set at a higher pressure setting from process pipe 70 pressure) in pressure balancing line 62, to chamber 26a. Pressure balancing to chamber 26b is applied from low pressure process pipe 70, passed through a regulator 36 (not necessarily required provided pressure regulator in line 62 is at a higher pressure setting from process pipe 70 pressure) in pressure balancing line 72, to chamber 26b. The concept being that the setting on the regulators is such that a cascading pressure drop is established between the process pressure at the machine and atmosphere. The cascading pressure drop facilitates the lubricant flow from the initial chamber 39, to chamber 26a, to chamber 26b, to the reservoir 33, reservoir with heat exchange capability 34, or reservoir with heat exchange and separation capabilities 35, or any combination thereof, as the case may be.

FIG. 4D, illustrates a machine 21 configuration which comprises an integrated gear mechanism 22, a high pressure lubricant circulation systems 30, comprising of lubricant circulation pump 45, lubricant lines (shown as part of lubricant circulation system 30), lubricant 29, pressure regulator 36, and reservoir with heat exchange capability 34, and a low pressure lubricant circulation systems 31 comprising of lubricant circulation pump 54, lubricant lines (shown as part of lubricant circulation system 31), lubricant 29, pressure regulator 36, and reservoir with heat exchange capability 34. Pressure balancing the high pressure chamber 39 with lines 63 and pressure balancing the low pressure chamber 26a with pressure balancing line 72, are being applied. FIG. 4B shows a similar configuration, however with a singular high pressure lubricant circulation system 30 in which lubricant 29 from the high pressure chamber 39 passes through a pressure regulator 36 before being supplied, and being temperature adjusted, if required, to lubricate the bearings 66 and 88 and low pressure seals 28a and 28b. Lubricant 29 from low pressure chamber 26a may be temperature adjusted and then temporarily stored in the reservoir 33 or reservoir with heat exchange capability 34 or reservoir with heat exchange and separation capabilities 35, before being recirculated through the high pressure lubricant circulation system 30. Pressure balancing the high pressure chamber 39 with lines 63 and pressure balancing the low pressure chamber 26a with pressure balancing line 62, are being applied.

In one embodiment, as shown in FIG. 4C, lubricant 29 from the high pressure chamber 39 is passed through a pressure regulator 36 prior to being circulated through a heat exchanger 32, if required, and then to the low pressure chamber 26a, which can then further circulate to additional low pressure chambers 26b, before being temperature adjusted in the reservoir with heat exchange and separation capabilities 35 and then to lubricant circulation pump 45 to circulate the lubricant through the lubricant circulation system 30.

Numerous variations to the lubricating method and high and low pressure lubricant circulation systems 30 and 31 described above are possible and encompassed by the scope of the present disclosure. For example, as illustrated in FIG. 4D, the system may have separate high and low pressure lubricant circulation systems 30 and 31 connected to each of the high pressure chambers 39 and low pressure chambers 26a (and 26b, if applicable). In this case, a separate high pressure lubricant circulation system 30 comprising a high pressure heat exchanger 32 (not shown) and a high pressure reservoir with heat exchange and separation capabilities 35 can supply lubricant 29 to the high pressure seals 17, bearings 16 and gears 40 in chamber 39. The separation of the high and low pressure lubricant circulation systems 30 and 31 has advantages since the separate systems will operate at the respective pressures to which they are pressure balanced from. In the case of the high pressure balancing line 63 the respective pressure will be the pressure in high pressure process pipe 60 and for the low pressure balancing line 72, the pressure in low pressure process pipe 70.

Another feature is that the high pressure chamber 39 may have steadier pressure than the low pressure chamber 26, which may experience pressure fluctuations in the process system. Since the high pressure lubricant circulation system 30 must provide sufficient pressure to overcome the pressure in high pressure chamber 39 and the low pressure lubricant circulation system 31 must provide sufficient pressure to overcome the pressure in low pressure chambers 26a or 26b, as the case may be, utilizing a single lubricant system for both chambers simultaneously can pose challenges and could require the use of regulators, and possibly control valves. Dedicated lubricant systems for each set of chambers overcome these challenges. Pressure balancing the chambers with the respective pressure piping also allows the PV across the first set of seals between the process and the first chamber to automatically adjust to a balanced pressure, thereby reducing the risk of lubricant making its way into the process. Restated, the advantage of the split systems is that the individual lubricant circulation system pressures will fluctuate with changes in the process pressures, thereby not distorting the lubricant flow rate if one lubricant circulation system were being utilized and the higher pressure process fluid 56 in pipe 60 were fluctuating relative to, and independently, to lower pressure process fluid 56 in pipe 70.

By separating the high and low pressure lubricant circulation systems 30 and 31 into lubricant circulation pump 45 for the high pressure side and lubricant circulation pump 54 for the low pressure side, each lubricant system will operate at a reasonable pressure (40 to 60 psi) over the balancing pressure. By designing separate high and low pressure lubricant circulation systems 30 and 31 with lubricant circulation pumps 45 and 54 respectively, the pumps will deliver the required flow rate of lubricant to the seal, bearings and gears, which operate on adding a pressure differential to the lubricant 29 pressure between the pump inlet and pump discharge, where the pump inlet is the pressure in the chamber to which the lubricant 29 drains from, and thus the challenge of insuring enough lubricant 29 flow to the high pressure seals 17 and low pressure seals 28a, 28b, 28c, and bearings 16, 66, 88, due to varying pressure differential across the machine 21 and hence the high pressure chamber 39 and low pressure chambers 26a and 26b, and bearings 16 and 66, is eliminated.

Furthermore, a separator 77 as shown in the exemplary embodiments of FIGS. 1E, 2A, 5A and 5B, and reservoir with heat exchange and separation capabilities 35 as shown in FIGS. 4B, 4C, 4E, 4F, or reservoir with heat exchange capability 34 in FIGS. 4D, 5A, 5B and 6, may prevent lubricant 29 from migrating into the process and will collect the coalesced lubricant back into the respective high pressure chamber 39 and low pressure chambers 26a and 26b as the case may be, to the reservoir 33, 34 or 35 to allow the separation of the lubricant from the process fluid 56. An optional vapor recovery unit (not shown) may also be added to any pressure balancing lines 53, 62, 63, 72, and 73, to facilitate the separation of process fluid 56 from the lubricant 29.

In a further exemplary embodiment, the present disclosure need not include an external lubricant circulation system 30 at all. Instead lubricant 29 may be stored in sumps, as shown in FIGS. 1A-1F, 2A, 3A-3J, 4A, 5C, 5D and 5E, on either the high pressure chamber 39 or the low pressure chamber(s) 26a and 26b, or both, should it be applicable. In such cases, temperature control of the chambers can be supplied by an optional external jacket medium (not shown) or air flow provided around the chambers. Possible fluids for temperature adjustment can be process fluid 56, water, glycol, thermal oil or air.

Similar to the single lube oil system shown in the exemplary embodiments of FIGS. 4B and 4C, a similar concept is shown in FIGS. 4E and 4F. A single lubricant circulation system, with a single lubricant circulation pump 45, is shown to provide lubricant to two machines in series. The cascading pressure drop of the chambers (containing seals, bearings and gears, as the case may be) set up in the machines facilitates the distribution of lubricant throughout the machines, through a series of pressure regulators, heat exchangers and pressure chambers. Because pressure balancing is being utilized from three sources, process pipe 60, 64 and 70, separate lubricant circulation systems for the 3 operating pressure levels may be better suited to the concept. Therefore, chamber 39 in machine number one, pressure balanced by process pipe 60 would have a lubricant circulation system operating at that pressure plus the required pressure differential from the pump of say 40 psi. Chamber 26a in machine number one and chamber 39a of machine number two would be pressure balanced by pressure balancing lines 64a and 64b from process pipe 64 and therefore would have a lubricant circulation system operating at the pressure of process pipe 64 plus the required pressure differential from the pump of say 40 psi. The third lubricant circulation system would also operate at pressure and provide lubrication to the bearing and seal components in chamber 26b in the case of FIG. 4F and chamber 26b of the second machine in the case of FIG. 4E. Neither of the multiple lubricant circulation system configuration is shown in full detail, for the sake of brevity. One skilled in the art would recognize that the configurations described above are equally applicable to multiple lubricant circulation systems having expanders/compressors in series. Similarly, for the sake of brevity, if the pressure through the series of machines is higher than a seal is capable of handling at the respective PV for the arrangement, an additional pressure chamber may be added to assist in cascading the pressure down towards atmosphere. As an example, in FIG. 4E, if process fluid 56 in process pipe 60 were at 1000 psi, then it would be reasonable to expect the pressure in pipe 64 to be approximately 350 psi. Therefore, the pressure differential between the low pressure chamber in the first higher pressure machine and atmosphere would be 350 psi to be distributed over seals 28a and 28b. This may prove challenging and therefore with the addition of a third chamber 26c (not shown), that would be appended to chamber 26a, the pressure differential can be reduced over seals 28a, 28b, 28c, and 28e (not shown). Thereby with effective pressure balancing of chambers 26a, 26b, and 26c the PV of the seals could be significantly improved. For added protection, a double seal could be installed on rotor shaft 14 of the first higher pressure machine. Changing the configuration to utilize an integrated gear mechanism 22, as shown in FIG. 4F, would accomplish this effort. If this later configuration still proved too much for the capability of standard seals, then an additional pressure chamber on the first higher pressure machine (between the first chamber and the integral gear box), could be added.

Sealing Output Shafts

The exemplary methods and systems of the present disclosure can be applied to seals of any number of configurations in the machine 21. With reference to FIGS. 1A-1F, 2A, 3A-3J, 4A-4F, 5A-5E, and 6, these concepts will apply in any combination. In any of the figures disclosed herein, the high pressure seals 17 and low pressure seals 28a (and 27, if applicable), provide a first means of preventing loss of process fluid 56 from the machine 21.

As is shown in the advantageous embodiment of FIG. 3A, a double seal 27 is installed on the rotor shaft 14. Use of double seal 27 at this location has advantages in that a pressurized double seal 27 requires a higher pressure medium to be injected into the cavity between the two seals within the double seal so that if one of the two seals within double seal 27 leaks, it leaks the higher pressure medium fluid and not the process fluid 56 to atmosphere 44. FIG. 3A has a splash lubrication system and therefore the combination utilizing a pressurized double seal is highly unlikely, but may be utilized with a non-pressurized double seal.

As shown in the exemplary embodiments of FIGS. 5A and 5B, a machine 21 with an integrated gear mechanism 22, a high pressure lubricant circulation system 30, a low pressure lubricant circulation system 31, with a pressurized double seal 27 installed on the drive shaft 24. The high pressure lubricant circulation system 30 has a pressure balancing line 63 and passes through a separator 77. The lubricant circulation system 30 is controlled by the control module 93 (shown in FIG. 6) and has a vent line tied into the pressure chamber 39 (or alternatively directly into separator 77). The lubricant 29 drain line from the separator runs into the high pressure chamber 39 (alternatively into the reservoir 33, reservoir with heat exchange capability 34, or reservoir with heat exchange and separation capabilities 35). Similarly, the low pressure lubrication system 31 has a pressure balancing line 72 and passes through a separator 77. The lubricant circulation system 31 is also controlled by the control module 93 (shown in FIG. 6) and has a vent line tied into the pressure chamber 26a (or alternatively directly into separator 77). The lubricant 29 drain line from the separator runs into the pressure chamber 26a (alternatively into the reservoir 33, reservoir with heat exchange capability 34, or reservoir with heat exchange and separation capabilities 35). The lubricant circulation system 31 would be controlled by the control module 93 (shown in FIG. 6) and it has reservoir with heat exchange capability 34 that could alter the temperature of the lubricant to keep it in the desired range, also controlled by control module 93.

As shown in the exemplary embodiment of FIG. 5A, the lubricant 29 supplying the pressure to the double seal 27 is provided by the low pressure lubricant circulation system 31. In this application, the lubricant 29 that is used on the low pressure process piping end of the machine 21, from the low pressure lubricant circulation system 31, will be at a higher pressure than the low pressure chamber 26a because the lubricant 29 must flow and the lubricant circulation pump 54 provides the pressure differential to make the lubricant flow. The lubricant circulation pump 54 experiences the low pressure chamber pressure at its inlet and the lubricant circulation pump 54 creates an increased pressure differential to circulate the lubricant 29. The resulting higher pressure of the lubricant 29 will be used to charge the cavity in the pressurized double seal 27. Therefore, if either side of the double seal 27 leaks, it will leak lubricant into the low pressure chamber 26a or lubricant to atmosphere 44.

As shown in the exemplary embodiment of FIG. 5B, the lubricant 29 from the high pressure lubricant circulation system 30 is utilized to charge the cavity in the double seal 27, similarly, when either side of the double seal 27 leaks, it will leak lubricant 29 into the low pressure chamber 26a or lubricant 29 to atmosphere 44. The inner side of the pressurized double seal 27 will leak lubricant 29 into the low pressure chamber 26a (which already has lubricant in it) or if the outer side of the double seal 27 leaks, it will leak lubricant 29 to atmosphere 44. This will provide a visual indication to an operator that the double seal 27 is leaking which will then draw the necessary maintenance. Without the double seal 27, a single seal could fail and the entire system charge could be lost to atmosphere without indication. Clearly, lubricant 29 from lubricant circulation system 30 will be at higher pressure than chamber 26a and therefore will provide an effective medium to charge the cavity between the two seals in the double seal 27. The lubricant circulation pump 45 experiences the high pressure chamber pressure at its inlet and the lubricant circulation pump 45 creates an increased pressure differential to circulate the lubricant 29. The resulting higher pressure of the lubricant 29 will be used to charge the cavity in the pressurized double seal 27.

In another exemplary embodiment of the drive shaft 24 sealing technique, the purpose of this seal is used to prevent the machine 21 from leaking process fluid to atmosphere or allowing ambient air to enter the process through the machine 21. This can also be accomplished by incorporating a magnetic coupling to the rotor shaft 14, as shown in FIGS. 5C and 5D, or to the drive shaft 24, as shown in FIG. 5E, such that the machine 21 becomes hermetically sealed from the atmosphere.

The magnetic coupling system as illustrated in FIG. 5D, is generally comprised of items 11, 12, and 13. It will be referred to as a magnetic coupling system assembly 46 as shown by the dashed line in FIG. 5C. The magnetic coupling is shown in FIGS. 5C, 5D, and 5E. The magnetic coupling system assembly 46 is shown with magnetic coupling output shaft 10, which replaces the function of shafts 14 or 24, as the case may be. The magnetic coupling provides a degree of inherent safety, such that a machine 21 with a magnetic coupling can be used with a multitude of fluid mediums in expansion, including natural gas or steam in pressure let-down applications, and with a full range of process fluids in organic Rankine cycle systems, or in compression, including natural gas or refrigerant. Also, such configurations prevent atmosphere 44 from entering the machine 21 and potentially contaminating the process fluid 56.

With reference to exemplary embodiments illustrated in FIGS. 5C and 5D, a simplified torque transfer mechanism is shown. Intermeshing male and female rotors 19 and 20 may rotate in opposite directions relative to one another and may be contained within the expander 21 supported by high speed low/high pressure bearings 16 and 66. These rotors, 19, 20 intermesh and create a cavity in between the rotors allowing process fluid to expand as the cavity volume increases along the length of the interface between the rotors 19 and 20 as the rotors rotate relative to one another. Machine 21 provides a primary shaft power which is transferred from the male magnetic coupling end 13, through the magnetic coupling shroud 12, to the female magnetic coupling end 11. The components of the magnetic coupling are the female torque transfer hub 11, the shroud 12, and the male torque transfer hub 13.

The male torque transfer hub 13 is connected to the rotor shaft 14, also referred to as an extended rotor shaft. The female torque transfer hub 11 is connected to the magnetic coupling output shaft 10, of the machine. The role and function of rotor shaft 14 is the same as that of drive shaft 24, with the exception that drive shaft 24 is expected to be rotating at a slower speed. It may be advantageous not to speed reduce drive shaft 24 relative to rotor shaft 14 as the torque increases as the speed reduces and magnets have a torque limit before they start slipping against one another, therefore, application of the magnetic coupling system assembly 46 may be applied to drive shaft 24 with or without speed reduction, if not only to enable pressure balancing principle with use of a chamber, as shown in FIGS. 5C, 5D, and 5E.

The magnetic coupling shroud 12 is hermetically sealed to the machine 21, preventing process fluid 56 from escaping the machine 21, and preventing atmosphere 44 from entering the machine 21. End cover plates of the high pressure chamber 39 and low pressure chambers 26a and 26b act in a similar manner to the magnetic coupling shroud 12 to contain the process fluid 56 within the machine 21, and prevent atmosphere 44 from entering the machine 21. The magnetic coupling in a way replicates the configuration shown on the high pressure chamber 39 of the machine 21, and therefore the solutions proposed to that end of the machine 21 become applicable to the low pressure end of the machine with a magnetic coupling attached to either rotor shaft 14 or drive shaft 24.

In one particularly advantageous embodiment, the present system provides a pressure balancing system applicable with a magnetic coupling on a twin screw expander drive shaft 24, such as that illustrated in FIGS. 5C, and 5D. With reference to these figures, the system comprises a machine 21, a rotor shaft 14 and a magnet coupling system assembly 46 comprising a shroud, and a magnetic coupling to transfer shaft torque with matched speed on both sides of the magnetic coupling. The magnetic coupling system assembly 46 can be incorporated at the rotor shaft 14 or, if an integrated gear mechanism 22 is used as shown in FIG. 5E, with drive shaft 24. The rotor shaft 14 typically rotates at a higher speed and lower torque than the drive shaft 24. A magnetic coupling system assembly 46 integrated onto the drive shaft 24 would experience approximately the same horse power but at lower speed with higher torque. Therefore, for the application a magnetic coupling system assembly 46 affixed to the rotor shaft 14 rather than to the drive shaft 24 is also a suitable arrangement.

The challenge with implementing the magnetic coupling system assembly 46 at the drive shaft 24 is the generation of heat, equivalent to an energy loss, by induced eddy currents. Reducing eddy currents reduces heat and energy loss and thereby increases efficiency of the machine 21. Similarly, heat generated by friction on the seals is a loss in energy efficiency and the objective is to design a seal with minimal energy loss but suitable to accomplish the sealing objective described above.

The alternating magnetic fields produced by a rotating magnetic coupling system assembly 46 generate eddy currents in conductive materials. Eddy current generation increases with increased rotational speed. To prevent heat generation and energy loss, non-conductive, non-metallic shrouds can preferably be incorporated into the magnetic coupling. Most advantageously, the magnetic coupling shroud 12 can be made of ceramic material or any other non-conductive material that does not produce any significant eddy currents.

A magnetic coupling system assembly 46 on the drive shaft 24 is preferably larger in size than a magnetic coupling system assembly 46 on the rotor shaft 14 because if drive shaft 24 is rotating slower than rotor shaft 14, it will need to transfer the same amount of power and therefore will require increased torque capabilities. All magnetic couplings have a breakaway torque at which the magnets will slip relative to one another; therefore, the coupling is preferably sized for equal or more than the amount of power to be transferred through the magnetic coupling. In one embodiment, the magnetic coupling system assembly 46 is not a concentric cylindrical magnetic coupling but comprises two circular, parallel flat plate magnetic couplings transferring rotational torque through a flat membrane material situated between the two circular, parallel flat plate magnets.

Heating vs. Cooling Lubricant

The lubricant 29 temperature can be adjusted in heat exchanger 32, reservoir with heat exchange capability 34, or reservoir with heat exchange and separation capabilities 35, along with air flow over the equipment. For the purposes of this section, a 'heat exchanger' will refer to any or all of heat exchanger 32, reservoir with heat exchange capability 34, or reservoir with heat exchange and separation capabilities 35. The temperature of the lubricant 29 can be altered by applying air exchange or liquid exchange through an appropriate heat exchanger. In circumstances, such as cold starting of the process system, where the lubricant 29 is colder than the air temperature, the lubricant 29 will be heated in an air exchanger. In circumstances, such as during operating, the air temperature will typically be cooler than the lubricant 29 and therefore in an air exchanger, the lubricant 29 will be cooled. In circumstances, such as cold starting of the process system, where the lubricant 29 is colder than the liquid on the other side of a liquid heat exchanger, such as a shell and tube heat exchanger that may contain glycol from the process, the lubricant will be heated in that heat exchanger. In circumstances, such as during operating, where the lubricant 29 is warmer than the liquid on the other side of a liquid heat exchanger, the lubricant 29 will be cooled.

In the case of the machine 21 being an expander in an organic Rankine cycle application, the liquid on the other side of the liquid heat exchanger could be water, glycol or thermal oil. Depending on the lubricant 29, process fluid 56, ambient air temperatures and process conditions, the heat exchanger(s) may be required to add heat to the lubricant 29 rather than removing heat from the lubricant 29. By keeping the temperature of the lubricant 29 above the vaporization temperature of the process fluid 56, this will prevent the process fluid 56 from condensing in the lubricant 29 and thus diluting the lubricant 29.

If the high or low pressure chambers 39, 26a, or 26b, on the machine 21 are large enough, they can serve as the reservoir 33 or the reservoir with heat exchange capability 34 capabilities, or the reservoir with heat exchange and separation capabilities 35. Depending on the temperature of the lubricant 29 and the pressure in the high and/or low pressure lubricant circulation system 30, 31 and high and/or low pressure chambers 39, 26, it may be advantageous not to cool the lubricant 29 such that the process fluid 56 remains in a vapor state. For cold starts, it may be a requirement to heat the lubricant 29 so as to reduce viscosity so that it can be circulated within the operating parameters of the lubricant circulation pump 45 or 54 as the case may be.

In virtually all circumstances with a high and/or low pressure lubricant circulation system 30 or 31, the lubricant 29 will be drained to a reservoir 33, 34 or 35 prior to being circulated back to lubricate the bearings 16, 66 and 88, and high and low pressure seals 17, 28a, 28b and 28c. Reservoir 33 may or may not contain heat exchange capabilities, as well as separation of liquid and vapor capabilities.

As shown in the exemplary embodiment of FIG. 4B, heat exchanger 32, which is positioned between the lubricant circulation pump 45 and chamber 39, could have heat being added to the lubricant 29 so that any process fluid 56 that may have ended up in chamber 39 from pressure balancing would be vaporized. The lubricant 29 then flows through lubricant circulating line from high pressure chamber 39 to low pressure chamber 26a. Along the route, the lubricant 29 may pass through a pressure regulator 36 and/or a heat exchanger 32, where the lubricant 29 may be heated or cooled as required. The lubricant 29 would then be utilized in low pressure chamber 26a to lubricate the bearings 66, 88 and seals 28 where it would then drain to the bottom of chamber 26a, to then pass through lubricant circulating line to the reservoir with heat exchange and separation capabilities 35. At this stage, the lubricant 29 may be heated or cooled, depending on the relative temperatures of the lubricant 29 and the liquid heat exchange medium. The flow of heat exchange medium may be controlled by the control module 93 (shown in FIG. 6).

An application that is of particular interest is where a glycol source is temperature conditioned to be consistently in a tight temperature range. Depending on the temperature of the glycol source, it could prove to be an excellent match to the lubricants 29 operating temperature requirements. Specifically, a reciprocating engines glycol can be consistently supplied at approximately 185 degrees Fahrenheit, depending on the thermostat settings. If the minimum temperature of the lubricant 29 is to be 170 degrees Fahrenheit the glycol will heat the lubricant 29 in a heat exchanger 32, reservoir with heat exchange capability 34 or reservoir with heat exchange and separation capabilities 35, and draw it up towards the 185 degree Fahrenheit temperature. At the same time, if the lubricant 29 temperature starts to climb over the 185 degrees Fahrenheit, the glycol will then work to cool the lubricant 29. The process automatically balances the lubricant 29 temperatures to the desired condition or the process fluid 56 being in vapor state and the lubricant 29 not being too hot and thereby having reduced viscosity (and hence reduced lubricity that would detrimentally affect the longevity and well being of bearings 16, 66, and 88).

As shown in FIG. 4D, high pressure lubricant circulation system 30 and low pressure lubricant circulation system 31 are shown; one for the high pressure end of the machine 21 and a second for the low pressure end of the machine 21. Heat exchangers 32 (not shown), or reservoirs with heat exchange capabilities 34, or reservoirs with heat exchange and separation capabilities 35 (not shown) would be utilized to adjust the lubricant 29 temperature to a desired range.

Control Module

In one advantageous embodiment, the present seal system can be controlled by a control system that is either independent or part of the existing application, for example as part of an ORC or pressure let down control system. In a further advantageous embodiment, control of the present sealing system is controlled by the control system of an ORC unit as described in Applicant's co-pending U.S. Publication No. 2009/0320477 and U.S. Publication No. 2010/0018207, each of which is incorporated by reference in its entirety herein. In such an embodiment, as shown in FIG. 6, monitoring of process fluid pressure, temperature, or flow in process piping 60, 64 or 70, chamber 39, 26a or 26b, lubricant in lubricant circulation systems 30, 31, or flow of air or liquid to the heat exchangers 32, reservoirs with heat exchange capability 34 or reservoirs with heat exchange and separation capabilities 35. In addition, the embodiment of the control module would contain control of devices such as control of valves 38, 95, lubricant circulation pumps 45, 54 or flow of air or liquid to the heat exchangers 32, reservoirs with heat exchange capability 34 or reservoirs with heat exchange and separation capabilities 35. Therefore, the pressure in the chambers can be controlled to optimize the PV and corresponding leak rate for the affected seals 17, 28a, 28b, 28c or 27. It is also possible to use a control system for temperature monitoring of the lubricant 29 at the high pressure chambers 39 and low pressure chambers 26a, and 26b, or in the high pressure lubricant circulation system 30 and low pressure lubricant circulation system 31 such that the control system monitors temperature, pressure and flow to determine if process fluid 56 has condensed or become miscible in the lubricant 29, or if the process fluid 56 has remained in vapor state. Temperature monitoring may be used in addition to or as an alternate to pressure monitoring, should that be required.

Combinations and Configurations of the Concepts

One such combination, not shown for the purposes of brevity, is utilization of splash lubrication of the bearings, gears and seals in the high pressure chamber 39, pressure balancing chamber 39 with process fluid 56 pressure from process pipe 60. In the pressure balancing lines would be a separator 77 to insure that lubricant did not make it into the process. The low pressure end of the machine 21 would have a lubricant circulation system 31 with pressure balancing of chamber 26a with process fluid pressure from process pipe 70. Similar to the high pressure side, the low pressure side would utilize a separator 77 in the pressure balancing line 72. The lubricant circulation system 31 would be controlled by the control module 93 and it would be tied into the separator 77 with a vent line off of the reservoir with heat exchange and separation capabilities 35 that would alter the temperature of the lubricant to keep it in the desired range.

Additionally, it should be understood by those skilled in the art that high pressure process pipe 60 and low pressure process pipe 70 may be advantageously coupled in various configurations to any of the high pressure chamber and one or more low pressure chambers (with or without an integrated gear box). The couplings may be accomplished using any of the techniques described above, including one or more regulators and/or pressure balancing lines to achieve cascading and pressure balancing, depending on the application needed.

Furthermore, it should be noted that specific lubricants, described in various embodiments above, may have advantageous effects on the operation of the disclosed systems/machines. As is known in the art, a lubricant's purpose is to keep moving parts separated from running metal on metal. Properties of the lubricant affect its operating temperature, viscosity, and so forth. It has been found by the Applicant that synthetic lubricants may be advantageous if using a hydrocarbon process fluid in pressure balancing. For such applications, suitable synthetic lubricants include poly-alpha-olefin (PAO), polyalkylene glycols (PAG) and the like. These synthetic lubricants have advantages over mineral based lubricants for very low or high temperatures, extremely high loads, extraordinary ambient conditions, and flammability. Exemplary physical property advantages include thermal resistance, low temperature properties (fluidity, pour point), flash point and evaporation losses Further advantages of synthetic lubricants (depending on the base material) over mineral lubricants include improved thermal and oxidation resistance, higher viscosity index, improved low temperature properties, lower evaporation losses, reduced flammability, better lubricity, and lower tendency to form residues. Accordingly, for use in a pressure balanced system that uses a hydrocarbon based process fluid, mineral lubricants are not particularly suitable due to the risk of solubility and miscibility issues. Hydrocarbon based process fluid (in this case, isobutane) near saturation conditions would be contacting the lubricant and that liquefied hydrocarbon could mix with the mineral based lubricant. Accordingly, a number of resulting effects occur, where (i) dilution with isobutane will drop the viscosity of the oil, (ii) the lubricity of the oil is most significantly affected by its viscosity, (iii) there is uncertainty to what extent the mixing will occur, and (iv) the lubricant properties will return to their original state when the process fluid is boiled out of solution, but if that is not effectively accomplished, the risks are very high to damage to the rotating components due to the mineral based lubricant not performing as designed. Also, most lubricant circulation systems look to cool the lubricant. In the systems presented, it may be necessary to heat lubricant (to boil off any process fluid in the lubricant), therefore a synthetic is better suited to operate at higher temperatures than mineral based lubricants.

Specifically, many mineral based lubricants operate at temperatures below 200° F. whereas a synthetic PAG is suitable to operate up to 200° C. As an example, to evaporate isobutane at the lubricant circulation systems operating pressure of 180 psi, the lubricant must be over 170° F.—near the upper limit to mineral based lubricants. The "rule-of-thumb" is that for every 10° F. that a mineral based lubricant is over 180° F., it useable life expectancy is reduced to half. The reason for this is that as lubricants rise in temperature their viscosity goes down and therefore the lubricity of the lubricant is affected and it breaks down quicker. With the higher suitable operating temperatures of synthetic lubricants, the designs presented can operate the lubricant at an elevated temperature and not lose the lubricating properties required for the bearings and other moving parts. Synthetics also have a higher viscosity index and therefore are better suited for machines that operate outdoors, in the field. That is, if a cold start, in winter, is required, a high viscosity index lubricant will have a cold temperature viscosity closer to that at elevated temperature viscosity, making the lubricant circulation system easier to operate.

Accordingly, regarding lubricant circulation systems for the various configurations of the present disclosure, the configurations may be based on splash or circulating lubrication. In the case of circulating lubrication, the configuration may be single system for entire machine or a lubricant circulation system for each pressurized chamber, or a combination of any of the three types of systems on one machine. (e.g. splash lubrication on the high pressure chamber end, with two lubricant circulation systems for each pressure chamber 26a and 26b.) or, splash on the high pressure end with one lubricant circulation system for two pressure chambers, where the lubricant is pushed from the higher pressure chamber to the lower pressure chamber by the pressure. A regulator in the lubricant line connecting the two chambers would be required. This is where the lubricant circulation system configuration and the pressure cascade will allow the lubricant to be circulated with one system pump. Due to the risk of viscosity being too high to pump in cold starts, and lack of certainty that the lubricant will be delivered to the various elements when the viscosity is considerably higher than the designed system, it may pose too risky to rely on a system with a single circulating pump.

In the foregoing Detailed Description, it can be seen that various features are grouped together in individual embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system for distributing pressure across one or more chamber seals, comprising:
  a machine, configured to handle process fluid, the machine comprising a higher pressure process pipe and a lower pressure process pipe, fluidly coupled to a first pressure chamber, the first pressure chamber comprising a process chamber, fluidly coupled to the machine, wherein the first pressure chamber is configured to be pressurized by the process fluid; and
  a second pressure chamber comprising a bearing chamber, fluidly coupled to the first pressure chamber, wherein the second pressure chamber is configured to be pressurized by the process fluid;
  one or more chamber seals, configured to maintain pressure differential between the first pressure chamber and the second pressure chamber;
  a rotating element, configured in the first pressure chamber and the second pressure chamber,
  wherein the second chamber is connected via a pressure balancing line to a point in the machine that is at a lower pressure than the pressure at the second pressure chamber,
  and wherein the machine is configured to direct at least a portion of the process fluid through the one or more chamber seals by inducing a configured pressure differential across the one or more chamber seals via the balancing line, to induce fluid flow that cascades (i) from the first pressure chamber to the second pressure chamber, and then (ii) from the second pressure chamber to the point in the machine that is at a lower pressure than the pressure at the second pressure chamber.

2. The system of claim 1, further comprising one or more regulators configured to adjust the pressure differential across the one or more chamber seals to induce the fluid flow to cascade from the first pressure chamber to the second pressure chamber, then to the point in the machine that is at a lower pressure than the pressure at the second pressure chamber.

3. The system of claim 1, further comprising a control module configured to regulate the flow rate of the process fluid through the pressure balancing line to optimize the pressure differential across the one or more chamber seals.

4. The system of claim 1, further comprising a reservoir fluidly connected to the pressure balancing line and configured to receive and contain at least a portion of the process fluid, wherein the reservoir comprises a heat exchanger to alter the temperature of the process fluid.

5. The system of claim 1, wherein at least one of the first pressure chamber and second pressure chamber is configured to contain lubricant.

6. The system of claim 5, wherein the machine is configured to direct at least a portion of the process fluid at a configured flow rate through at least one of the one or more chamber seals to produce process fluid leakage flow from the first pressure chamber to the second pressure chamber.

7. The system of claim 5, further comprising a separator configured to receive at least a portion of the process fluid from the second pressure chamber and remove at least a portion of the lubricant before the point in the machine that is at a lower pressure than the pressure at the second pressure chamber.

8. The system of claim 5, wherein the one or more chamber seals comprise an output drive chamber seal, and wherein the second pressure chamber comprises an integrated gear mechanism that reduces a rotational speed of the rotating element to an output drive shaft to manage the pressure differential across the output drive chamber seal.

9. The system of claim 5, further comprising a heat exchanger coupled to the lubricant reservoir to separate at least a portion of the process fluid from at least a portion of the lubricant.

10. The system of claim 1, wherein the one or more chamber seals comprise mechanical face seals and/or labyrinth seals to enhance sealing and process fluid flow management.

11. The system of claim 1, wherein the machine is configured to provide at least a portion of process fluid to alter first or second chamber pressure to reduce the product of a pressure differential and surface velocity (PV) across the one or more chamber seals in the machine.

12. A method for distributing pressure across one or more chamber seals, comprising:
providing process fluid in a machine, the machine comprising a higher-pressure process pipe and a lower pressure process pipe, fluidly coupled to a first pressure chamber;
the first pressure chamber comprising a process chamber, fluidly coupled to one portion of the machine;
pressurizing, via the process fluid, a second pressure chamber comprising a bearing chamber, fluidly coupled to the first pressure chamber;
providing one or more chamber seals, configured to maintain pressure differential between the first pressure chamber and the second pressure chamber, wherein the second pressure chambers is connected via a pressure balancing line to a point in the machine that is at a lower pressure than the second pressure chamber, and wherein a rotating element is configured in the first pressure chamber and second pressure chamber; and
directing at least a portion of the process fluid through the one or more chamber seals by inducing a configured pressure differential across the one or more chamber seals via the balancing line, to induce fluid flow that cascades (i) from the first pressure chamber to the second pressure chamber, and then (ii) from the second pressure chamber to the point in the machine that is at the lower pressure than the pressure at the second pressure chamber.

13. The method of claim 12, further comprising assisting in directing the process fluid via one or more regulators configured to adjust the pressure differential across the one or more chamber seals to induce the fluid flow to cascade from the first pressure chamber to the second pressure chamber, then to the point in the machine that is at a lower pressure than the pressure at the second pressure chamber.

14. The method of claim 12, further comprising assisting in directing the process fluid via a control module configured to regulate the flow rate of the process fluid through the pressure balancing line to optimize the pressure differential across the one or more chamber seals.

15. The method of claim 12, further comprising receiving and containing at least a portion of the process fluid via a reservoir fluidly coupled to the pressure balancing line, and controlling the temperature of the process fluid via a heat exchanger of the reservoir.

16. The method of claim 12, wherein at least one of the first pressure chamber and second pressure chamber is configured to contain lubricant.

17. The method of claim 16, wherein directing the process fluid comprises directing at least a portion of the process fluid at a configured flow rate through the one or more chamber seals to produce process fluid leakage flow from the first pressure chamber to the second pressure chamber.

18. The method of claim 16, further comprising receiving, in a separator, at least a portion of the process fluid from the second pressure chamber and removing at least a portion of the lubricant before the point in the machine that is at a lower pressure than the pressure at the second pressure chamber.

19. The method of claim 16, wherein the one or more chamber seals comprise an output drive chamber seal, and further comprising reducing a rotational speed of the rotating element to an output drive shaft via an integrated gear mechanism to manage the pressure differential across the output drive chamber seal.

20. The method of claim 16, further comprising separating, via a heat exchanger coupled to the lubricant reservoir, at least a portion of the process fluid from at least a portion of the lubricant.

21. The method of claim 12, wherein the one or more chamber seals comprise mechanical face seals and/or labyrinth seals to enhance sealing and process fluid flow management.

* * * * *